United States Patent [19]

Aoki et al.

[11] Patent Number: 4,860,550

[45] Date of Patent: Aug. 29, 1989

[54] APPARATUS FOR PREPARING ICE CREAMS

[75] Inventors: Ken Aoki, Ashikaga; Katsuhiko Hoshi, Ohta; Shigeo Satoh; Mitsuru Kakinuma, both of Gumma; Shigeru Togashi, Ashikaga; Hiromi Saitoh, Gumma, all of Japan

[73] Assignee: Sanyo Electric Co., Ltd., Japan

[21] Appl. No.: 229,601

[22] Filed: Aug. 8, 1988

[30] Foreign Application Priority Data

Aug. 8, 1987 [JP] Japan ................................. 62-197310
Aug. 8, 1987 [JP] Japan ................................. 62-197312
Sep. 29, 1987 [JP] Japan ................................. 62-149196

[51] Int. Cl.$^4$ ............................................. F25C 1/00
[52] U.S. Cl. ......................................... 62/135; 62/303; 134/22.15; 366/138
[58] Field of Search ................ 62/303, 342, 135; 165/95; 134/22.12, 22.15; 366/138

[56] References Cited

U.S. PATENT DOCUMENTS 3,661,505  5/1972  Frolich ............................. 134/22.15
3,733,840  5/1973  Pearl et al. ........................ 62/303 X
4,703,628  11/1987  Togashi et al. .................... 62/303 X Primary Examiner—William E. Wayner
Attorney, Agent, or Firm—Darby & Darby

[57] ABSTRACT

An apparatus for preparing ice creams, wherein a freezing cylinder is constituted such that a liquid mix supplied from a mix tank is stirred in a stirring apparatus that is installed in the inside of the freezing cylinder, and refrigerated so as to complete ice creams, any amount of which can be dispensed through a dispensing port. For the cleaning and sterilization of the inside of the cylinder, the inside is heated by reversing the flow of heat media which are to be circulated through the refrigerating part of the cylinder to dissolve and automatically withdraw the ice creams in the cylinder, then cleaned several times by supplying and discharging hot water, to and from the inside, and after that sterilized by supplying hot water to the inside, and discharging the water from it.

9 Claims, 56 Drawing Sheets

FIG. I A
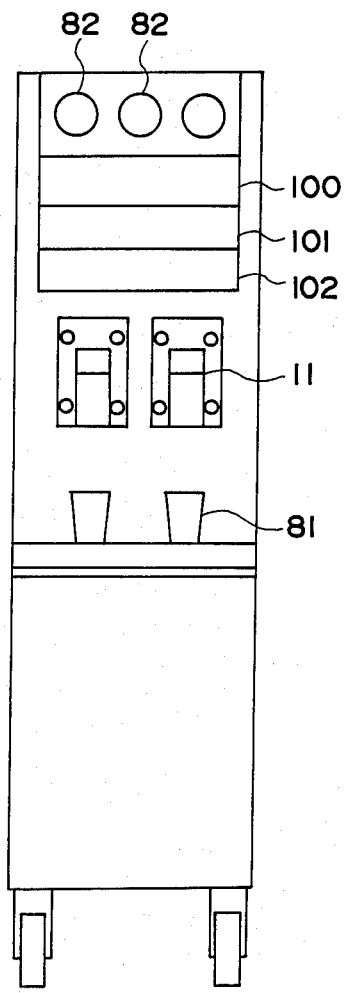

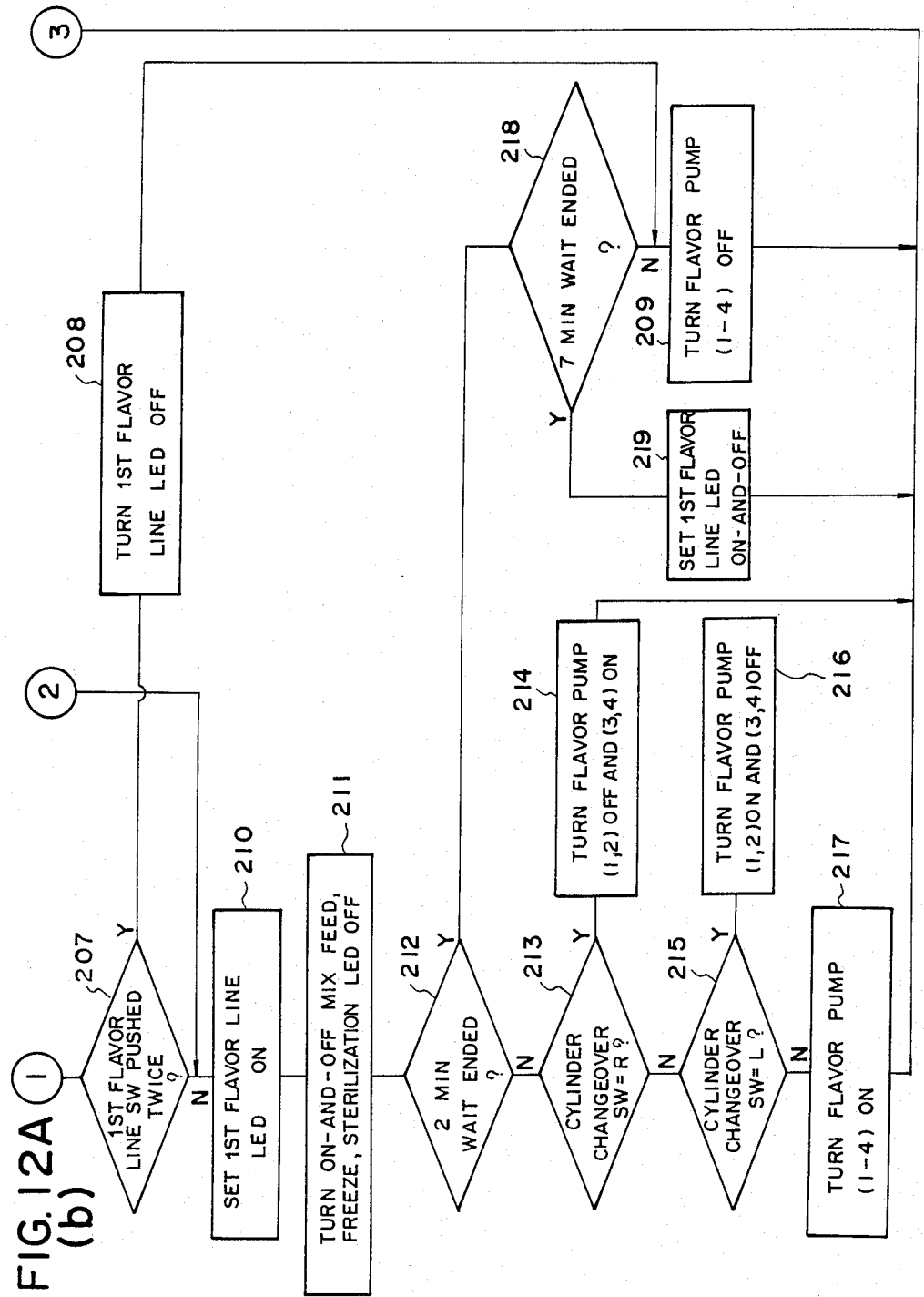

(a)

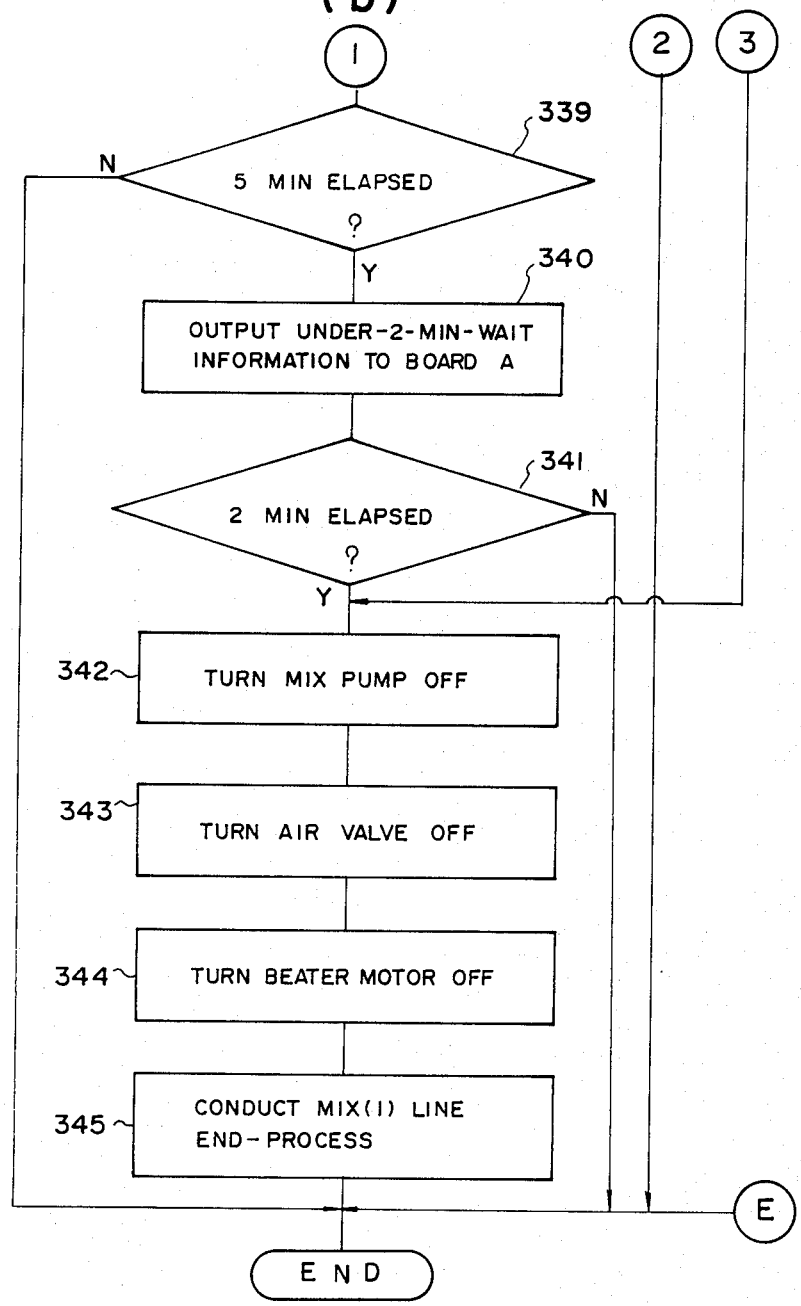

(a)

(b)

(b)

(a)

(b)

(a)

(b)

CONDUCT FLAVOR (I) AUTO DISPENSING ROUTINE

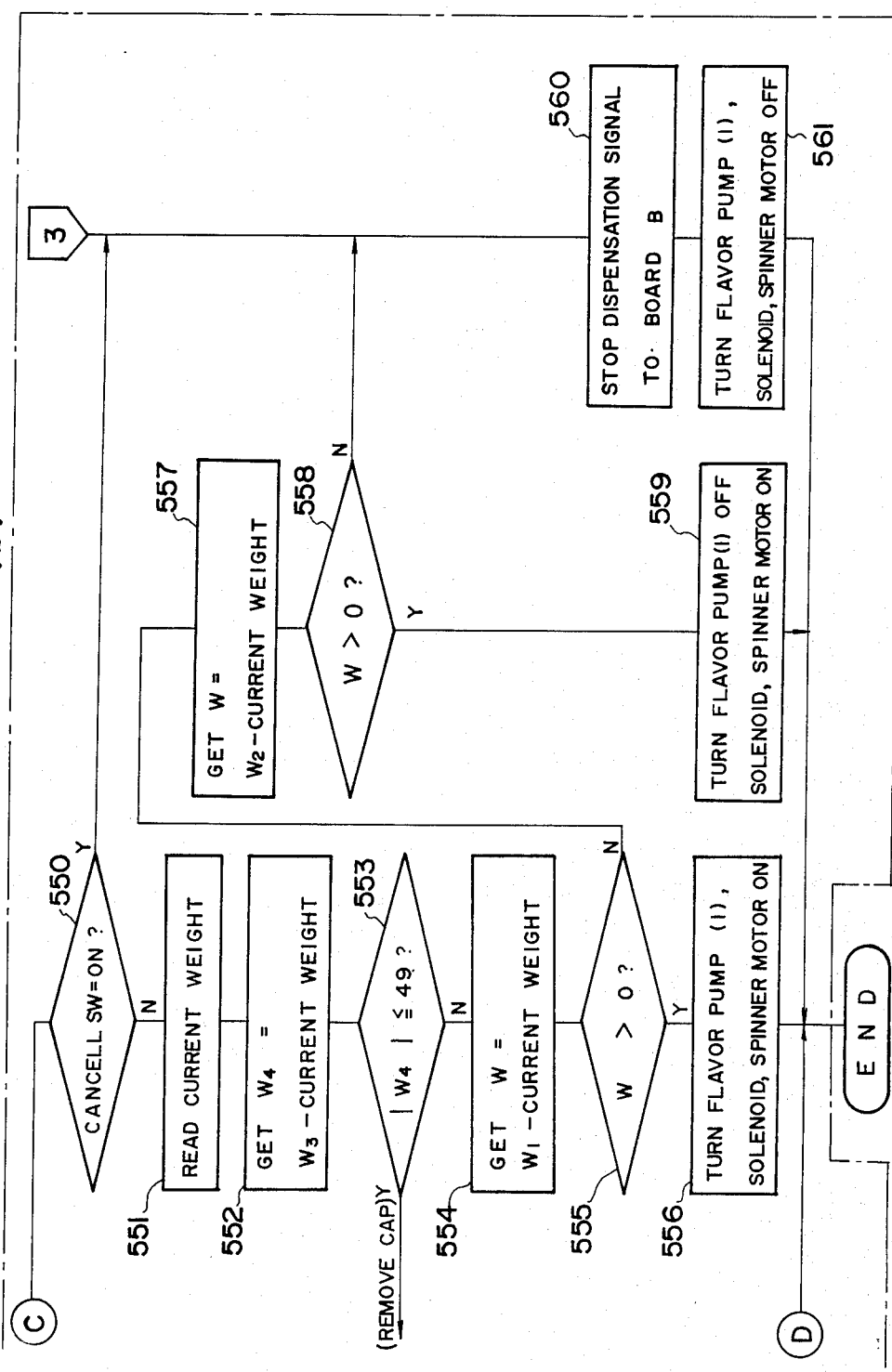

(a)

(b)

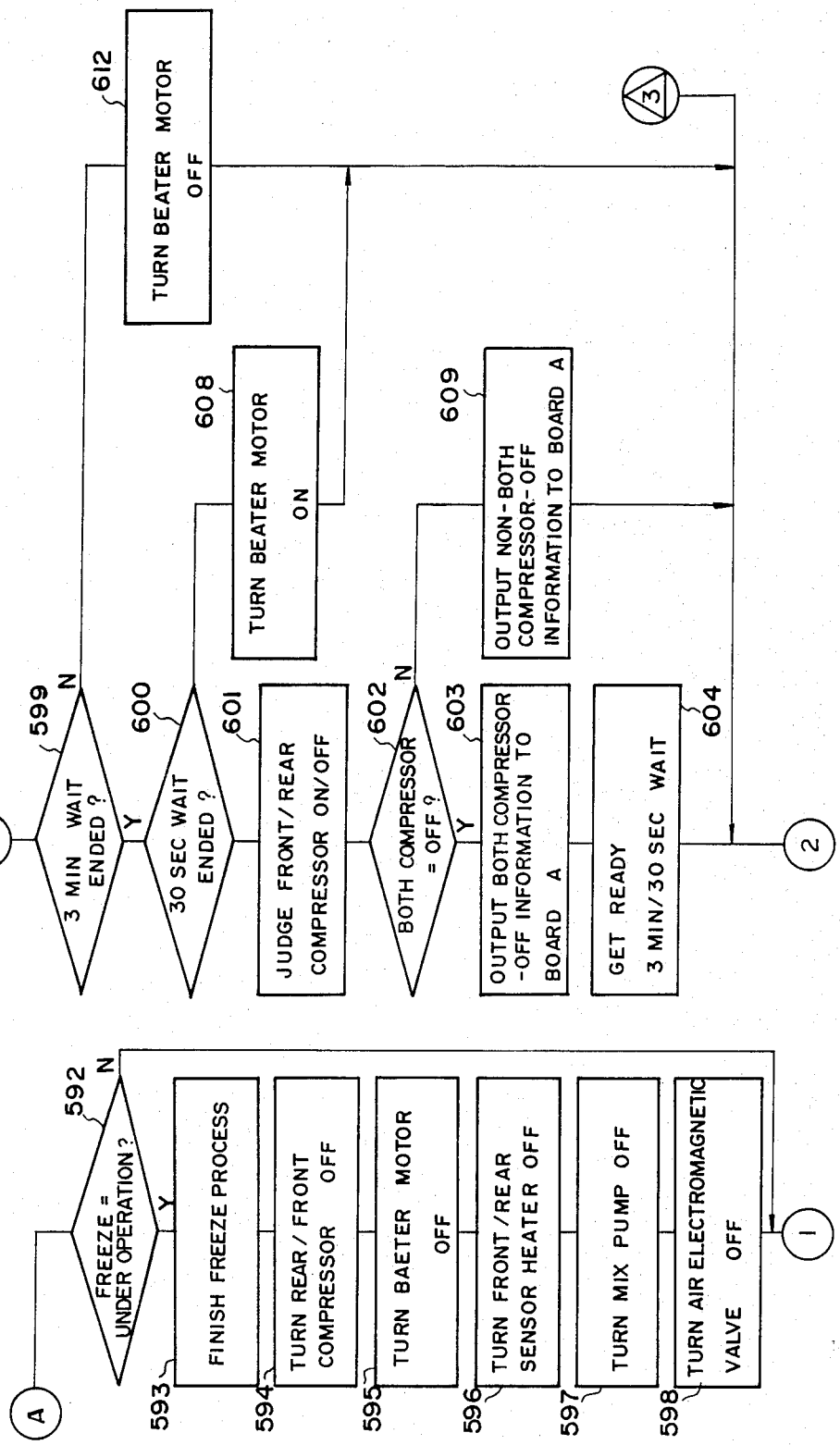

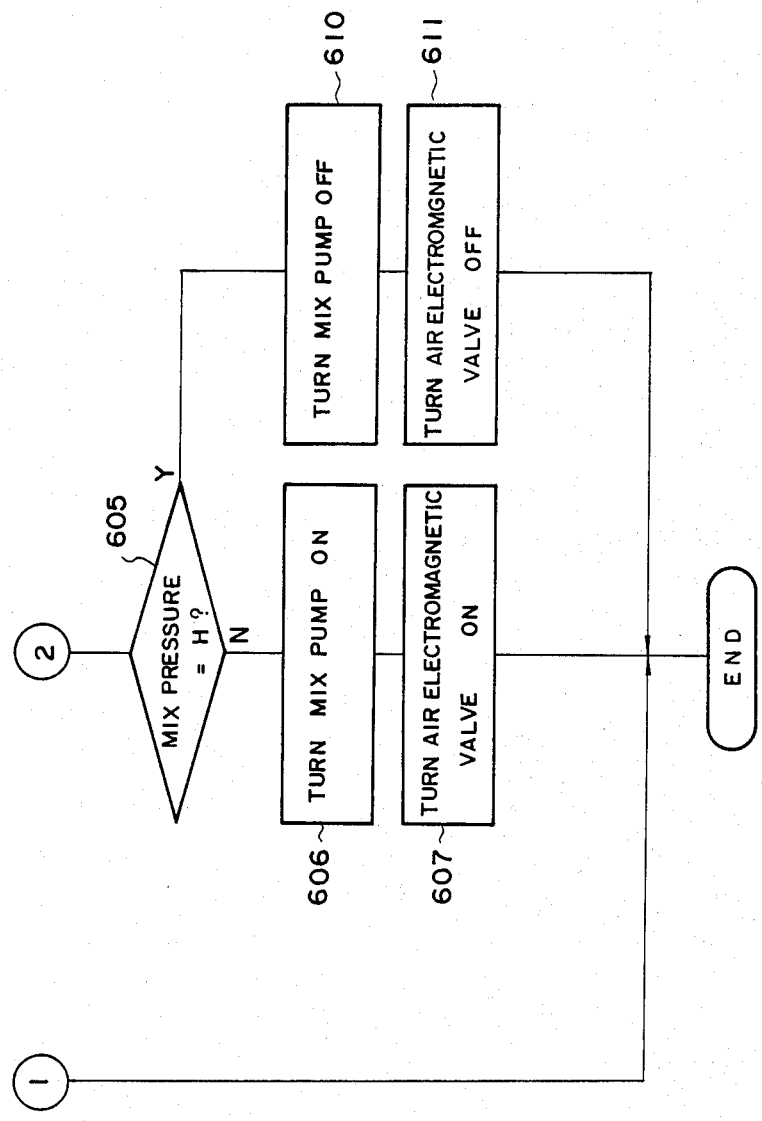

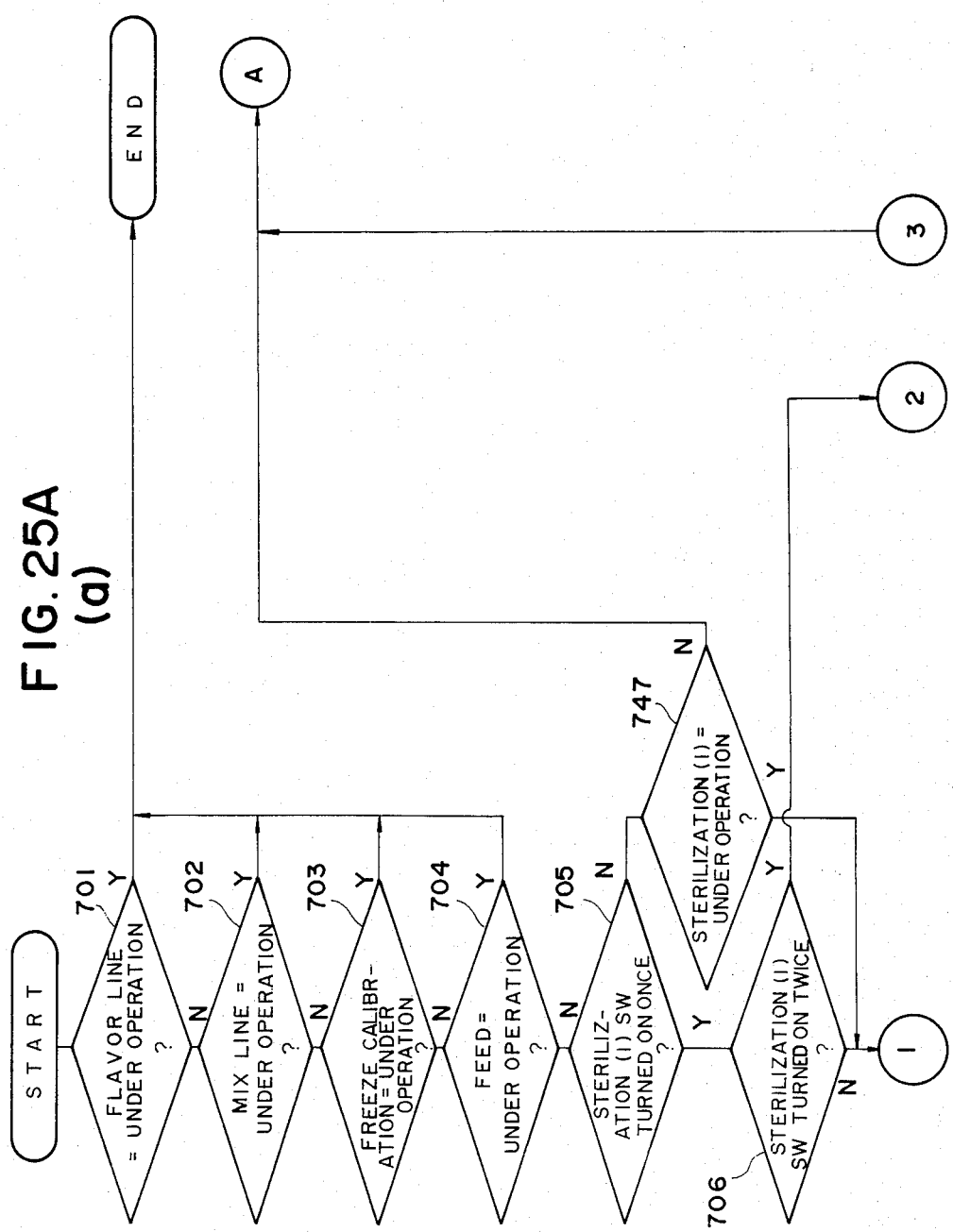

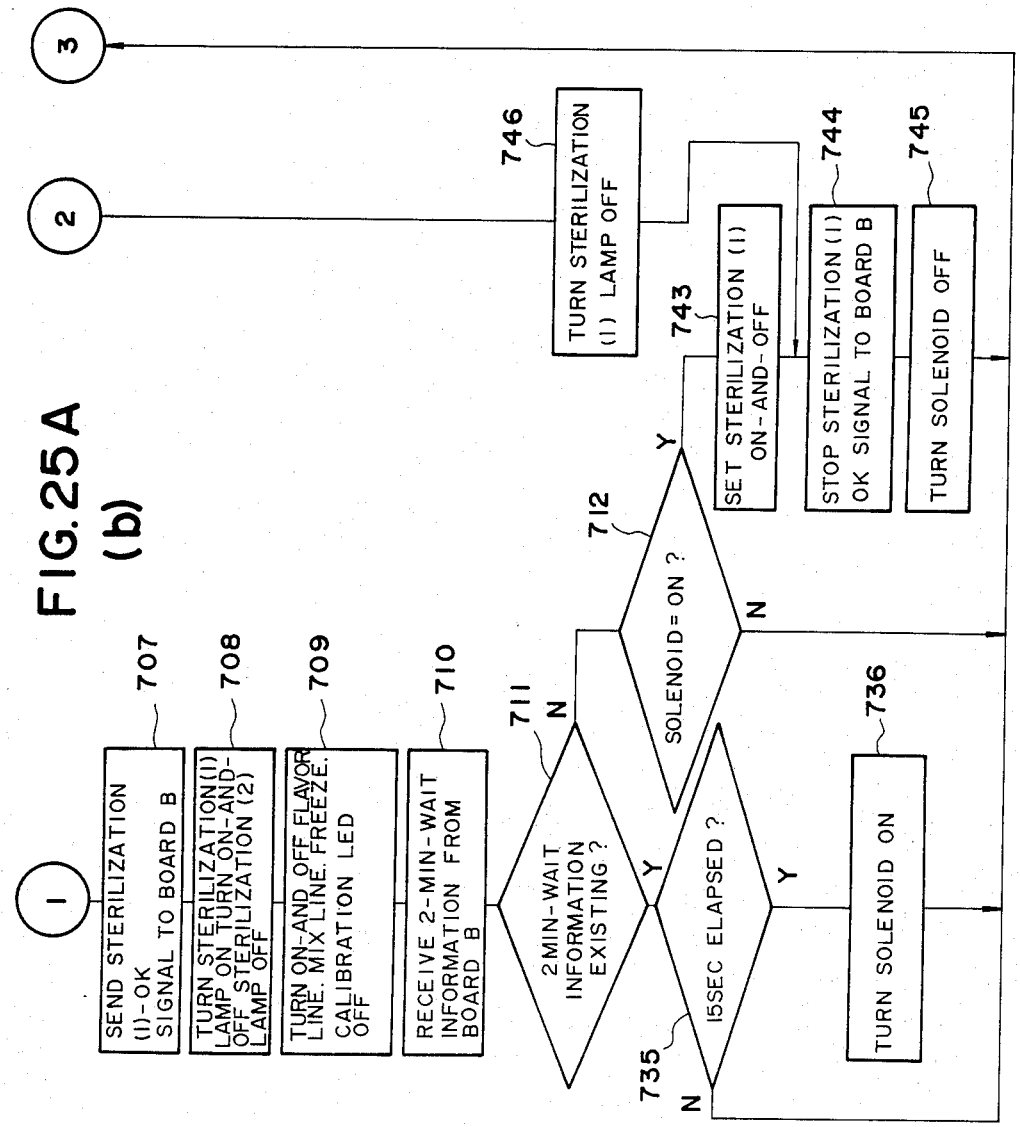

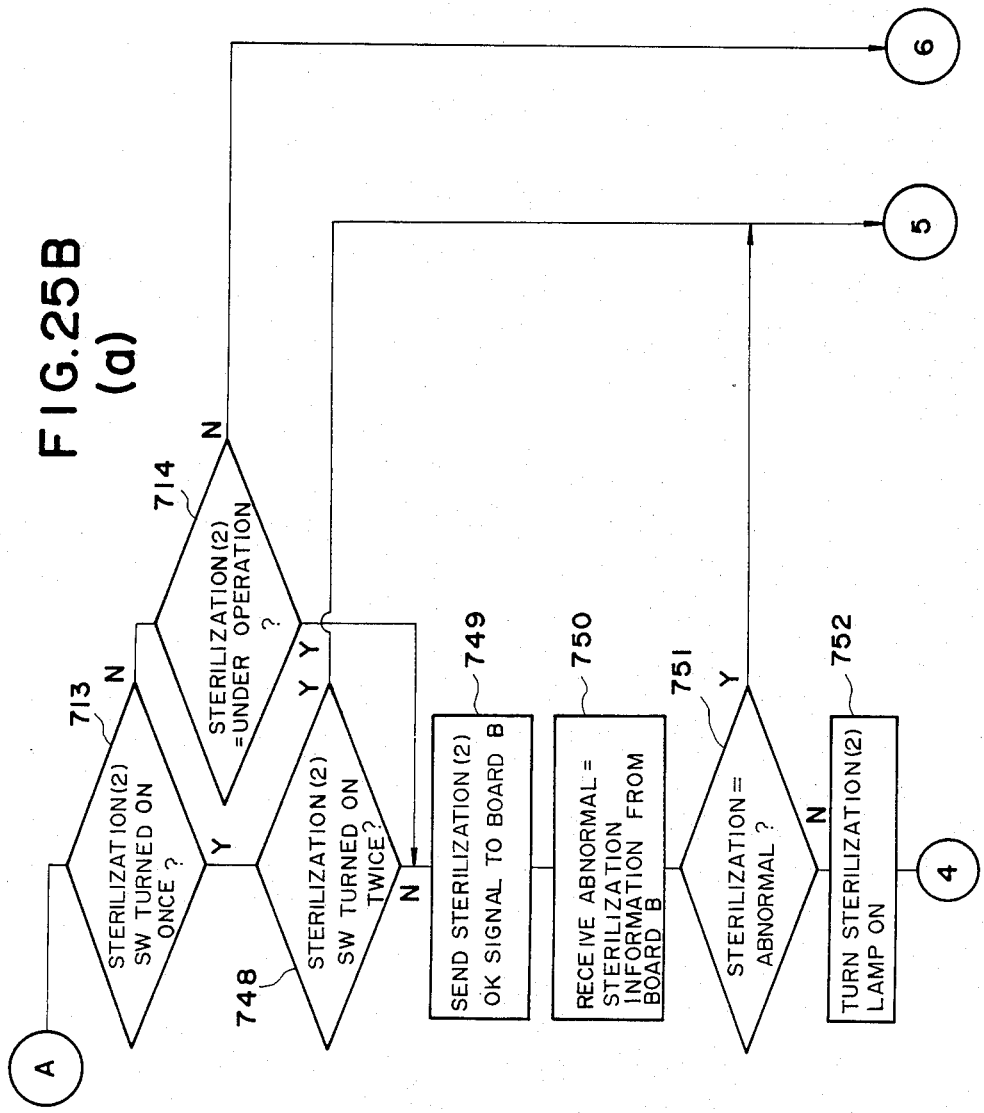

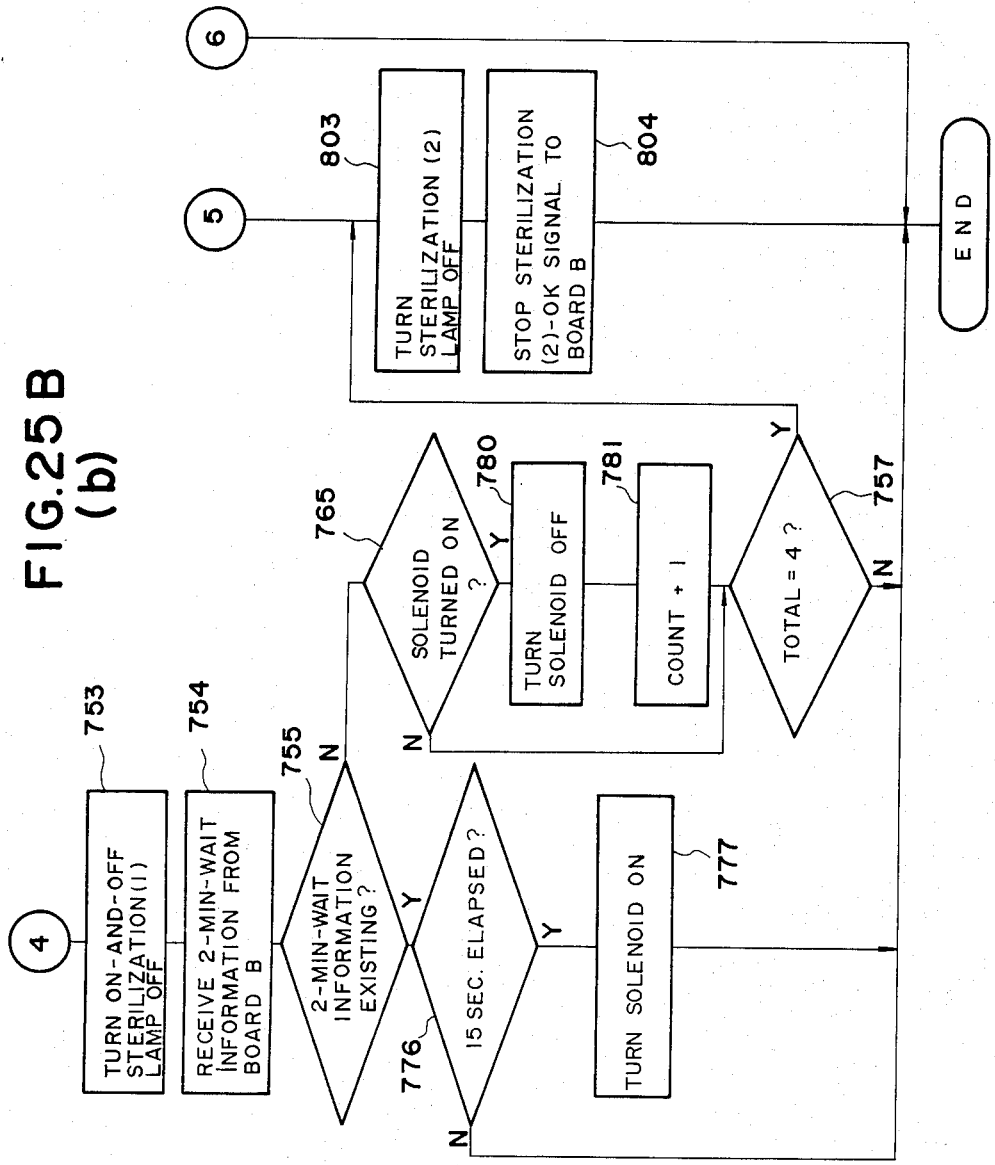

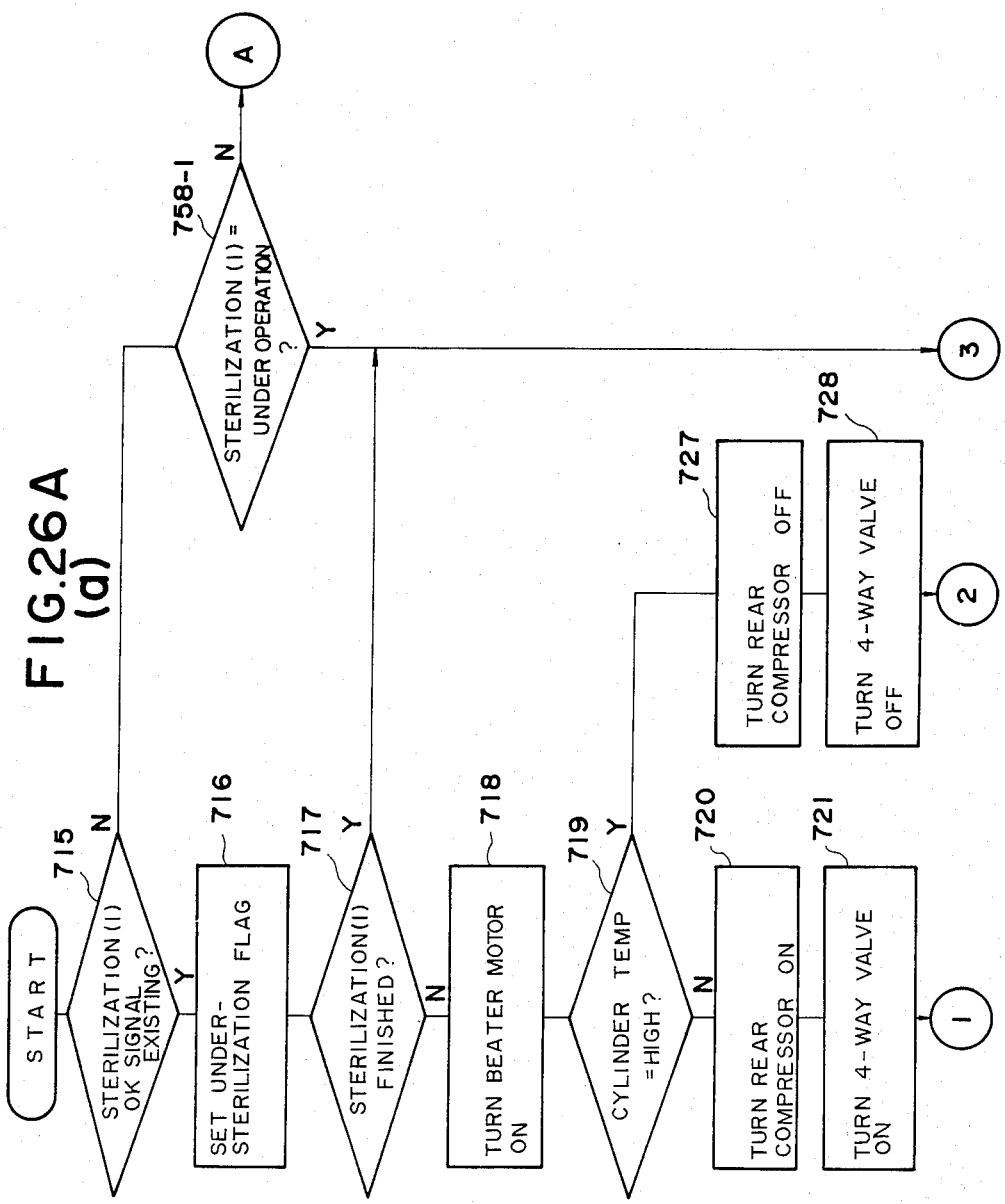

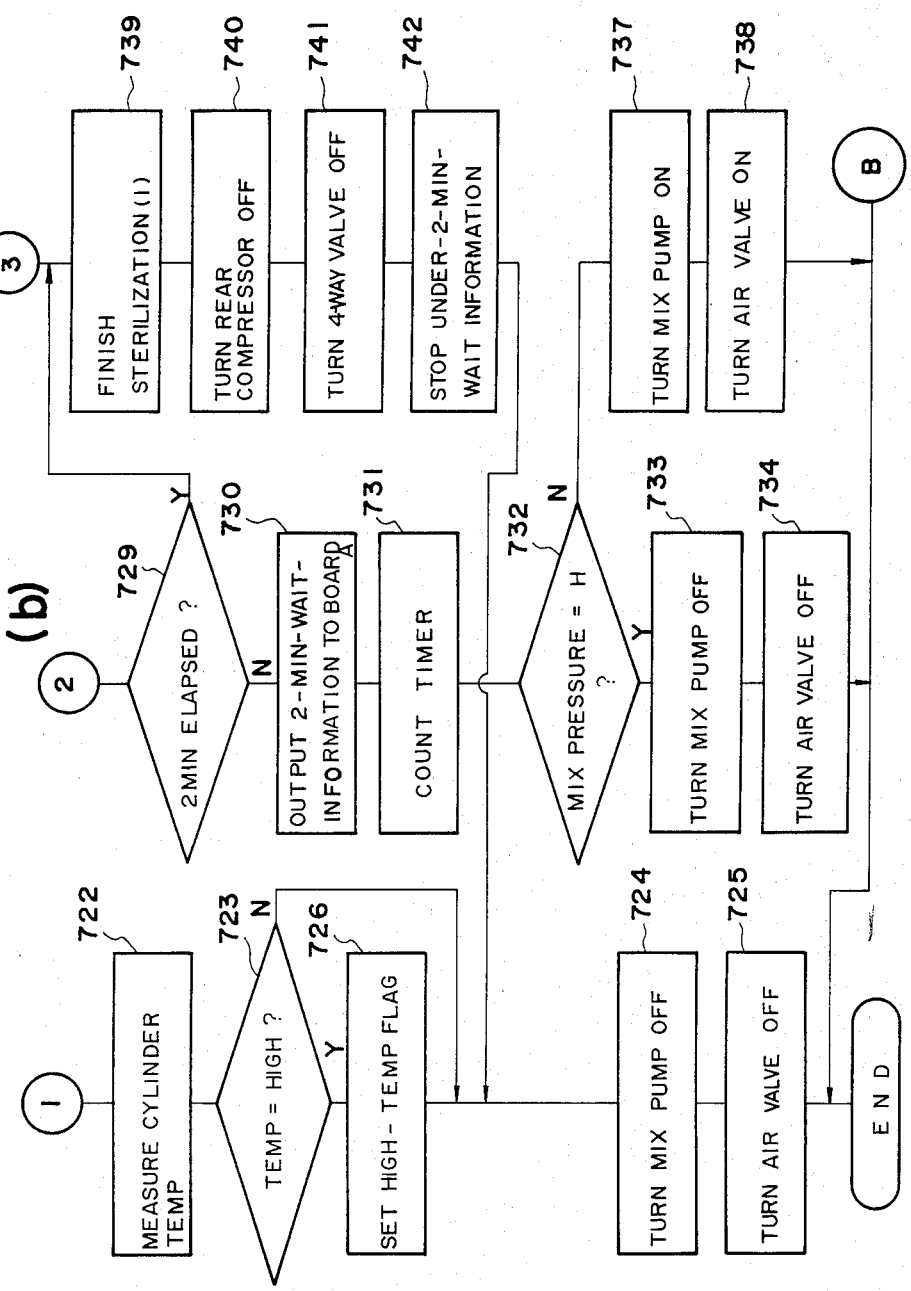

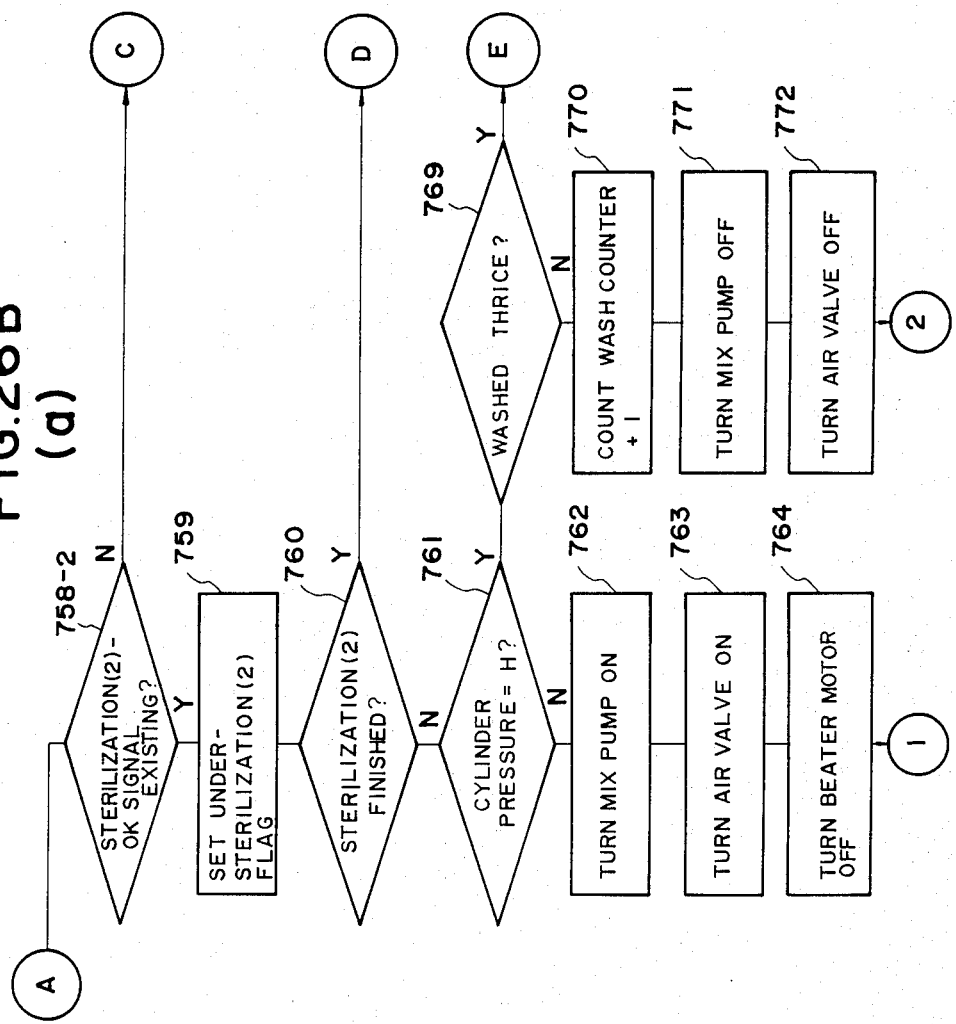

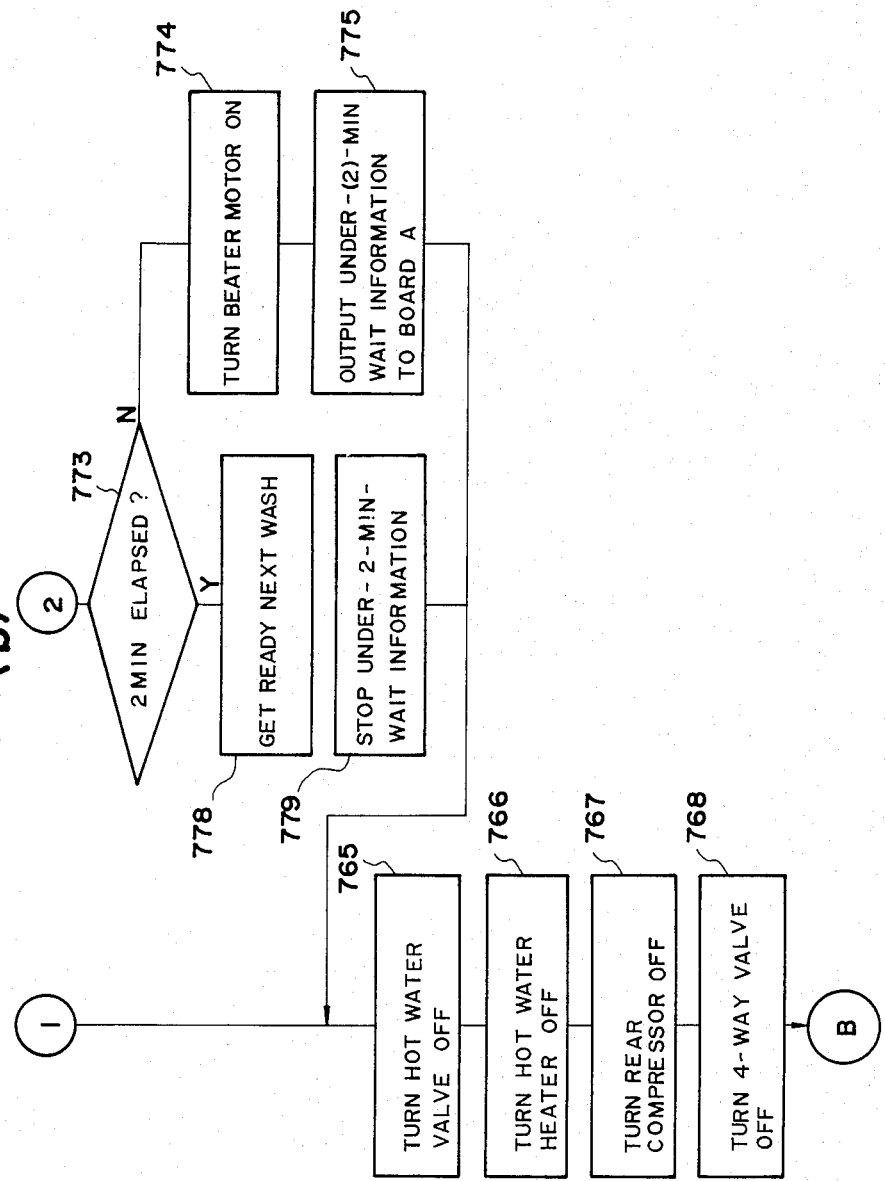

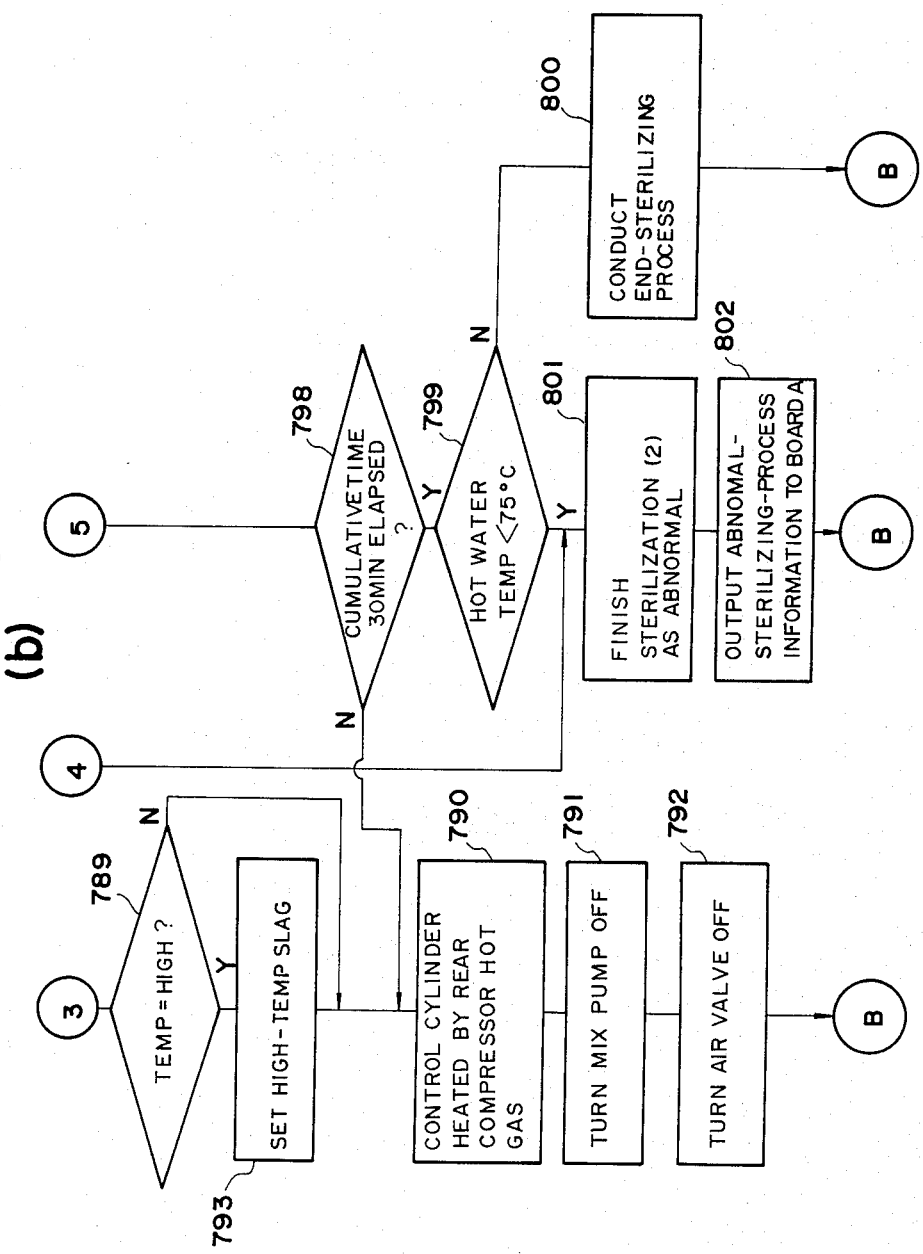

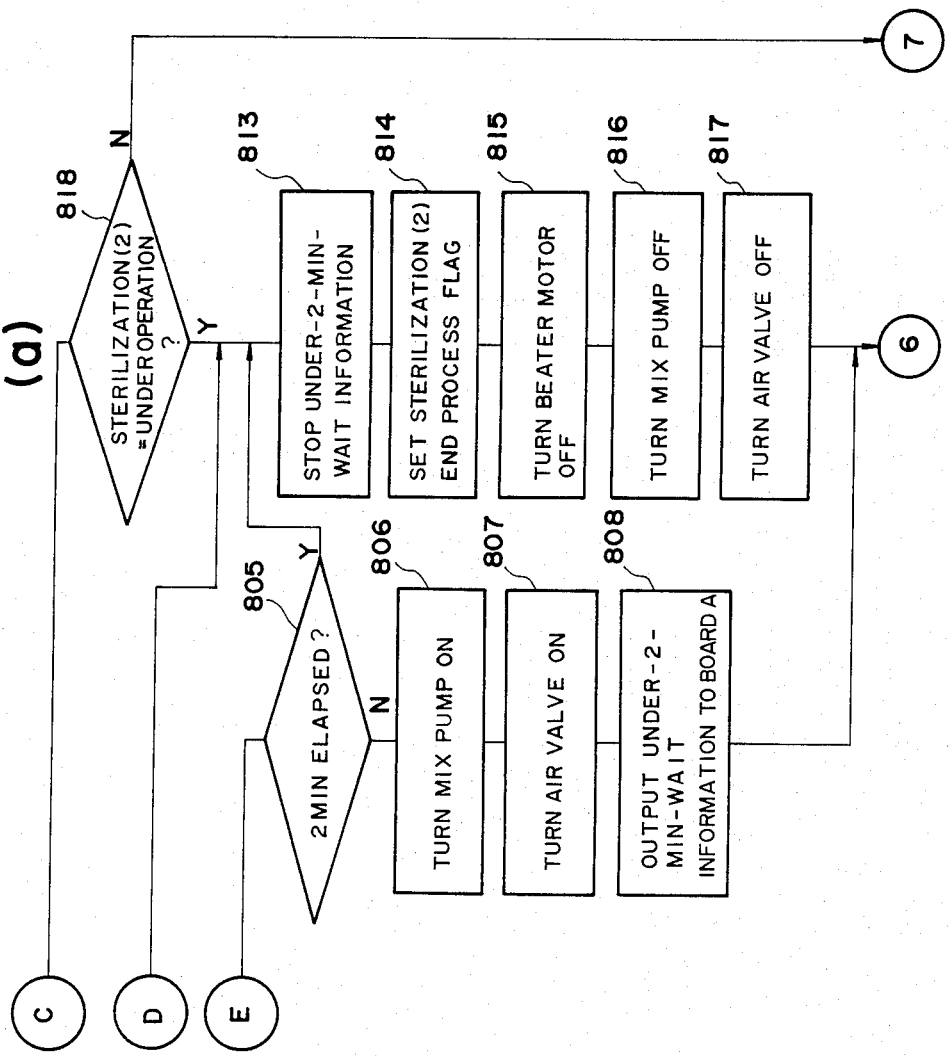

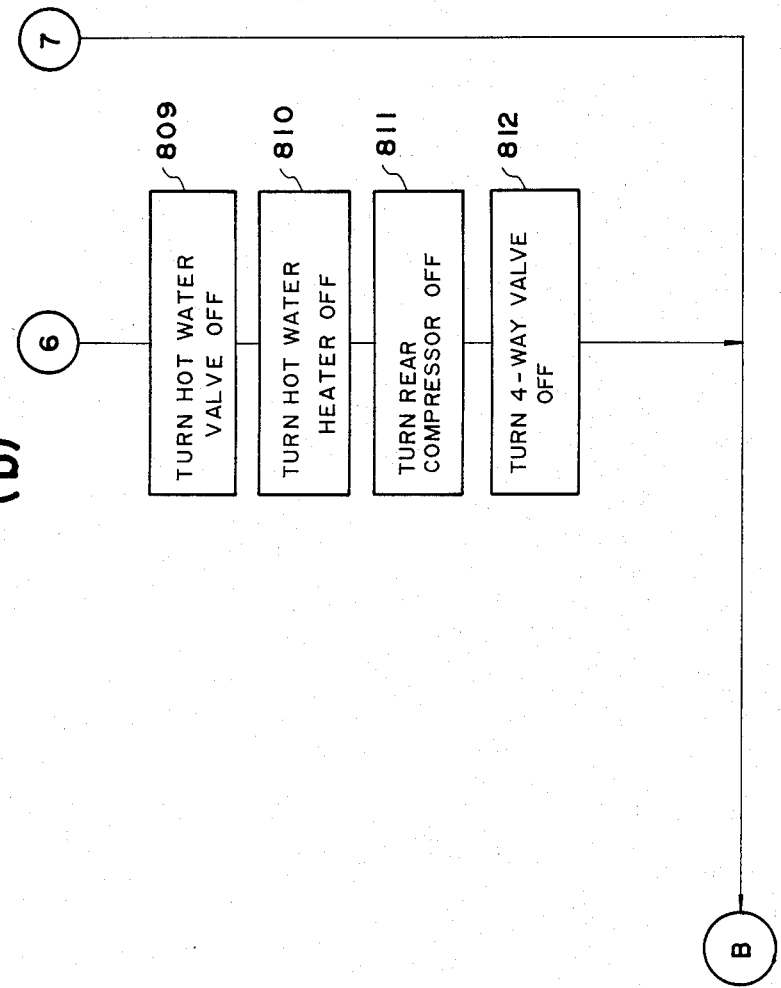

4,860,550

APPARATUS FOR PREPARING ICE CREAMS

FIELD OF THE INVENTION

This invention relates to an apparatus for manufacturing ice creams, such as a soft ice cream or an ice-cream shake.

BACKGROUND OF THE INVENTION

In a conventional apparatus for preparing ice creams, e.g. as described in U.S. Pat. No. 4,703,628, both the freezing cylinder and ice creams are sterilized while a high-temperature refrigerant gas is circulating through the freezing cylinder, and the ice creams are being kept in the inside of the cylinder In this case, there is a problem in that when a high thermal death point is preset to obtain an excellent sterilization effect, such kind of ices as an ice cream will generate a smell of something burnt, and the flavor of the ice creams reproduced from such ices will be greatly injured.

For the avoidance of such problems, a system is also known as shown in Japanese Patent Early Publication No. 54-37223 for example. In this system, the freezing cylinder is sterilized by boiling water after collecting ice creams in the cylinder. However, in the system described in the above publication, city water is heated in the tank in which the temperature and the quantity of the contents of it are controlled, a prescribed quantity of the boiling water is supplied to the material tank and the freezing cylinder when cleaning and sterilization are needed, and the used boiling water is discharged by opening the gate plunger of the product dispenser after a prescribed period of time controlled automatically. Hence this conventional system has drawbacks in that since the boiling water heated in advance in the tank is fed to the material tank and the freezing cylinder, a large quantity of heat is lost through conduction and radiation to the air in the cylinder, tank, and piping, the temperature of the fed boiling water falls below thermal death points, and satisfactory sterilization can hardly be expected.

Further, in this kind of ice cream manufacturing apparatus, as seen in U.S. Pat. No. 4,703,628, there was only one freezing cylinder to stir and refrigerate ice-cream materials. A plural kinds of flavor piping are connected to such one cylinder such that one of flavors was selected and mixed with the ice creams obtained from the freezing cylinder, and the finished ice creams were poured into a container.

However, such a one-cylinder apparatus caused problems in that since there was only one cylinder, the dispensing of ice creams could not overtake a great demand in summer, and when there was a mechanical trouble no sales were possible.

Accordingly, a two-cylinder apparatus is considered favorable. However, it also caused problems in that a small demand in winter made the products remain unsold, and they had to be wastefully thrown away every day.

By the way, this kind of ices has a luscious taste peculiar to milk fats, and this lusciousness can be softened to some extent by enlarging ice crystals contained in ices. So, as shown in Japanese Patent Early Publication No. 61-47,149, a liquid mix, a material for ices, has hitherto been entered the freezing cylinder, and once heated prior to refrigerating operations which have been carried out after pull-down operations. Large ice crystals have been formed such that the liquid mix which was hardened through the pull-down operation was thawed to be separated into fat and water through such a heating operation, and then the liquid mix in this separated state was refrigerated through usual refrigerating operations.

However, above-mentioned conventional technology had problems in that since a refrigerated liquid mix must once be heated so as to form large-particle ice crystals, it takes a lot of time to enter into such usual refrigerating operations.

BRIEF SUMMARY OF THE INVENTION

This invention aims at solving above-mentioned problems in the prior art. The purpose of this invention is to provide an ice-cream manufacturing apparatus capable of certain cleaning and sterilization without a fall in the temperature of hot water in its freezing cylinders.

For the achievement of this purpose, this invention comprising a mix tank for storing a liquid mix, freezing cylinder having an inlet port to receive the liquid mix into the inside of it, an agitating means to agitate the liquid mix received into the inside, and a dispensing port to dispense ice creams prepared in the inside, a liquid mix supply means for supplying the liquid mix from the mix tank to the inlet of the freezing cylinder, a refrigerating means for refrigerating the freezing cylinder, a temperature control means for controlling the refrigerating means so as to keep the temperature of the ice cream in the freezing cylinder within a prescribed temperature range, is characterized by means for supplying hot water to the inside of the freezing cylinder and discharging the hot water after a prescribed period of time, heating means for heating the inside of the freezing cylinder, temperature detector means for detecting the temperature in the freezing cylinder, and heat control means for keeping the temperature of the hot water supplied to the inside of the freezing cylinder at thermal death points by operating and controlling the heating means on the basis of the temperature detected by the temperature detector means and a preset temperature.

According to this structure, it is possible for the ice-cream manufacturing apparatus to avoid insufficient sterilization caused by a lowering temperature of hot water in the cylinder by detecting the temperature in the freezing cylinder, and by operating and controlling the heating means for heating the inside of the cylinder so that the hot water maintains the thermal death points.

In this case, it is desirable that the heating means comprises a compressor and a condenser used also as a refrigerating means to refrigerate the inside of the cylinder, and a four-way valve to reverse the flow of refrigerants by providing the refrigerating means with a reverse cycle to heat the inside of the freezing cylinder. By doing so, the apparatus can be constituted economically since there is no need to separately install a heater to heat the inside of the freezing cylinder.

Further, it is possible to shorten working hours after closing the store by providing above-mentioned heating means to heat and dissolve the ices in the inside of the cylinder, and means to automatically collect the dissolved ices.

Further, it is desirable to provide means to supply and discharge hot water several times repeatedly, to and from the inside of the freezing cylinder before the hot water supplied to the inside of above-mentioned freezing cylinder is heated. By doing it is possible to achieve more sufficient cleaning before sterilization, and more sanitary conditions.

Further, it is possible to guarantee the sterilization of the inside of the freezing cylinder, and to prevent further wasteful heating by providing an accumulating timer to accumulate the time during which the temperature of the heated hot water in the above-mentioned freezing cylinder lies within a range of thermal death points.

Further, it is possible to constitute the apparatus economically by using above-mentioned temperature detector means as a temperature detector both for said temperature control means and said heating means.

Further, it is possible to sufficiently sterilize the sealing part of the rotating shaft by providing hot water supply means for supplying hot water to the sealing part of the rotating shaft in the agitating means which goes through the rear part of the freezing cylinder when heating and sterilization processes are operated to keep the hot water supplied to the inside of the freezing cylinder at the thermal death points.

Next, another object of this invention is to provide an ice-cream manufacturing apparatus capable of flexibly cope with the quantity to be sold, and maintaining normal sales such that when one part of the apparatus has a mechanical accident, another part will serve to compensate for the accident.

For the achievement of this purpose, this invention comprising a mix tank for storing a liquid mix, a freezing cylinder having an inlet port to receive the liquid mix into the inside of it, an agitating means to agitate the liquid mix received into the inside, and a dispensing port to dispense the ice cream prepared in the inside, a liquid mix supply means for supplying the liquid mix from the mix tank to the inlet of the freezing cylinder, a refrigerating means for refrigerating the freezing cylinder, a temperature control means for controlling the refrigerating means so as to keep the temperature of the ice cream in the freezing cylinder within a prescribed temperature range, a plurality of flavor tanks for storing each of a plurality of liquid flavors, and a plurality of flavor piping for supplying each of liquid flavors from these tanks to the dispensing port in the freezing cylinder, is characterized by a plurality of the freezing cylinders, connecting means capable of freely connecting said plurality of flavor piping with the dispensing ports of the plurality of the freezing cylinders, and controlling means for selecting freely and operating said freezing cylinders and the flavor piping to be connected thereto.

According to this structure, since the number of the freezing cylinders to be used can be selected freely correspondingly to the amount of sales, and at this time, all the flavor piping can be connected to a selected freezing cylinder, such inconvenience as limits the kinds of flavors to be added will be eliminated. In addition, when one of the freezing-cylinder systems gets out of order in terms of mechanisms or control functions, such system can be replaced by another normal one so that it can be realized to continue operating the apparatus without a halt of sales.

In this case, a desirable standard model of such apparatus may comprise two freezing cylinders and four lines of the flavor piping.

A further object of this invention is to provide an ice-cream manufacturing apparatus capable of forming large-particle ice crystals in a short time.

For the achievement of this purpose, this invention relates to an apparatus comprising a mix tank for storing a liquid mix, a freezing cylinder having an inlet port to receive the liquid mix into the inside of it, an agitating means to agitate the liquid mix received into the inside, and a dispensing port to dispense the ice creams prepared in the inside, a liquid mix supply means for supplying the liquid mix from the mix tank to the inlet of the freezing cylinder, a refrigerating means for refrigerating the freezing cylinder, a temperature control means for controlling the refrigerating means so as to keep the temperature of the ice creams in the freezing cylinder within a prescribed temperature range, characterized by operating means for operating the refrigerating means at the time of an initial refrigerating operation after ice-cream materials are supplied to the freezing cylinder so that a refrigerating temperature lower than that produced through usual refrigerating operations results.

According to this structure, it is possible to form large-particle ice crystals without conventionally-carried-out heating operations, to shorten a lead time for starting usual refrigerating operations, and to speed the start of sales activities at the opening of the store by the fact that the temperature of the refrigerated cylinder at the time of a pull-down operation is lowered below that provided through usual refrigerating operations.

In this case, it is desirable to provide the agitating apparatus with a blade to scratch off the frozen liquid mixes on the plate surface in the freezing cylinder so as to be able to refrigerate the inside of the freezing cylinder effectively.

BRIEF DESCRIPTION OF THE DRAWINGS

FIGS. 1A and 1B illustrate an embodiment of an ice-cream shake preparing apparatus of this invention; FIG. 1A is a schematic front view showing the main machinery arrangement, and FIG. 1B is its side view.

FIGS. 25A(a), 25A(b), 25B(a), 25B(b), 26A(a), 26A(b), 26B(a), 26B(b), 26C(a), 26C(b), 2D(a), 26D(b) are flowcharts showing an automatic-washing and a hot-water-sterilizing operation, respectively.

DETAILED DESCRIPTION OF THE PREFERRED EMBODIMENT

Figure 1B:
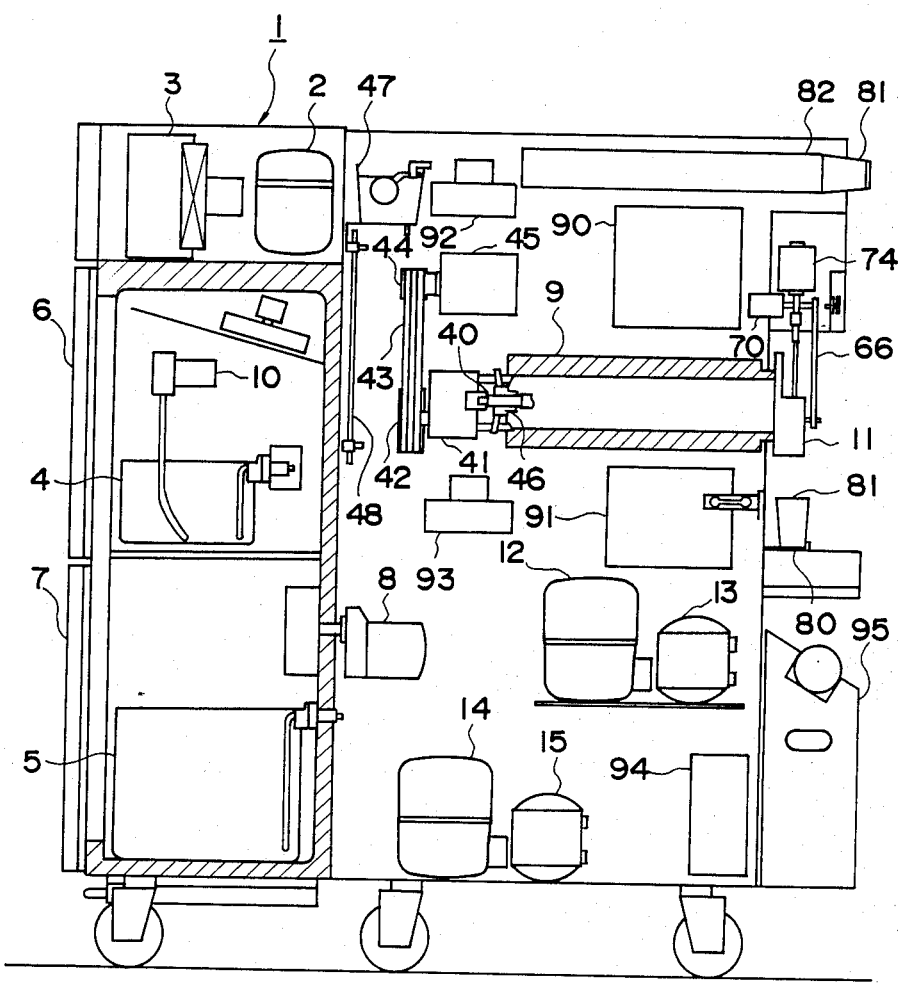

The exemplary embodiments of this invention will be described in the following with reference to the accompanying drawings:

FIG. 1A is a schematic front view of the main machinery arrangement of an ice-cream shake preparing apparatus according to one embodiment of this invention. FIG. 1B is a side view of the ice-cream shake preparing apparatus, in which the refrigerator 1 is located in the rear of the apparatus. The compressor 2 and condenser 3 are located in the upper part of the refrigerator such that the cold air that is generated by compressing and expanding refrigerants is sent into the inside of the refrigerator. The inside is separated into two upper and lower stages. The four different flavr (syrup) tanks, received into the upper stage, and the mix tank 5 that contains main materials for an ice-cream shake, received into the lower stage, can be taken out freely by opening and shutting the doors 6 and 7, respectively.

Figure 2A:
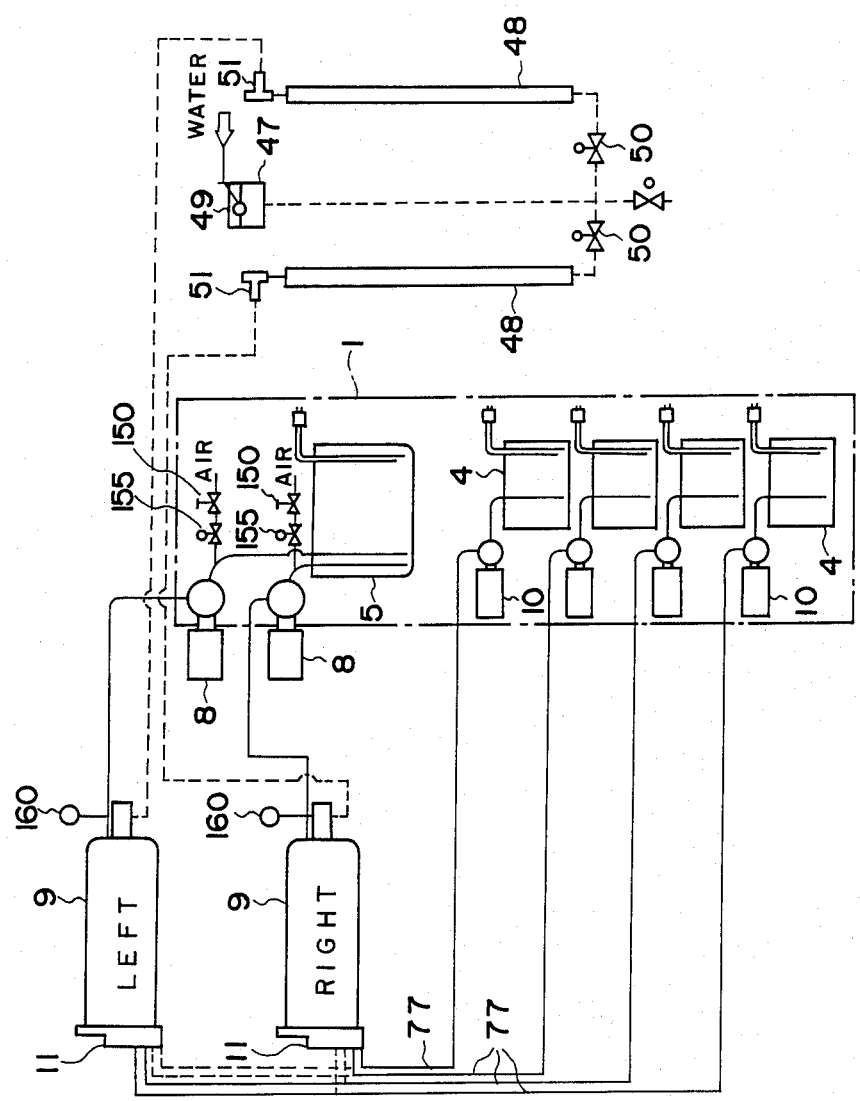
FIG. 2A is a schematic showing a piping arrangement for supplying liquid mixes, flavors, and hot water to the freezing cylinder shown in FIG. 1B
Figure 2:
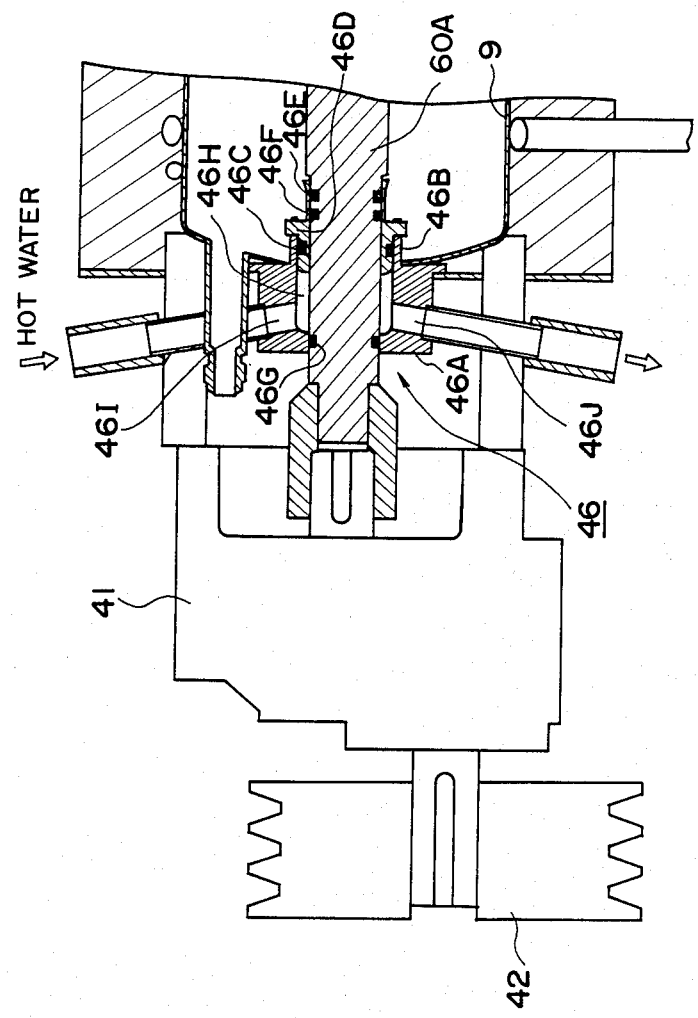
FIG. 2B is a detailed diagram showing the shaft sealing part of the freezing cylinder.

As can be seen from FIGS. 2A and 2B a liquid mix in the mix tank 5 is fed via the mix pump 8 into the inside of the freezing cylinder 9 located in the front part of the apparatus from its rear part so that the liquid mix is turned into an ice cream after being refrigerated and agitated. The liquid flavors in the flavor (syrup) tanks 4 are fed via the flavor pumps 10 into the freezer door 11 located in the front part of the freezing cylinder. In the freezer door, the liquid flavors are added to the refrigerated-and-agitated ice creams, and the flavor-added ice creams are shaked and poured into a paper cup.

Figure 3:
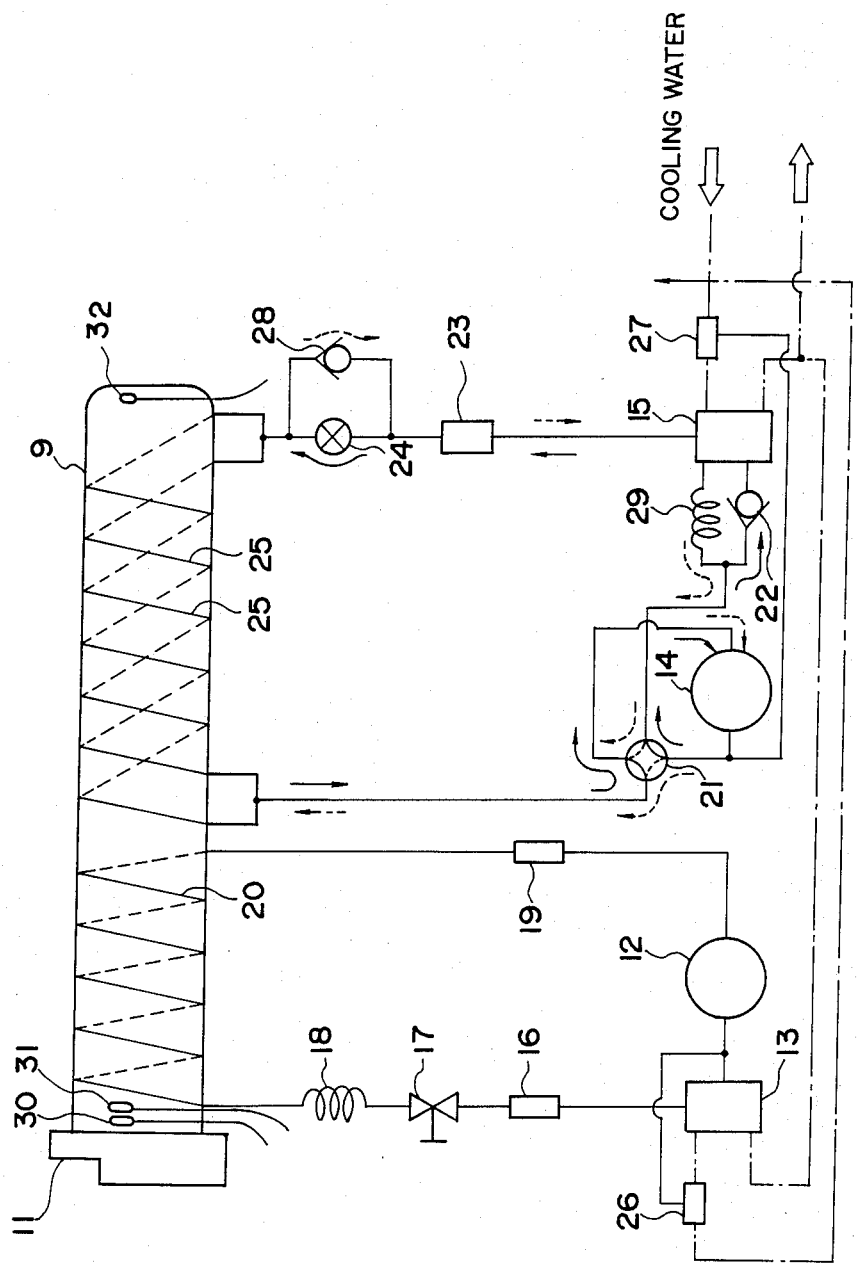
FIG. 3 is a schematic illustrating a piping arrangement for circulating heating media to refrigerate and heat the freezing cylinder.

Referring to FIG. 3, while the front part of the freezing cylinder 9 is refrigerated by the front compressor 12 and front condenser 13, the rear part of it is refrigerated by the rear compressor 14 and the rear condenser 15.

That is, as shown in FIG. 3, the refrigerant piping 20 that completes a loop comprising the front compressor 12 front condenser 13, dehydrator 16, refrigerating magnetic valve 17, capillary 18, and header 19 is wound around the outer surface of the front part of the freezing cylinder. As to the rear part, the double refrigerant piping 25 that completes a loop comprising the rear compressor 14, four-way valve 21, check valve 22, rear condenser 15, dry core 23, and expansion valve 24 is wound in parallel around the outer surface of the rear part of the freezing cylinder. Cooling water is fed via the water-saving valves 26 and 27, the opening degree of which is controlled by the discharge quantity of the compressors 12 and 14, to the condensers 13 and 15 in each of the refrigerating systems.

For the sterilization treatment of the inside of the rear part of the freezing cylinder 9, the check valve 28 is placed in parallel to the expansion valve 24, and the capillary 29 is placed in parallel to the check valve 22 so that the freezing cylinder is heated by changing the flow of refrigerants through the four-way valve. Also, in the front part of the freezing cylinder 9, the front-temperature sensor 30 for detecting the temperatures at the time of refrigerating operations and the thermal-death-point sensor 31 for detecting the temperatures at the time of sterilizing operations, and in the rear part of the freezing cylinder 9, the rear-temperature sensor 32 for detecting the temperatures at the time of refrigerating operations, are placed, respectively.

Referring to FIG. 1B, a beater (not shown) for refrigerating and agitating a liquid mix put into the cylinder, and mixing air with it is enclosed in the inside of the freezing cylinder 9. The rotating shaft 40 of the beater is connected with the rotating shaft of the beater motor 45 via the gear box 41, pulley 42, endless belt 43, and pulley 44.

The cistern 47 for storing water, and the electric water heater 48 for heating the water fed from it are installed to heat the shaft-sealing part 46 of the rotating shaft 40 at the time of hot sterilizing operations. That is, as shown in FIGS. 2A and 2B, water is stored in the cistern 47, the water level of which is controlled by the ball tap 49, and fed via the supply-electromagnetic valve 50 to the electric water heater 48 to be heated there. The heated hot water is fed via the water-quantity regulator 51 to the shaft-sealing part 46 of the rotating shaft 40 which rotates the beater.

The shaft-sealing part 46 is composed such that the bearing sleeve 46D is fitted, via the O-ring 46C and from the inside of the freezing cylinder 9, in the cylindrical projection 46B of the housing 46A that is inserted into the rear-surface opening of the cylinder 9 and welded there, and three pieces of shaft-sealing O-rings 46E, 46F, and 46G are fitted in the rotating shaft 60A of the beater 60 that passes through the housing 46A and the sleeve 46D, wherein the housing 46A and sleeve 46D function as a bearing. Further, a cavity 46H is formed around the rotating shaft 60A between the sleeve 46D and the O-ring 46G by the housing 46A, the inlet pass 46I that leads the heated hot water to the cavity 46H is formed in the upper part of the housing 46A, and the outlet pass 46J that discharges the hot water is formed in the lower part of it.

Accordingly, at the time of hot-sterilizing operations, hot water is continuously fed to the cavity 46H from the electric water heater 48 via the inlet pass 46I, and touches the rotating shaft 60A. Thus the shaft sealing part 46 is sufficiently sterilized. The hot water is discharged through the outlet pass 46J after touching the shaft.

Figure 4:
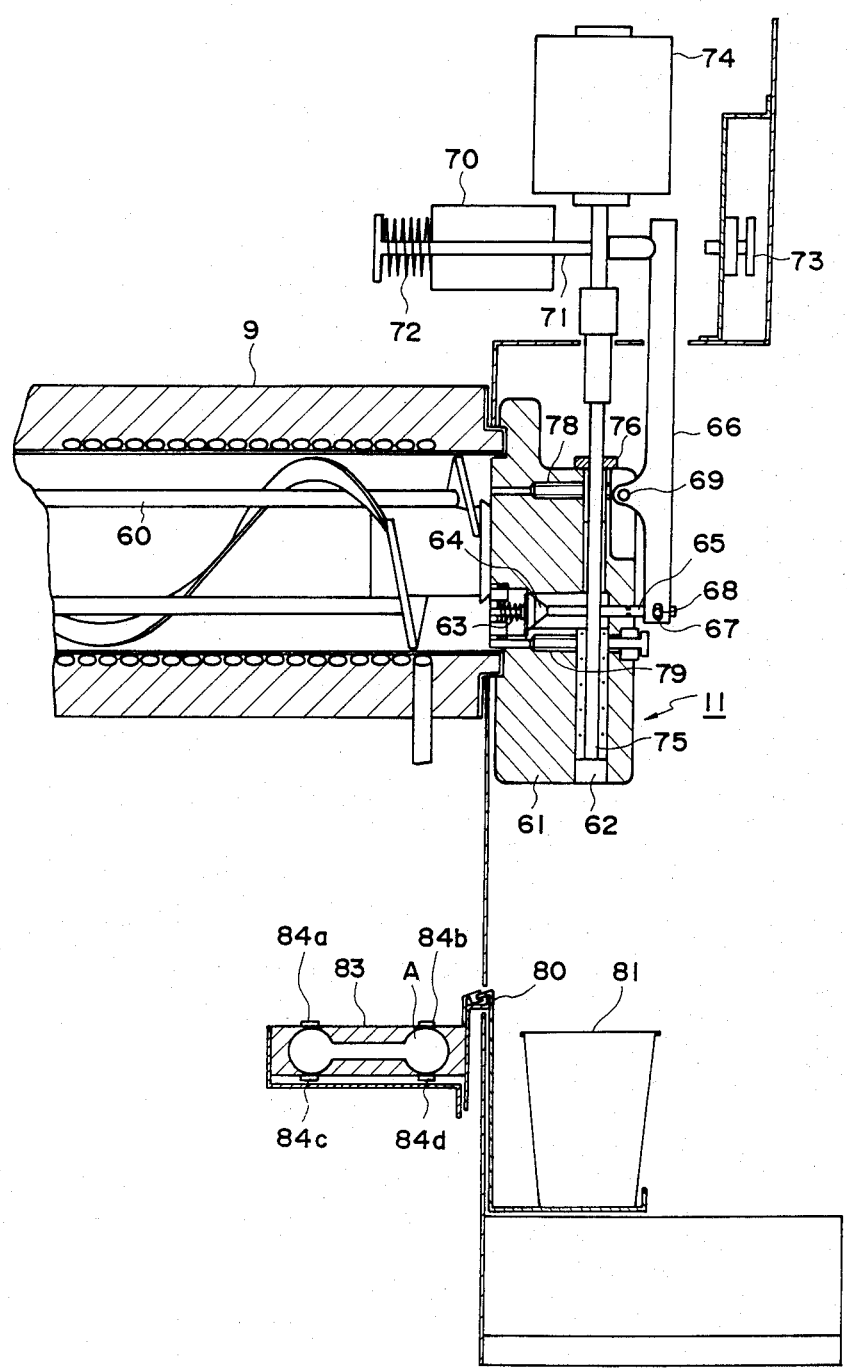
FIG. 4 is a sectional view showing the structure of an ice-cream dispensing port and a weighing part.

The freezer door 11 that is installed in the front part of the freezing cylinder 9 as detailed in FIG. 4 is prepared such that the mix path 62 for pouring out the ice cream pressed out by the rotation of the beater 60 that is enclosed in the inside of the freezing cylinder 9 is formed in the block 61 that shuts up the inside of the cylinder. The beater 60 that has a blade abutting against the inside wall of the freezing cylinder 9 scrapes off the ice creams stuck to the inside wall of the cylinder through the rotation of the blade. Thus the inside of the freezing cylinder 9 is efficiently refrigerated. The mix pass 62 is perpendicular to the horizontal path communicating with the inside of the freezing cylinder 9, in which horizontal path, the door valve 64 for blocking the path through the pushing force exerted by the spring 63 is installed. The pointed end of the valve 64 is coupled with the front end of the push pin 65, and the rear end of the pin is coupled with the idle pit formed in one end of the lever 66 via the pin 68. The lever is rotatably pivoted on the pin 69 that is planted on the shut-up block 61, and the other end is coupled with the right end of the rod 71 that is the movable iron core of the solenoid 70. When the solenoid 70 is in an off state, the rod is pulled into it so that the length of its projected-end part is minimum. Hence, in this state, the door valve 64 is pressed out by the spring 63 so as to close the mix path 62. When the solenoid 70 is in an "on" state, the rod 71 is thrust out against the force of the spring 72 such that the lever pivots on the pin 69 until the other end of it abuts on the end of the opening-degree-adjusting nut 73. This pivotal movement cause the push pin 65 to push down the door valve 64 against the force of the spring 63 so as to open the mix path 62.

The spinner shaft 75 that is mounted on the rotating shaft of the spinner motor 74 is inserted into the perpendicular mix path 62 via the spinner bearing 76.

Figure 5:
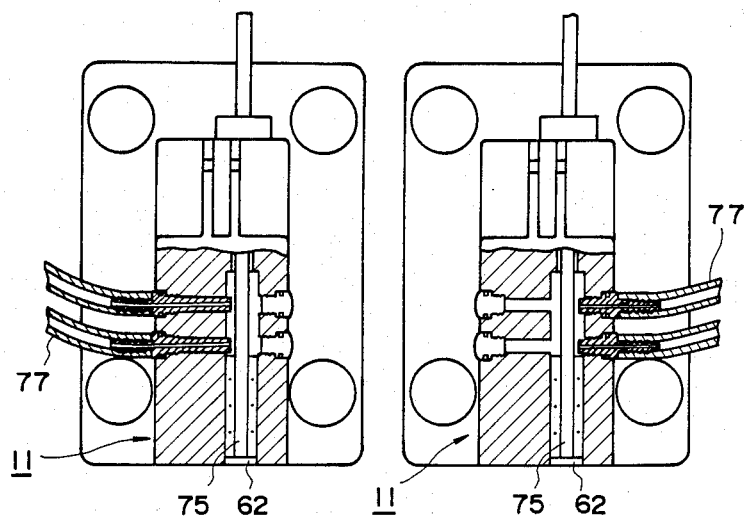
FIGS. 5 and 6 are illustrative cross sections showing the state of the connection between ice-cream dispensing ports and flavor tubes.

As already mentioned above, since two freezing cylinders 9 are installed, also there are two freezer doors 11, wherein four kinds of liquid flavors as shown in FIG. 5 are fed, two kinds at a time, to the perpendicular mix path 62, from the flavor (syrup) tank 4 via the flavor tubes 77. There is no doubt that since four flavor tubes 77 can be mounted on the perpendicular mix path 62, the four flavor tubes as shown in FIG. 5 can be connected with one freezer door 11 when one of the freezing cylinder 9 is stopped.

As shown in FIGS. 1A, 1B and 4, the cup table 80 is installed below the freezer door 11. A paper cup is placed on the table so that it receives an ice-cream shake comprising an ice cream poured out from the mix path 62 and a flavor added thereto. Many of this paper cup 81 that can be taken out freely are accommodated in the cup dispenser 82 installed in the upper front part of the apparatus.

Figure 7:
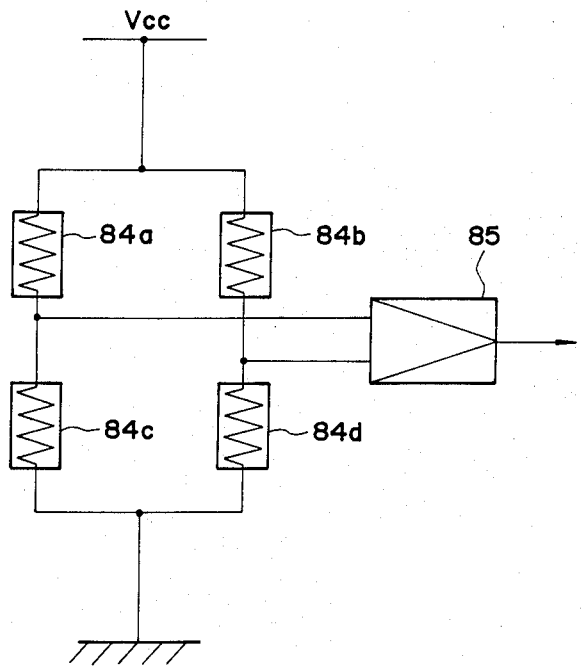
FIG. 7 is a circuit schematic for a detector to pick up weight signals.

The cup table 80 is detachably mounted on one end of the weight-detector 83. The detector as shown in FIG. 4 is made such that an area designated as A is stamped out from a block, such as one made of an aluminum alloy, to form four thin-thickness parts, the distortion sensors 84a–84d are affixed to the thin parts, and the other end of the block is fixed to the apparatus. Each of the sensors is connected in bridge as shown in FIG. 7, the output of which is taken out as a weight-detecting signal via the differential amplifier 85.

Referring again to FIG. 1B, the operating panels 100, 101, and 102 are installed below the cup dispenser 82 in the front part of the apparatus, which accommodates paper cups 81.

Referring again to FIG. 1A, the temperature-control box 90, weight-control box 91, inside-cooling fan 92, unit-cooling fan 94, electric-accessory box 94, and drain-receiving box 95 or the like are installed in the front part of the apparatus.

Figure 8:
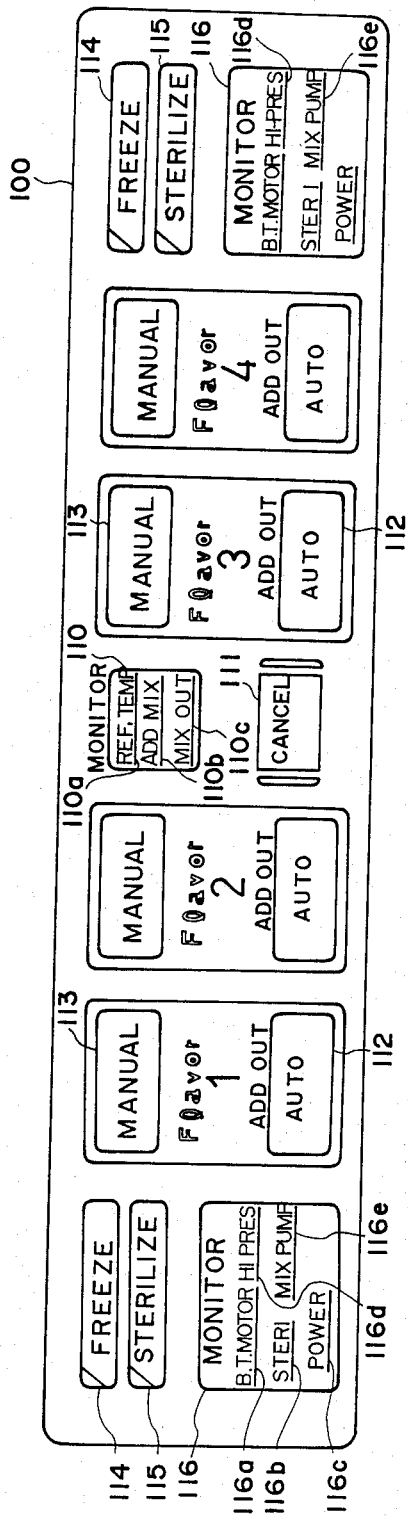
FIGS. 8, 9, and 10 are illustrative diagrams showing indication-operating panels to be installed in the front part of the ice-cream shake preparing apparatus shown in FIG. 1.

As mentioned previously, the apparatus of this embodiment comprises two freezing cylinders. Therefore, the operating panel 100 as shown in FIG. 8 comprises two pairs of switches and indicators with the same functions, arranged on both sides of the monitor indicator 110 and cancel switch 111 located in the center. The indicating part 110a of the monitor indicator 100 is lit up when the inside temperature of the refrigerator 1 has been kept at 10° C. or more for at least 60 minutes. The indicating part 110b is lit up when a not much liquid mix remains. The indicating part 110c is lit up when no liquid mix remains.

When the automatic switch 112 is pushed, a cup of shake with a flavor corresponding to it is automatically weighed and poured out. When the manual switch 113 is being pressed, a shake with a flavor corresponding to it is continuously poured out. The refrigeration lamp 114 goes on and off during refrigeration (either the front compressor 12 or rear compressor 14 is operating), and it is lit when they stand ready for refrigeration. The sterilization lamp 115 is lit when sterilizing operation 1 or 2 is carried out. The indicating part 116a in the monitor indicator 116 is lit up when the heater-motor thermal relay works so as to step refrigerating the freezing cylinder 9, and makes it impossible to dispense ice creams. The indicating part 116b is lit up when there is a trouble in hot-water-washing and sterilizing processes. The indicating part 116c is lit up when a power failure occurs. The indicating part 116d is lit up when the high-pressure switch of the refrigerating unit works to stop refrigerating operations. The indicating part 116e is lit up when the mix-feeding pump has a failure to stop dispensing operations.

Figure 9:
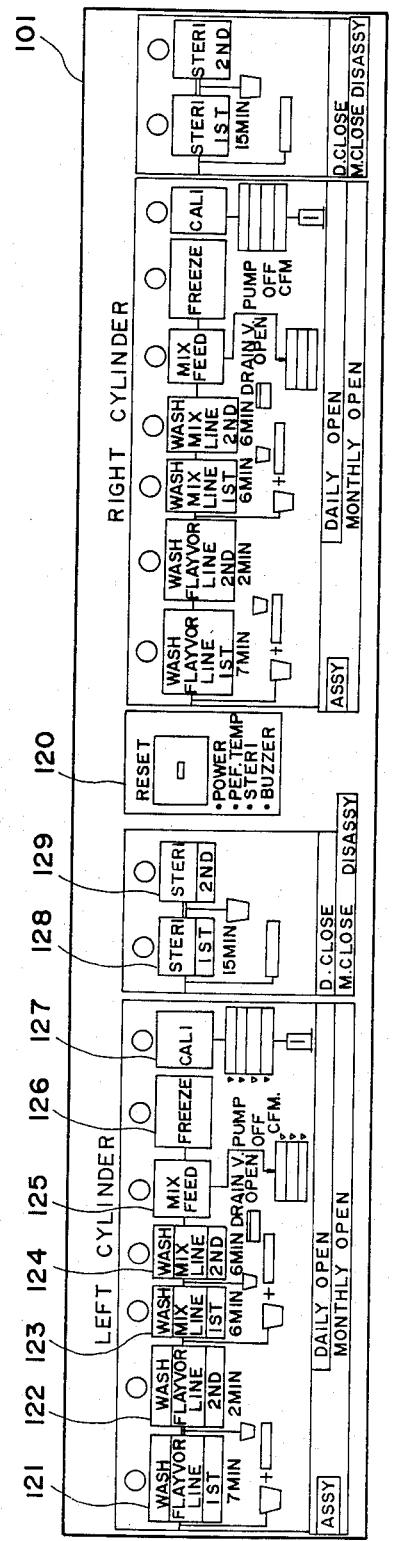

Also, the operating panel 101 as shown in FIG. 9 comprises two pairs of switches and indicators having the same functions, which are arranged on both sides of the reset switch located in the center. This reset switch 120 is for releasing an alarm lamp and a buzzer that are operated through electronic circuits. Switches to be arranged on both sides of this reset switch 120 comprise the first-flavor-line-washing switch 121 for starting washing and sterilizing each of the flavor lines including respective flavor pumps 10, the second flavor-line-washing switch 122 for starting rinsing the flavor lines, the first mix-line-washing switch 123 for starting washing and sterilizing the mix line including the mix pump 8, the second mix-line-washing switch 124 for starting rinsing the mix line and the freezing cylinder 9, the mix switch 125 for starting precharging a liquid mix into the freezing cylinder 9, the freezing switch 126 for starting refrigerating the freezing cylinder 9, the calibrating switch 127 that is used for initializing the weight of ice-cream shakes and for examining the quantity of flavors, the first sterilizing switch 128 for thawing and automatically discharging the ice creams in the freezing cylinder 9, and the second sterilizing switch for carrying out hot-water sterilization and washing.

Figure 10:
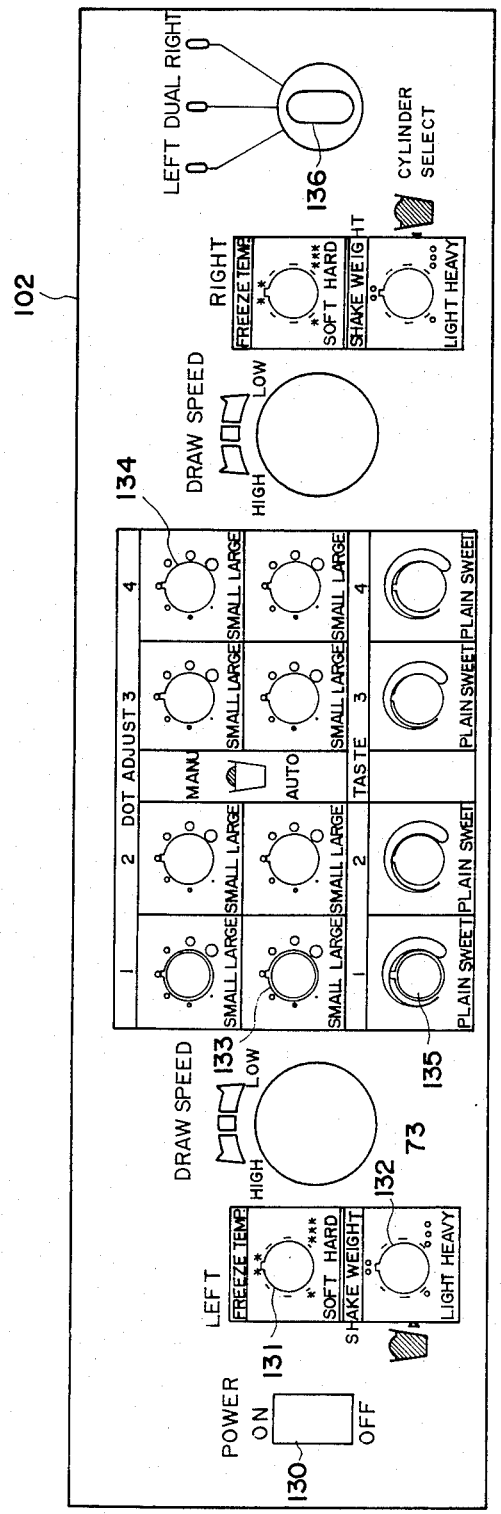

The operating panel 102 as shown in FIG. 10 comprises the power switch 130, the volume 131 for setting the temperature of ice-cream shakes, the volume 132 for adjusting the total weight of the ice-cream shakes when it is automatically dispensed through the operation of the automatic switch 112 on the operating panel 100, the adjusting screw 73 for adjusting the speed of dispensing ice-cream shakes by regulating the opening degree of the door valve 64 as explained previously regarding FIG. 4, the volume 133 for adjusting the quantity of dots, that is, a small amount of an ice cream alone that is finally put out to clean the mix path 62 in the freezer door 11 when ice-cream shakes are automatically dispensed, also the volume 134 for adjusting the amount of the dots when it is manually dispensed, the volume 135 for adjusting the flavor quantity to be added to ice creams, and the cylinder-selecting switch 136 for selecting the two freezing cylinders or either of them.

Figure 11:
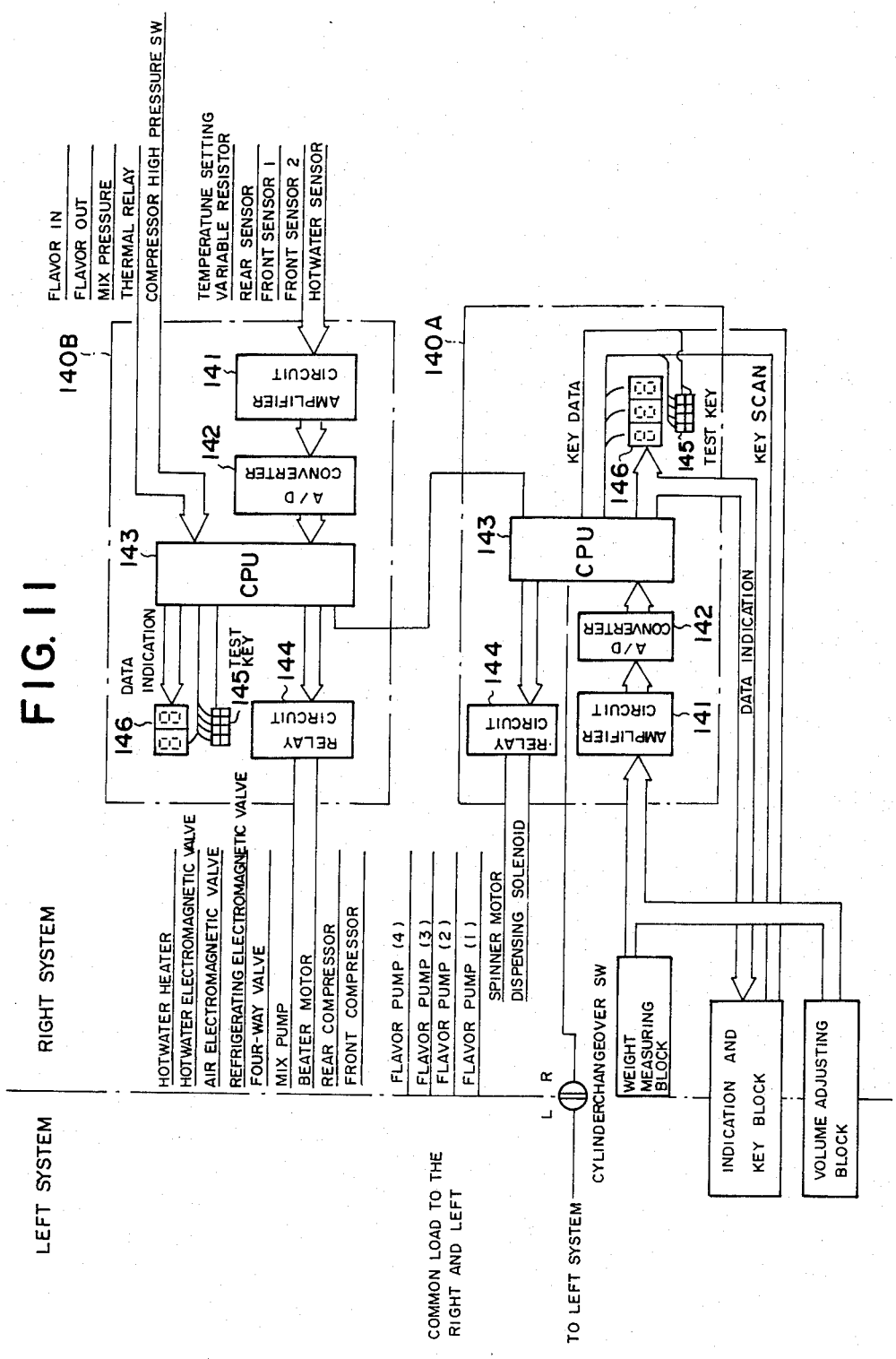
FIG. 11 is a circuit schematic corresponding to the right system part of the control part of the ice-cream shake preparing apparatus shown in FIG. 1.

FIG. 11 shows a schematic diagram of the system-control means installed in the ice-cream-preparing apparatus of an embodiment of this invention. There are two system control means that correspond to the two freezing cylinders 9 to be installed in the right and left of an ice-cream-preparing apparatus when looked at front ways. However, FIG. 11 shows only a right, and a left is omitted. Such unit control means further comprises the two control blocks 140A (also named as base panel A) and 140B (also named as base panel B). Each of these control blocks 140A and 140B comprises the amplifier circuit 141, the A-D converter 142 for converting the analog output signals of the amplifier circuit 141 into digital signals, the CPU (central processing unit) 143 for outputting commands to drive or stop machinery, indicating signals, and the like by performing processes corresponding to the converted digital signals, the relay circuit 144 for actually controlling the pumps or the like correspondingly to such commands to drive or stop machinery, the various kinds of test keys 145, and the indicators 146.

The operations of the ice-cream-shake-preparing apparatus to be composed as mentioned above will be explained as follow:

When each of the two freezing cylinders 9 installed in the preparing apparatus is connected with the two flavor tubes 77 as shown in FIG. 5, and the cylinder-selecting switch 136 on the operating panel 102 shown in FIG. 10 is set at Dual, they can be controlled correspondingly to switching operations by operating the switches on the operating panels 100–102 related to the controls of the cylinders. Further, if it is desired to operate only one of the two cylinders, desired control operations of the selected freezing cylinder 9 can be carried out by connecting the flavor tubes 77 with the selected cylinder, turning the cylinder selecting switch 136 to the right or left, and operating the switches on the operating panels 100–102 in the same way as mentioned above.

For example, when you want to operate both the right and left cylinders, each of the right and left freezer doors 11 is connected with the two flavor tubes 77. When the changeover switch 136 is then set at Dual, the changeover switch 136 will output right and left signals for the control blocks 140A of right and left systems, respectively. Hence, it is fixed for the left system to control the flavor pumps 1 and 2, and for the right system to control the flavor pumps 3 and 4. Also, it is fixed that the left system controls the exclusively-left-refrigerating unit to refrigerate the left freezing cylinder 9, and the exclusively-left-mixing pump to supply liquid mix to the left cylinder 9, and that the right system controls the exclusively-left-refrigerating unit to refrigerate the right freezing cylinder 9, and the exclusively-right mixing pump 8 to supply liquid mix to the right cylinder 9.

Figure 6:
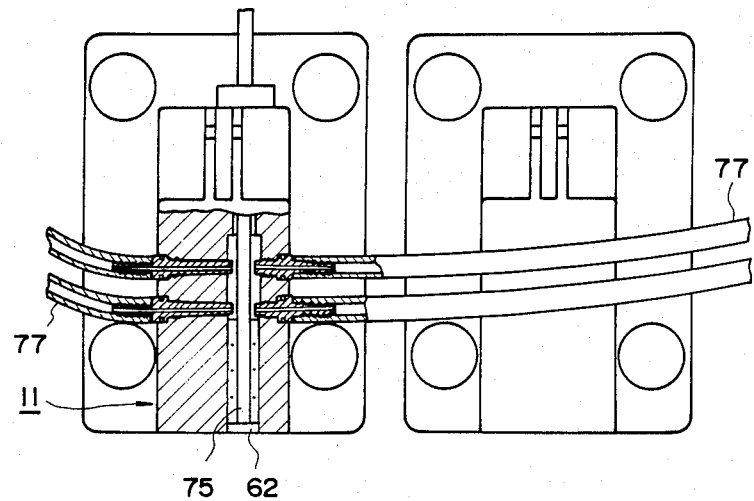

When you want to operate only the left freezing cylinder 9, four flavor tubes 77 are connected to the left freezer door 11 as shown in FIG. 6. Then, when the changeover switch 136 is turned to the left, the changeover switch 136 will output single signals for the control of the left system. Hence, it is fixed that the left system controls all the flavor pumps, which are a common load to the right and left, and that the exclusively-left-refrigerating unit to refrigerate the left freezing cylinder 9, and the exclusively-left-feeding Mix pump 8 to supply a liquid mix to the left cylinder 9. When the changeover switch 136 outputs single signals for the control block of the left system, the control block 140A of the right system outputs a stop signal for the control block of the same system so that the function of the control block 140B of the right system as well as that of itself stops. Accordingly, all the operations against an exclusively right load is stopped. That is, the exclusively-right-refrigerating unit never refrigerates the right freezing cylinder 9, and the exclusively-right-feeding Mix pump 8 never supplies a liquid mix to the right freezing cylinder 9.

When you want to operate only the right freezing cylinder 9, it is understandable how to do it on the basis of the above-mentioned explanations, so detailed explanations are omitted.

As clarified above, it is possible to operate the apparatus in a manner flexibly corresponding to the sales amount of ice-cream shakes by operating both the freezing cylinders 9 during summer when the sales quantity of ice-cream shakes increases, and by operating either of the cylinders 9 in winter when the sales quantity decreases.

Further, when mechanical troubles or accidents occur in freezing cylinder systems or system control apparatuses, it is possible to continue selling ice-cream shakes by providing two freezing cylinder systems as provided in an embodiment of this invention. Thus this apparatus can be operated effectively.

The operations of this apparatus can be classified roughly into three categories of operations, namely, operations before opening the store, during business hours, and after closing the store. The first-stage operations are carried out by operating the operating switches 121–127 in order. The switches 121–127 for operating the right and left cylinders are on the operating panel 101 that is arranged in the front part of the apparatus. The second-stage operations, an ice-cream-shake-selling operation, are carried out by appropriately selecting and operating the automatic switches 112 or manual switches 113 on the operating panel 100 for four flavors. The final-stage operations after closing the store are carried out by operating the operating switches 128 and 129 on the panel 101 in order. These operations will be explained one by one as follows:

Before opening the store, prepare a sterilizing-washing agent in the four flavor (syrup) tanks, and push the first-flavor-line-washing switch 121. When this switch is pushed, the timer-2 goes into action and the flavor pumps 10 operates for a certain period of time so that the flavor lines are sterilized and washed by the sterilizing-washing agent prepared in the flavor tanks 4. When the timer-2 stops, the timer-1 begins to work and the flavor pumps are stopped so that the flavor lines are kept connecting with the sterilizing-washing solution for a given time to complete sterilization. After finishing the sterilizing-washing operation, prepare hot water of 60° C. and set it to the intake side of the flavor pump 10, and push the second-flavor-line-washing switch 122. When this switch is pushed, the timer-2 goes into action and the flavor pump is operated for a given time so that the flavor line is rinsed by the prepared hot water.

Incidentally, the waste water after sterilizing, washing, and rinsing the flavor lines is collected in an appropriate drain box and thrown away.

Figure 12A:
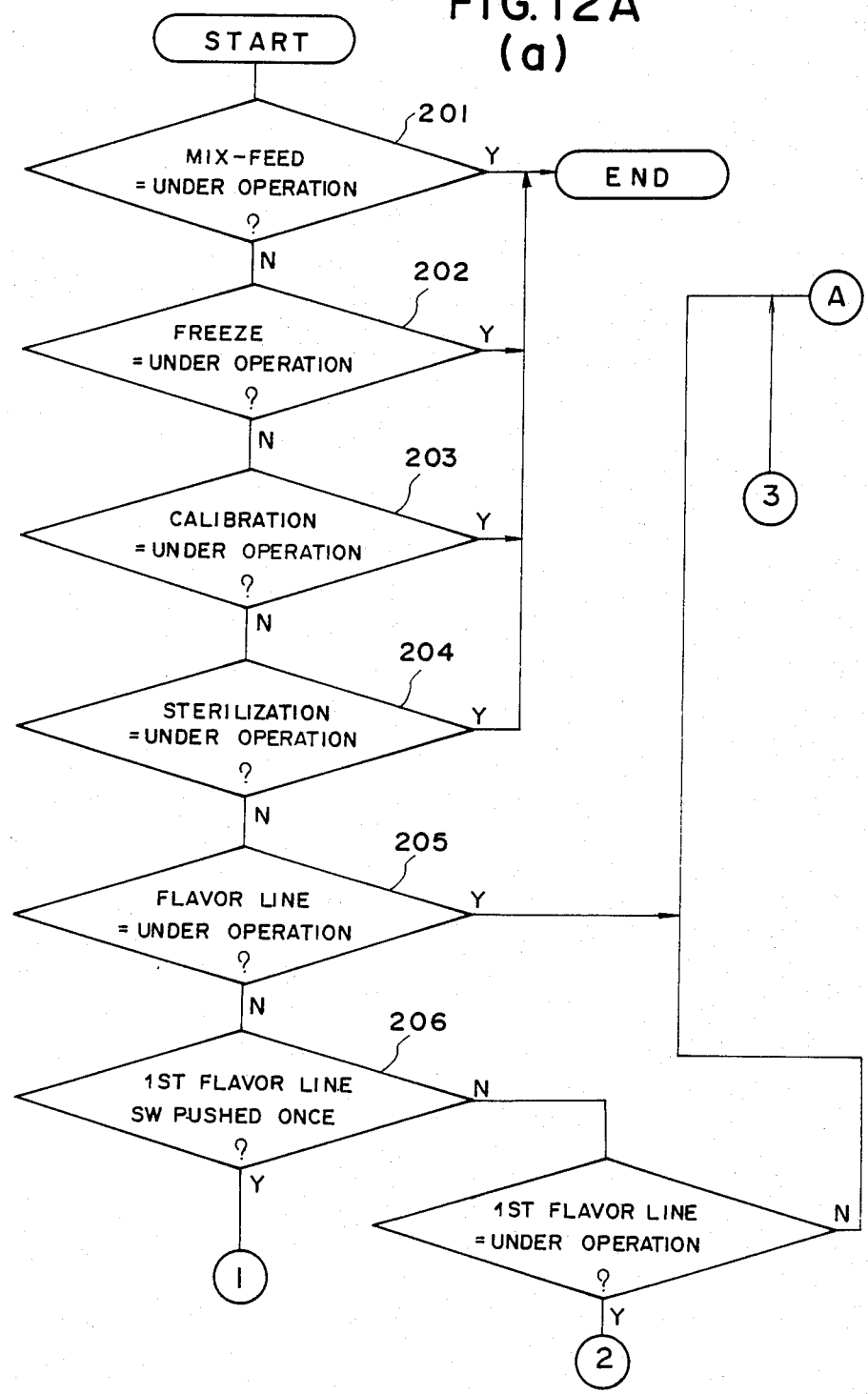
FIGS. 12A(a), 12A(b), and 12B are flowcharts showing flavor-line-washing operations through the control part.
Figure 12B:
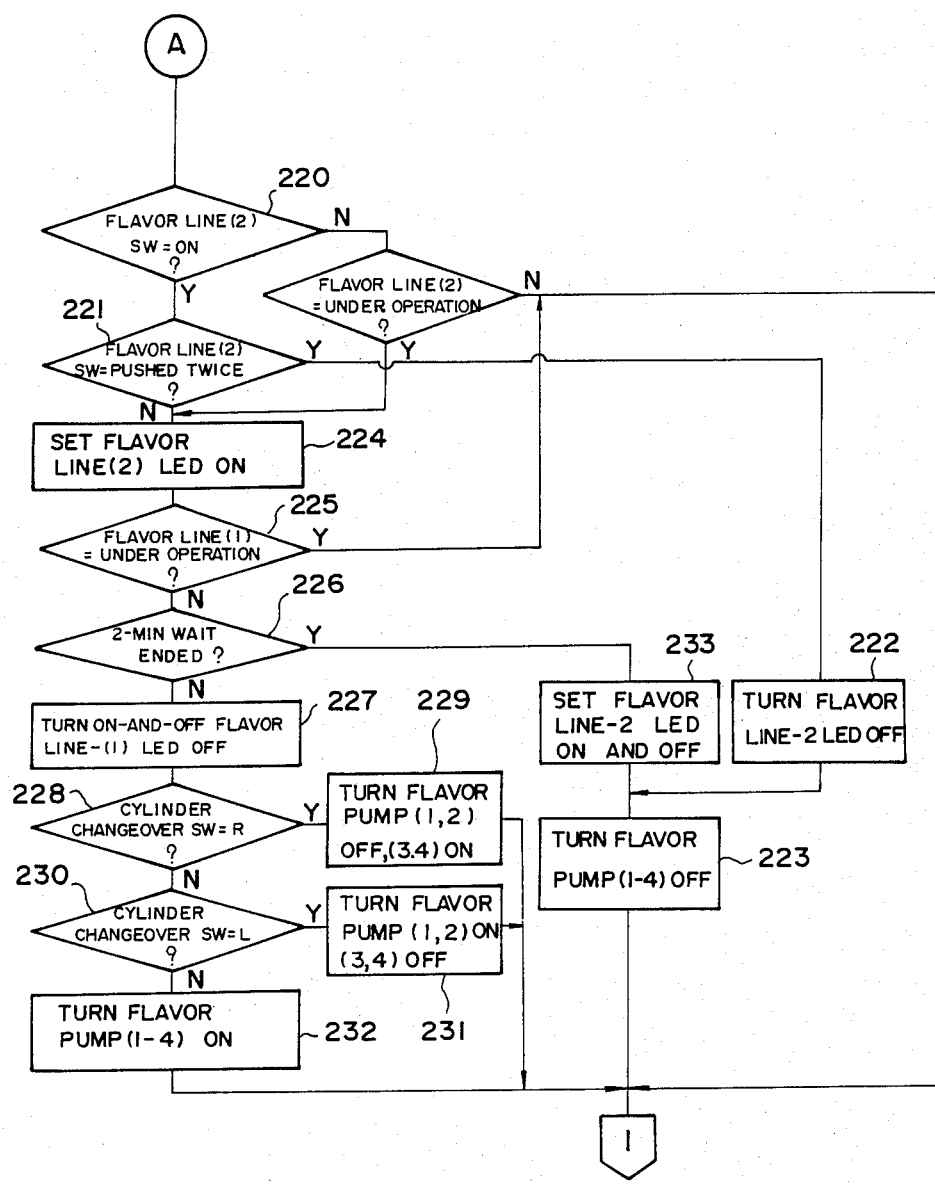
Figure 13:
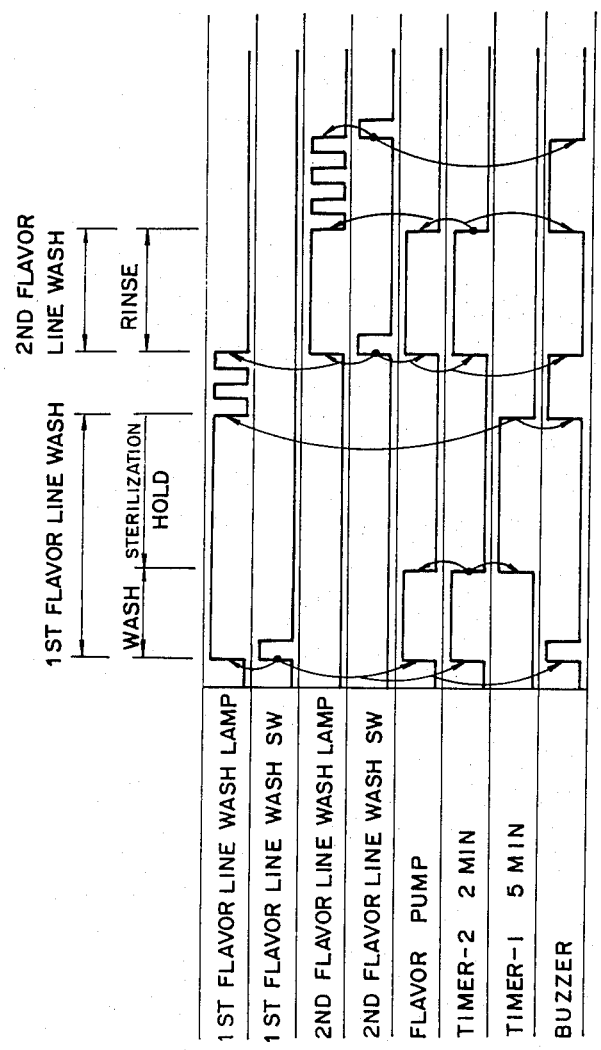
FIG. 13 is a time chart for flavor-line-washing operations.

Above-mentioned operations are carried out through the control block 140A of FIG. 11, and the details of conducting them are shown in the flowcharts of FIGS. 12A(a), 12A(b) and 12B and the time chart of FIG. 13, as will be described below.

When hot water containing hypochlorous acid is set to the intake side of the flavor pump, and the first-flavor-line-washing switch 121 is pushed, each step of processes detailed in flowcharts FIGS. 12A(a), 12A(b) and 12B is automatically executed as follows: It is judged whether a liquid mix is being fed by a flag set for the feeding operation, step 201. If the judgement is no, it is judged whether freezing is operated, step 202. If this is not the case, judgements are formed similarly on calibrating and sterilizing operations, steps 203 and 204. If these are not the case, it is determined whether there is a flag for a second-flavor-line-washing operation, step 205. If this is not the case, it is judged whether the first-flavor-line-washing switch is pushed, step 206. If it has not been pushed, it is judged whether the first-flavor-line is being washed. If it has been pushed, it is judged whether it has been pushed twice, step 207. If this is the case, the LED for indicating a first-flavor-line-washing operation is lit so as to stop the first-flavor-line washing operation, step 208. Flavor-line pumps 1–4 are turned off, step 209. If it is no, the first-flavor-line washing operation is executed, step 210. It is indicated that the first-flavor-line-washing operation has begun by lighting a LED corresponding to the operation, and by putting out LEDs, which are going on-and-off, corresponding to feeding, refrigerating, and first-and-second sterilizing operations, step 211. The two-minute timer is started counting. If the time elapsed is less than two minutes, step 212, it is determined whether the cylinder-turnover switch (R-D-L) is set at Dual, and, the right system is on, step 213. If this is the case, flavor pumps 1 and 2 are stopped, and flavor pumps 3 and 4 are started, step 214. If the switch is set at Dual and the left system is on, step 215, flavor pumps 1 and 2 are started, and flavor pumps 3 and 4 are stopped, step 216. If the switch is not set at Dual, flavor pumps 1-4 are started, step 217. If the time elapsed is over 2 minutes and below 7 minutes, step 212 to 218, flavor pumps 1–4 are stopped, step 209. That is, the difference of five minutes is needed for keeping a sterilizing liquid in flavor lines. When the time elapsed is seven minutes, step 218, the LED for the first-flavor-line washing operation goes on-and-off step 219 to indicate that the first-flavor-line washing and sterilizing operation is finished, and a second-flavor-line washing operation is ready to start. Now, hot water of 60° C. is prepared and set to the intake side of the flavor pump to wash away the hypochlorous acid in the flavor line. When the second-flavor-line washing switch 122 is pushed, it is determined whether the switch has been turned on, step 220. If not pushed, it is determined whether the second flavor line is under wash. If step 220 is the case, it is determined whether the switch has been pushed twice, step 221. If this is the case, the LED for the second-flavor-line-washing operation is turned off to stop the second-flavor-line-washing operation, step 222 and flavor pumps 1-4 are stopped, step 223. If step 221 is not the case, the second-flavor-line-washing operation is executed. The LED for the second-flavor-line-washing operation is lit, step 224. It is determined whether a first-flavor-line-washing operation is being done, step 225. If this is the case, the operation is to be completed. If not, the two-minute timer is started counting, step 226. If the time elapsed is two minutes, the LED for the second-flavor-line-washing operation goes on-and-off, step 233, and flavor pumps 1-4 are stopped, step 223. If step 226 is not the case, the LED going on-and-off to indicate the first-flavor-line-washing operation is put out, step 227. It is determined whether the cylinder turnover switch (R-Dual-L) is set at Dual, and, the Right system is on, step 228, flavor pumps 1 and 2 are stopped, and flavor pumps 3 and 4 are started, step 229. If the switch 136 is set at Dual, and the left system is on, step 230, flavor pumps 1 and 2 are started, and flavor pumps 3 and 4 are stopped, step 231. If the switch is not set at Dual, flavor pumps 1-4 are started, step 232.

After the flavor lines have been washed thus, a liquid containing a sterilizer and a wash is prepared similarly in the mix tank 5, and the first-mix-line-washing switch 123 on the operating panel 101 is pushed. When this switch is pushed, the mix pump 8, which feeds a liquid mix to the cylinder (for example, the left cylinder) corresponding to the switch, is actuated, and at the same time, as shown FIGS. 2A and 2B the air-electromagnetic valve 155 for intaking air via the needle valve 150 is actuated so that the sterilizer containing liquid prepared in the mix tank 5 is supplied to the freezing cylinder 9. At this time, the pressure in the freezing cylinder 9 is detected through the pressure switch 160 (see. FIGS. 2A and 2B installed just in front of the cylinder 9, and when the pressure reaches a preset level, the mix pump 8 and air-electromagnetic valve 155 stop. Simultaneously with this, the timer-1 is actuated, and the beater motor 45 operates for a given time. Thus the germicidal agent is kept contacting with the inside of the mix line and freezing cylinder 9 for a prescribed period of time. When timer-1 stops, timer-2 is started to actuate the solenoid 70, and the valve 64 in the freezer door 11 is opened via the valve 66 that is operated through the solenoid 70 to discharge the waste liquid in it.

After sterilizing and washing the mix line, a rinse is prepared in the mix tank 5, and then the second-mix-line-washing switch 124 on the operating panel 101 is pushed. When this switch is pushed, the mix pump 8 and air-electromagnetic valve 155 are actuated to supply the rinse which is prepared in the mix tank 5 to the freezing cylinder 9. The mix pump 8 and air-electromagnetic valve 155 are stopped by the pressure switch 160. Simultaneously with this, timer 2 is started to activate the beater motor 45 and solenoid 70 so that the liquid in the freezing cylinder is discharged while being agitated. This supply-and-discharge operation is repeated three times. Upon the last (the third) discharge the pressure switch 160 is turned on to activate the feeding pump 8 and air-electromagnetic valve 155 so that the waste liquid in the freezing cylinder 9 is completely discharged. After the solenoid 70 and beater motor 45 are stopped by the lapse of timer-2, the feeding pump 8 and air-electromagnetic valve 155 continue operating until the pressure switch 160 is turned off so that the pressure in the freezing cylinder 9 is increased by the intake of air. The purpose of this is to facilitate the discharge of the remained liquid at the bottom of the freezing cylinder 9 when the drain valve 64 of the freezer door 11 is opened.

Figure 14A:
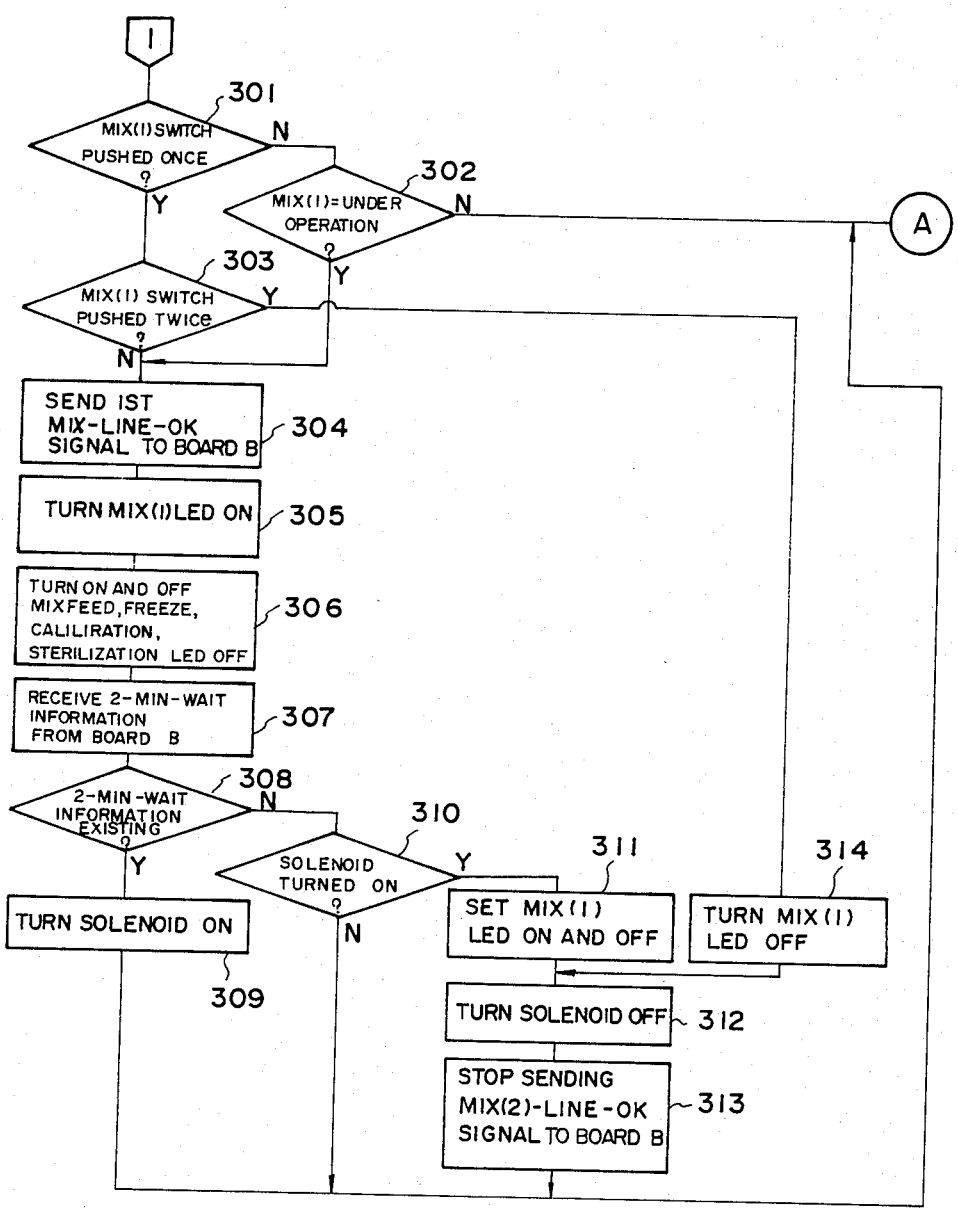
FIGS. 14A and 14B, and 14B, and 15A(a), 15B(a), 15B(b) and 15C flowcharts showing mix-line-washing operations.
Figure 14B:
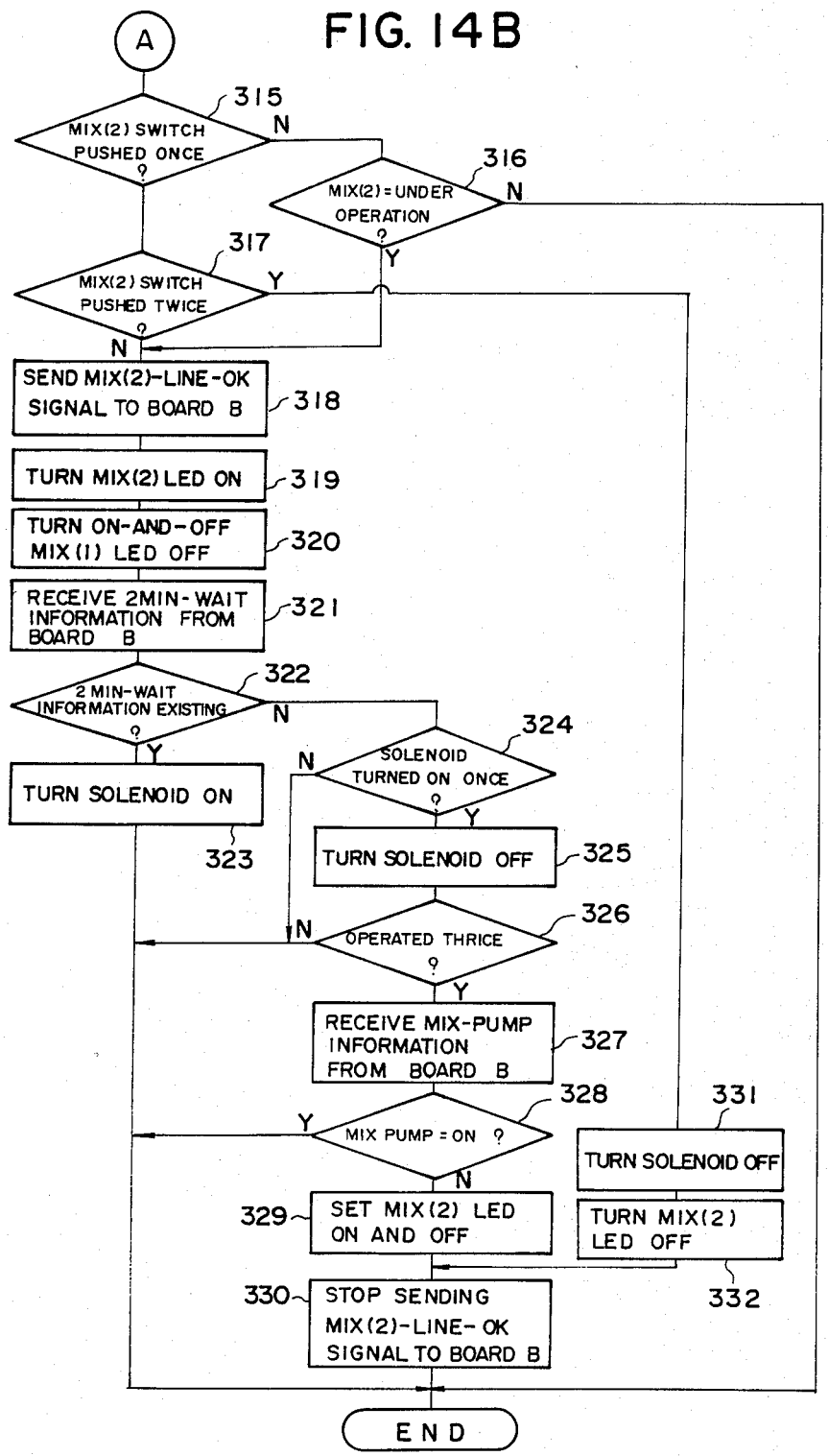
Figure 15A:
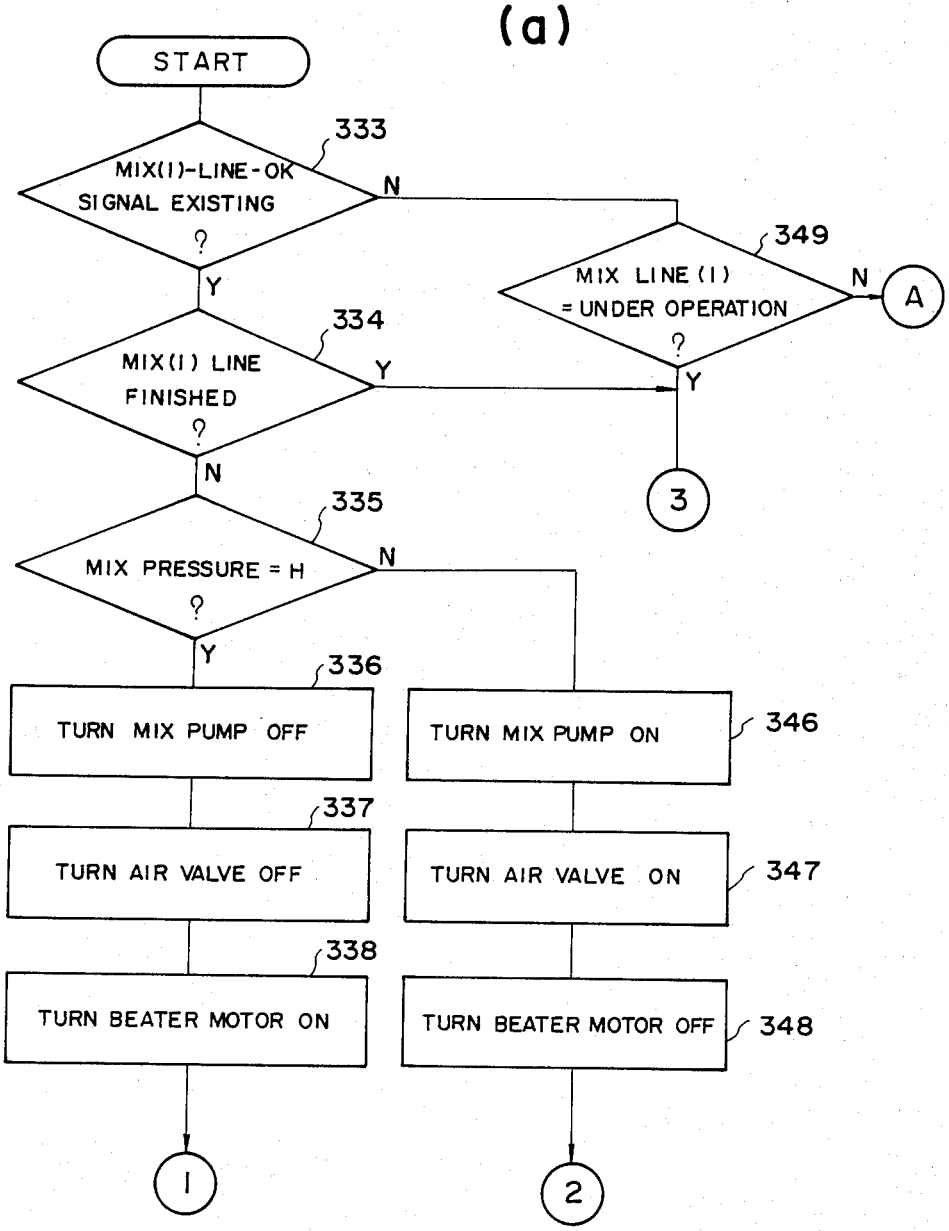
Figure 15B:
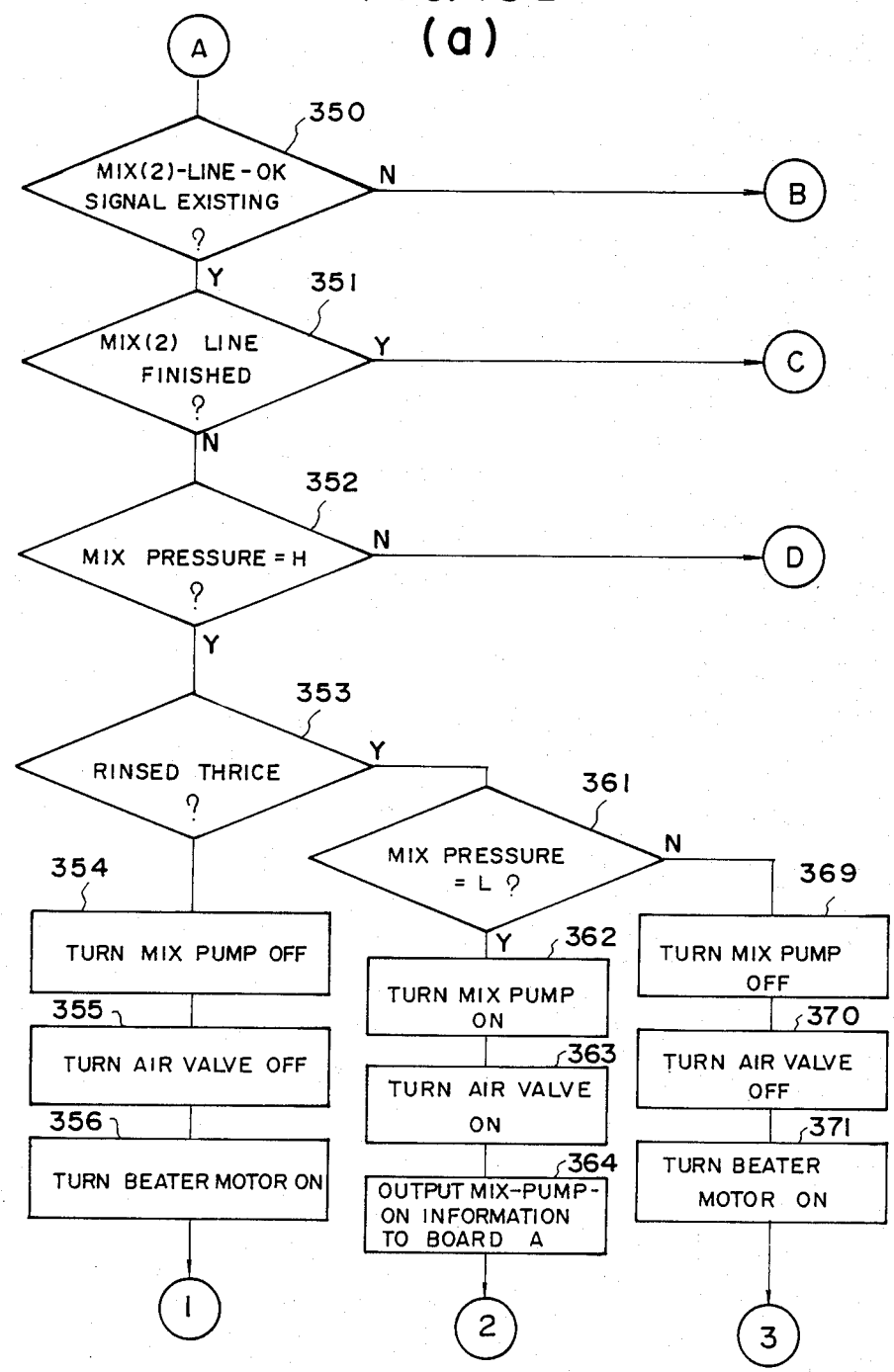
Figure 15B:
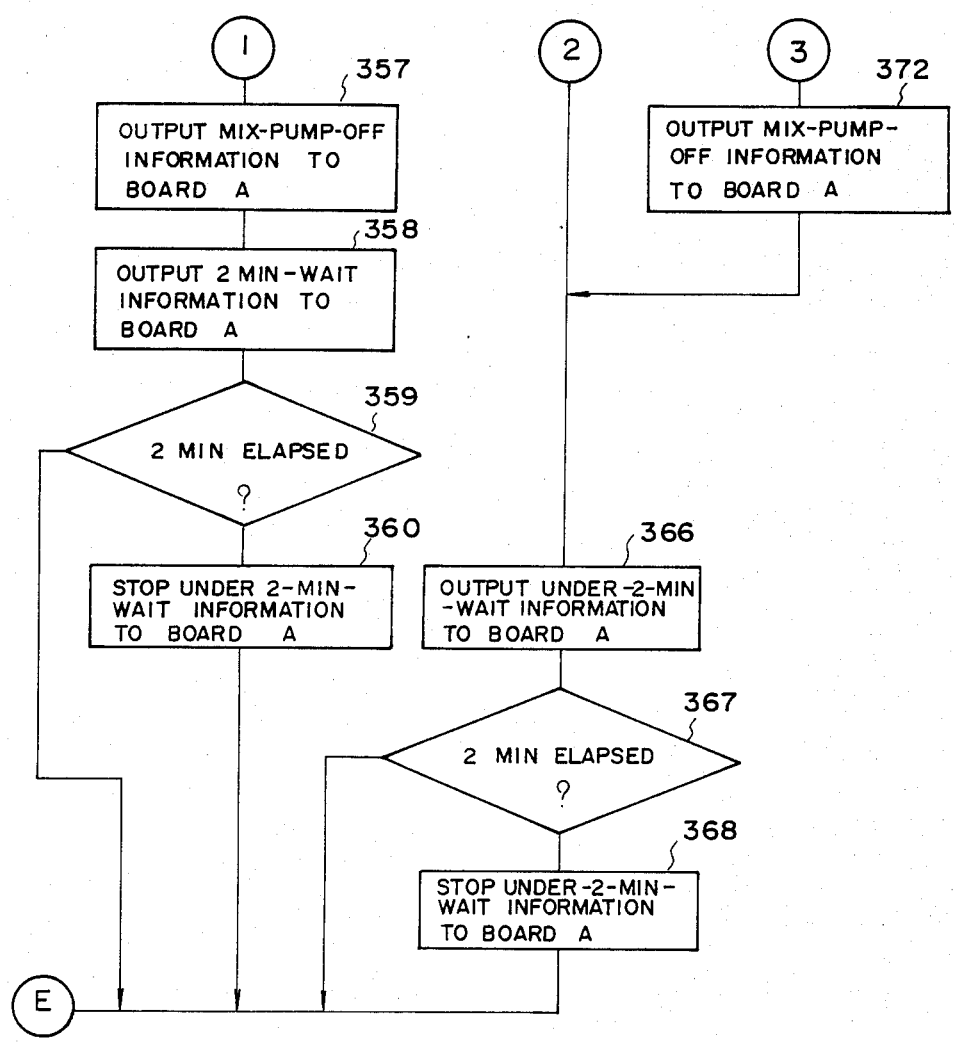
Figure 15C:
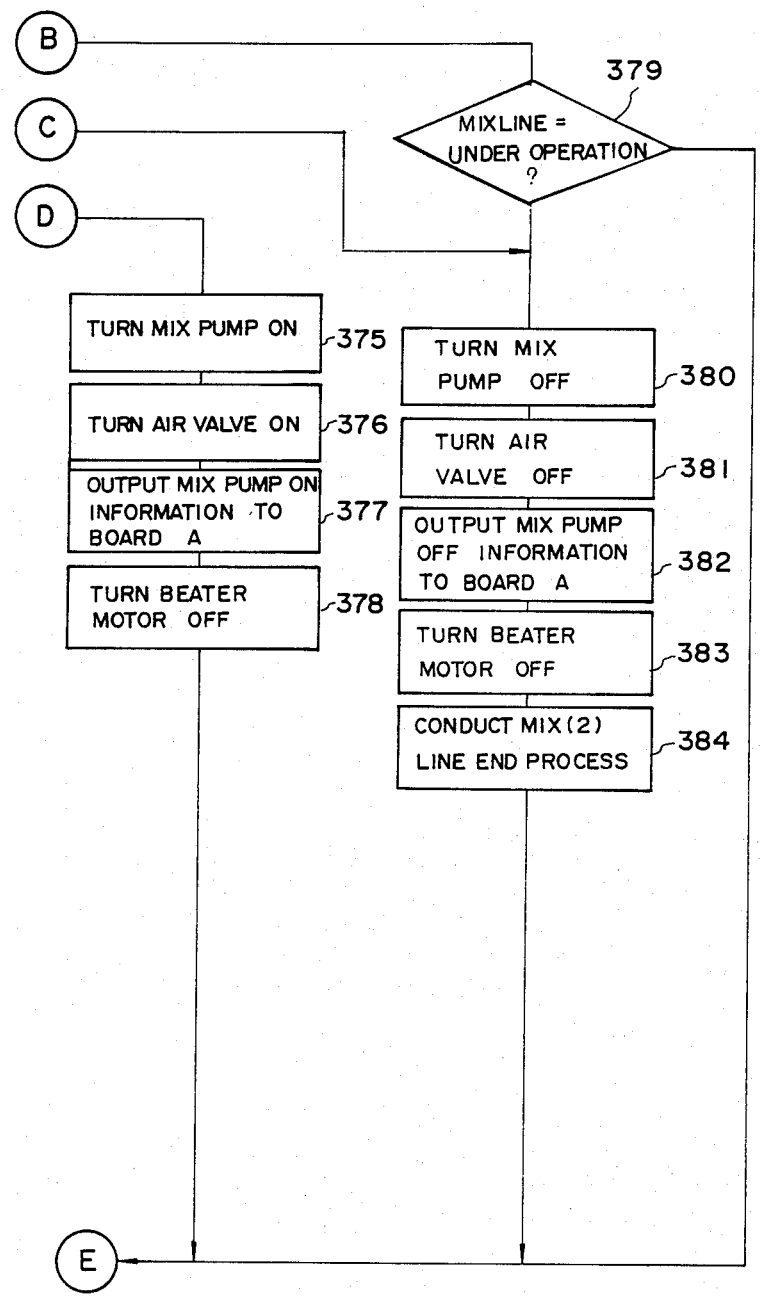
Figure 16:
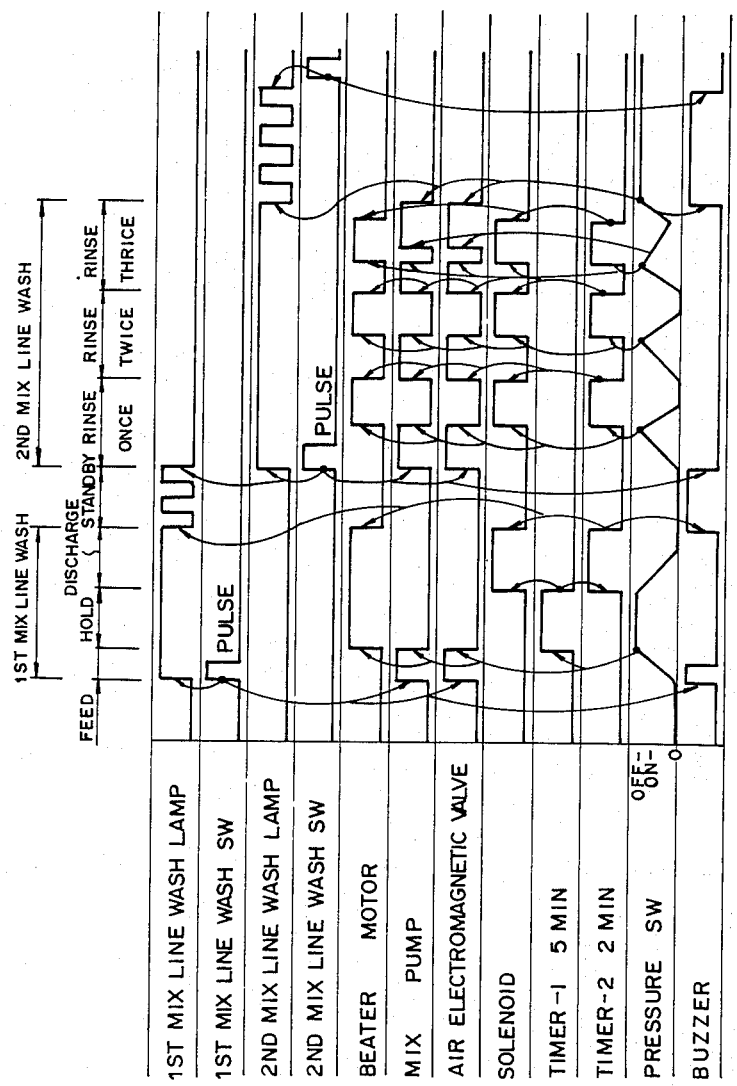
FIG. 16 is a time chart for the mix-line-washing operations.
Figure 17:
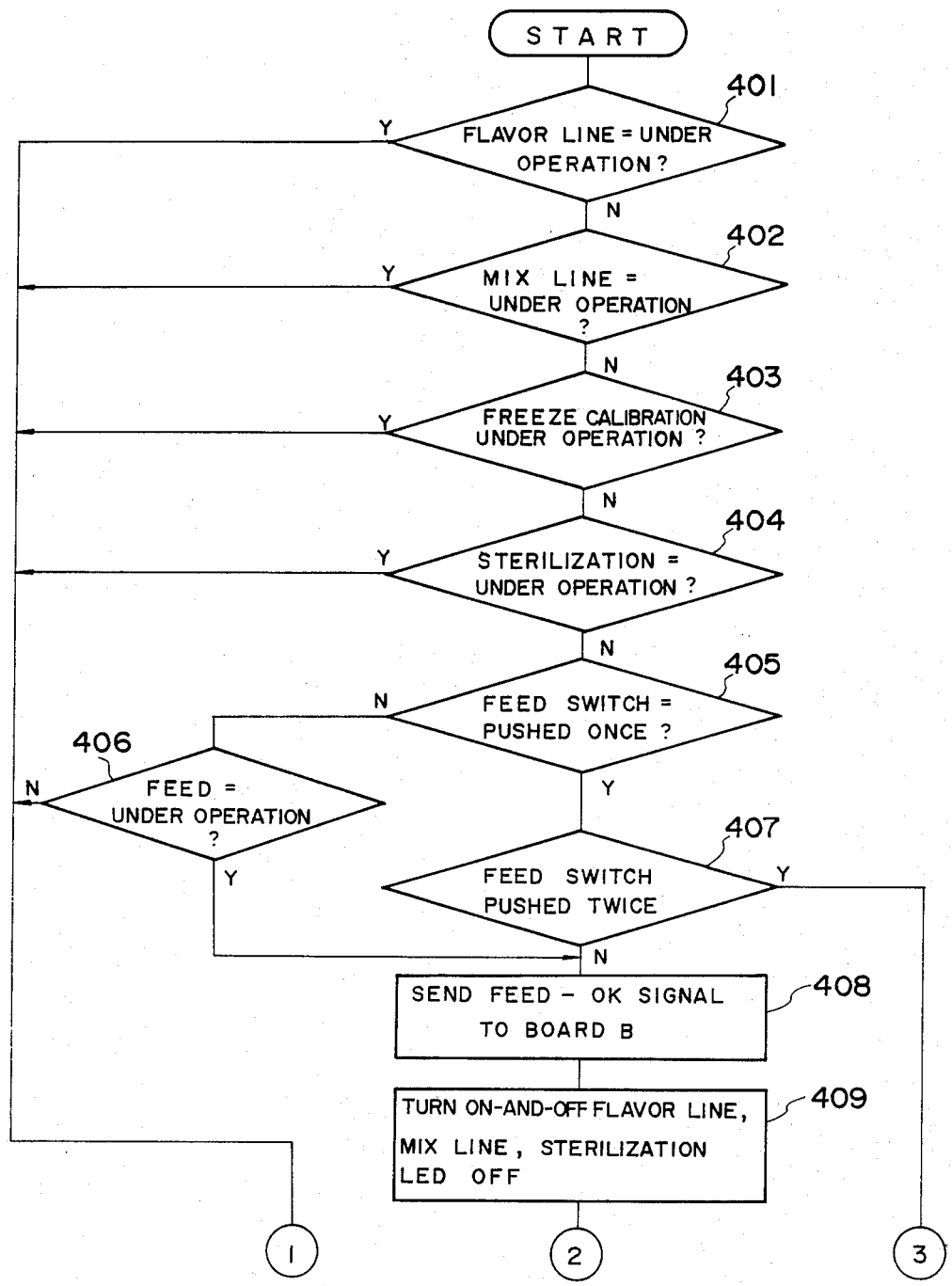
FIGS. 17A(a), 17A(b) and 17B are flowchart showing mix-feeding operations.
Figure 17:
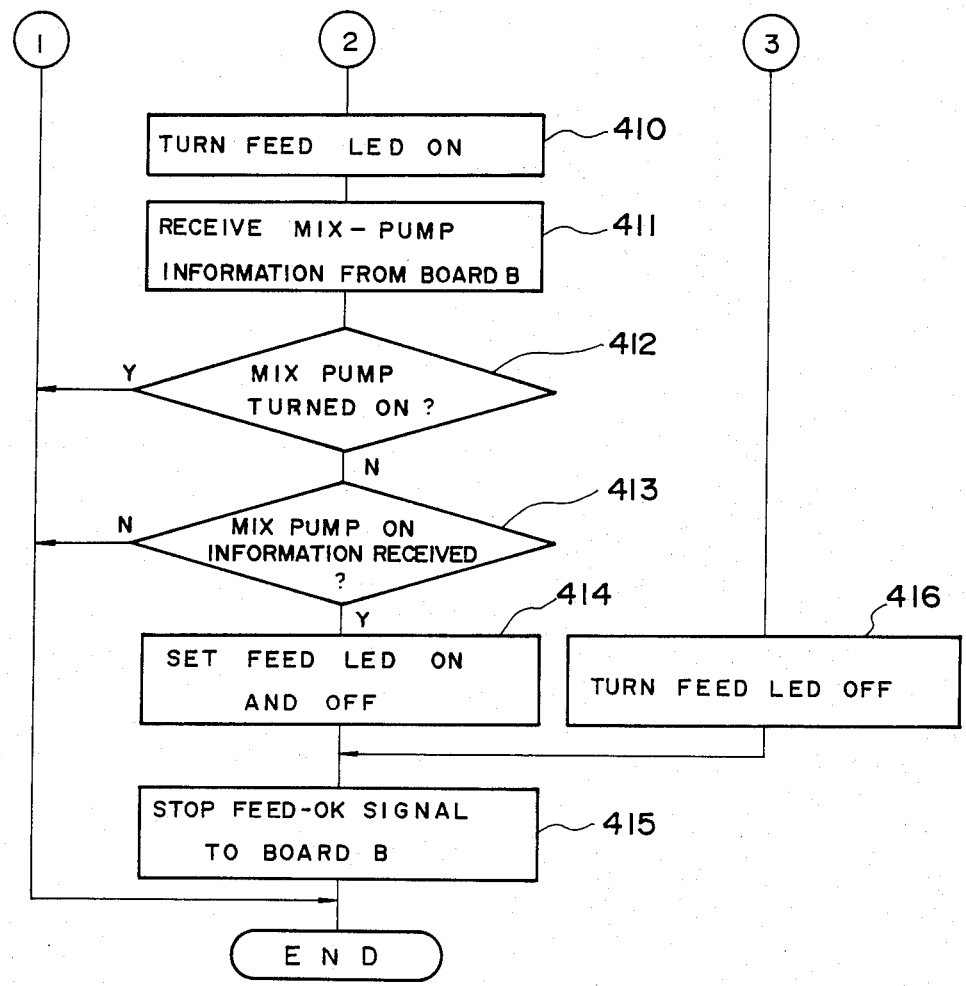
Figure 17:
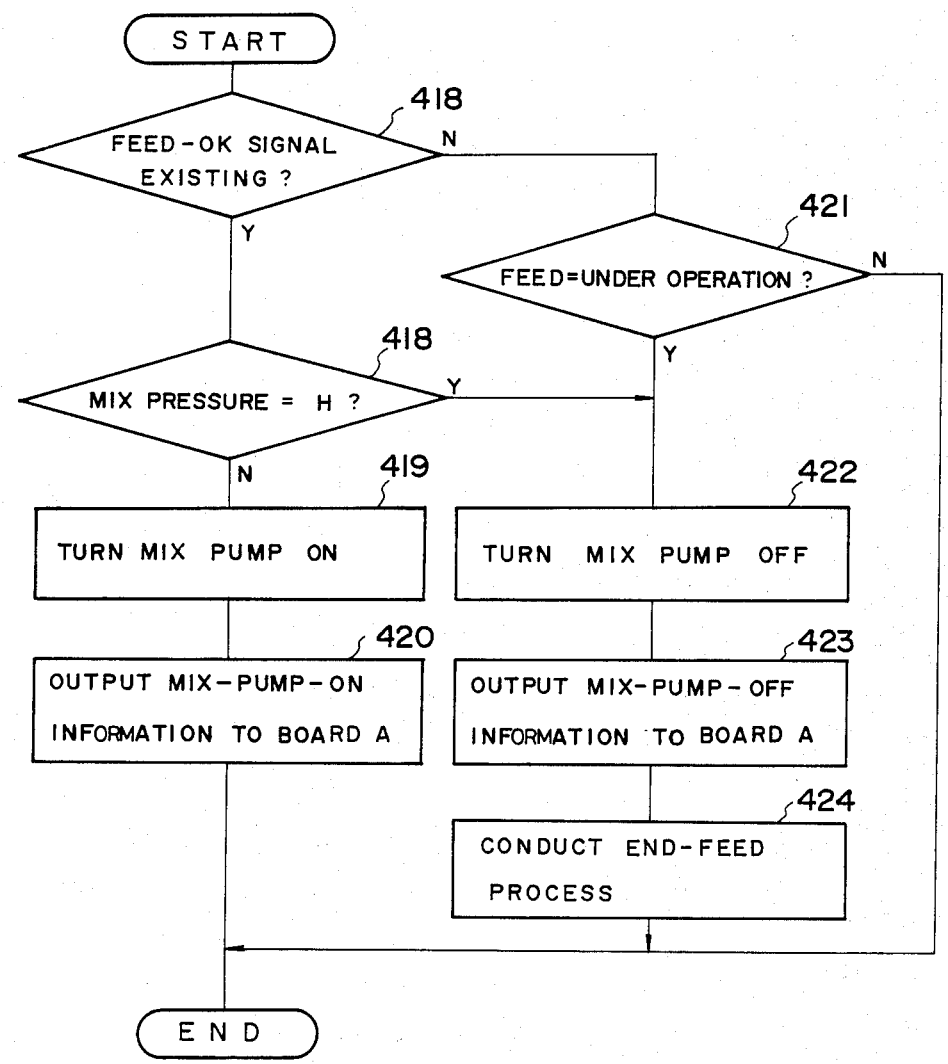

The flowcharts of FIGS. 14A and 14B, and 15A(a), 15A(b), 15B(a), 15B(b) and 15C show the above-mentioned way of processes, each of which processes is conducted through the control blocks 140A and 140B of FIG. 11. The operational timing of related machinery in each of such processes is as shown in FIG. 16.

Hot water of 40° C. containing hypochlorous acid is prepared and set to the intake side of the feeding pump. The control block 140A as shown in FIGS. 14A and 14B executes the process of step 301 under this state.

An OK signal (for first-mix-line washing) is sent to the control block 140B after steps 301, 303, and 304 have been executed since step 301 is the first sterilizing-and-washing process. Upon receiving this signal, the control block 140B starts its operation. from step 333 as shown in 15A(a), 15A(b), 15B(a), 15B(b) and 15c. Upon execution of steps 334 and 335, the pressure in the cylinder becomes low, "L", so that steps 346–348 are executed.

Meanwhile, in the control block 140A, steps 305, 306, 307, and 308 are executed in order after step 304. When step 308 is not the case, that is, "wait-for-two-minutes information" has not been received from the control block 140B, the block 140A proceeds to step 315 via step 310.

Upon completion of step 346 by the control block 140B, hot water is fed into the cylinder, and when the pressure increases up to a given level, the control block 140B proceeds to steps 336–338 from step 335. In step 339, it proceeds to END in the beginning but when five minutes have elapsed, it proceeds to steps 340 and 341 and END. Upon execution of step 340 the control block 140A proceeds to steps 308 and 309, and then, to step 315. In step 341, after a two minutes of time elapsed the control block 140B proceeds to steps 342–345 and END.

As the "wait-for-two-minutes information" has been stopped in step 345, the control block 140A proceeds to steps 310–313 from step 308, and upon completion of step 313 it proceeds to step 315. When step 303, in which it is determined whether the first-mix-line-switch has been pushed twice, is judged to be the case, steps 314, 312, and 313 are processed. Upon completion of step 313, steps 333, 349, and 342–345 are executed, and then the control block 140B proceeds to END so that execution of first-mix-line washing is stopped.

As stated above, the operation of first-mix-line washing has been completed, and now hot water of 60° C. is prepared and set to the intake side of the two mix pumps 8. In this stage, as step 349 has been cleared through the execution of steps 311 and 345, the control block 140B proceeds to steps 350 and 379 and END.

Now the control block 140A executes step 315, and then proceeds to steps 317 and 318. Upon completion of step 318, the control block 140B processes steps 350–352. In step 352, since the pressure in the cylinder is "L", it proceeds to steps 375–378. Meanwhile, upon execution of step 318, the control block 140A proceeds to steps 319–322. In step 322, when step 358 is not processed yet by the control block 140B, it proceeds to step 324 and END. In step 352, when the pressure increases to a given value, the control block 140B proceeds to steps 353–359 and END.

Upon execution of step 358, the control block 140A proceeds to steps 322 and 323. In step 359, when two minutes have elapsed, the control block 140B proceeds to step 360. Upon completion of step 360, the control block 14A proceeds to steps 324–326 and END.

When steps 317–322 have been executed twice by the control block 140A, the control block 140B proceeds to steps 361–367 from step 353, and then, to END. Even if step 364 is processed by the control block 140B, since step 366 on the control block 140B is prior to step 322, the control block 140A proceeds to step 323 and END.

Upon execution of steps 367 and 368 by control block 140B, the control block 140A proceeds to steps 322 and 324–327. Upon completion of step 364 by the control block 140B, the control block 140A proceeds to step 328 and END. In step 361, when the pressure in the cylinder increases to a prescribed value, the control block 140B proceeds to steps 369–372. Upon execution of step 372 by the control block 140B, the control block 140A proceeds to steps 328–330 and END. Upon completion of step 330 by the control block 140A, the control block 140B proceeds to steps 379–384 from step 350. In step 384, since the control block 140B clears step 379, after this, it proceeds to steps 333, 349, 350, and 379 and END so that it does not enter into a mixing routine.

After washing the mix lines, the drain valve 79 and blow valve 78 are opened to discharge all the waste water remaining in the freezing cylinder 9. The mix tank 5 that contains a liquid mix is set to the intake side of the mix pump 8.

Figure 18:
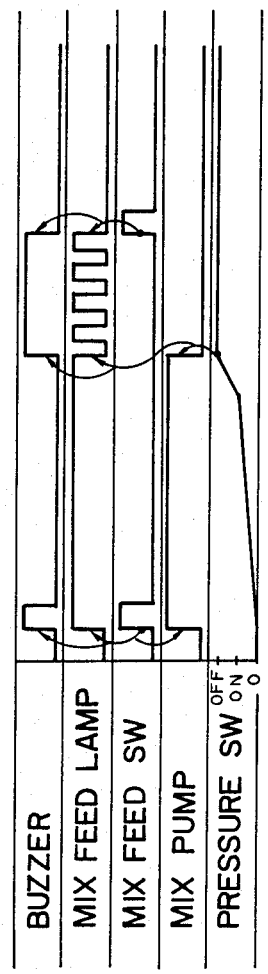
FIG. 18 is a time chart for the mix-feeding operations.

The mix-feed switch 125 on the operating panel 101 is pushed to feed a liquid mix into the freezing cylinder 9 before refrigerating operations. When this switch is pushed, the mix pump 8 is activated under the condition that the pressure switch 160 is on so that a weighed liquid mix is fed into the freezing cylinder 9. This operation is stopped when the pressure switch 160, is turned off. The flowcharts of 17A(a), 17A(b) and 17B, showing processes of executing the above-mentioned operations, are processed respectively by the control blocks 140A and B of FIG. 11. Each timing in operation-related machinery at this time is as shown in FIG. 18.

First, all the waste water remaining in the cylinder is discharged by opening the drain valve 79 and blow valve 78. The mix tank 5 containing a liquid mix is set to the intake side of the mix pump.

In each of steps 401–404, the control block 140A determines whether respective operations are being executed, and when this is the case, it proceeds to END. When all the steps 401–404 are not the case and the feed switch 125 is not pushed, steps 405 and 406 are processed, wherein when feeding operations are being executed, the control block 140A proceeds to step 408, and when they are not being executed, it proceeds to END. When the feed switch 125 is pushed, steps 405–411 are processed.

Upon execution of step 408 by the control block 140A, the control block 140B proceeds to steps 417 and 418. In step 418, since the pressure in the cylinder 9 is "L" at the beginning, the control block 140B proceeds to steps 419 and 420 and END.

Upon execution of step 420 by the control block 140B, the control block 140A proceeds to steps 411 and 412 and END. When the pressure in the cylinder 9 increases to a given value, the control block 140B proceeds to steps 418 and 422–424 and END. Upon execution of step 423 by the control block 140B, the control block 140A proceeds to steps 412–415. Upon completion of step 415, the control block 140B proceeds to END via steps 417 and 421. Incidentally, upon completion of steps 405 and 407, when the second push is given to the feed switch 125, the control block proceeds to steps 407, 416, and 415 and END.

At this time, upon completion of step 415, the control block 140B proceeds to steps 417 and 421–424 and END. Upon completion of step 424, step 421 is reset to close the yes-path so that the control block 140B proceeds only along a 417–421-END route, and cannot enter into a feed-mix routine hereafter.

After a liquid mix is fed into the freezing cylinder 9 as stated above, a liquid mix is supplied anew to the mix tank 5 by confirming that the mix pump 8 has been stopped. For entering into a mix-refrigerating operation, push the freezer switch 126 on the operating panel 101.

Figure 19:
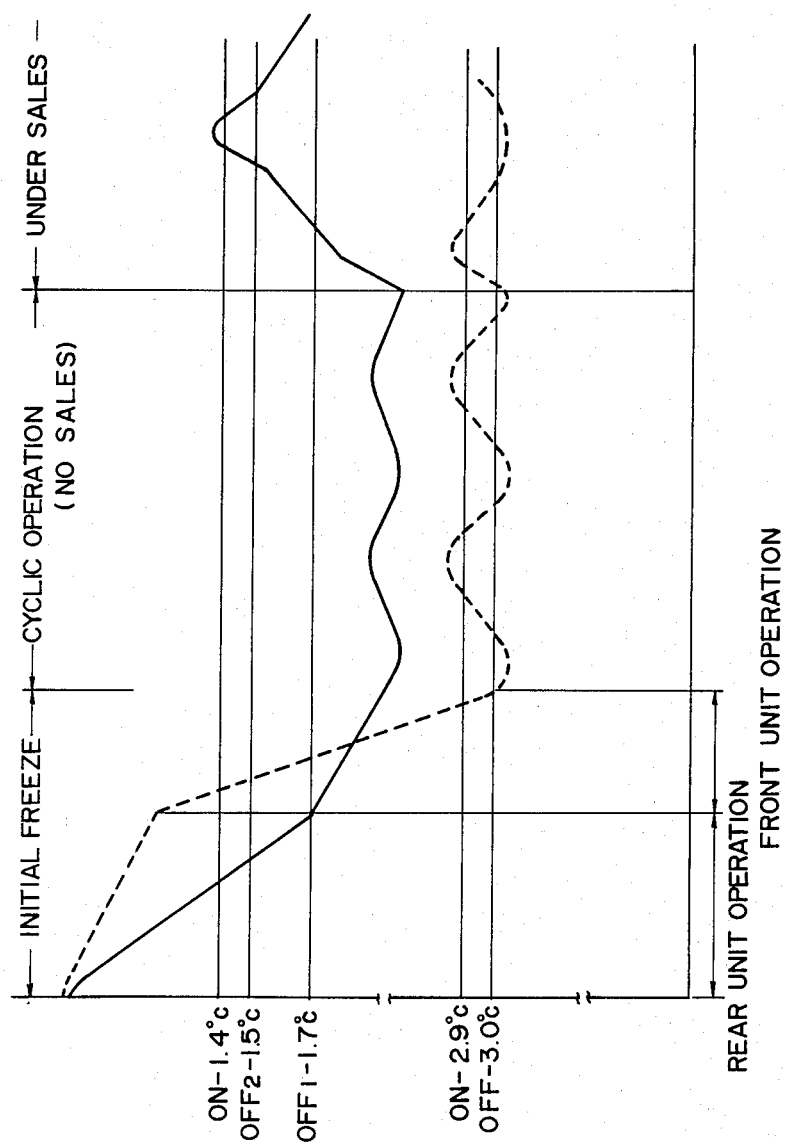
FIG. 19 is characteristic curves showing the refrigerating operation of the front and rear part of the freezing cylinder.

This mix-refrigerating operation is executed in somewhat different modes at each of stages corresponding to an initial operation, a cyclic operation (no sales), and an at-the-time-of-sales operation. These operations are executed under the control of the control blocks 140A and 140B in such modes as shown in FIG. 19.

As mentioned above, the freezing cylinder 9 is refrigerated by the front refrigerating unit comprising the front compressor 12 and front condenser 13, and by the rear refrigerating unit comprising the rear compressor 14 and rear condenser 15. In this case, the refrigerating units are set up such that the front sensor 30 is turned on at −2.9° C. or over and turned off at −3.0° C. or below, and the rear sensor 32 is turned on at −1.4° C. or over and turned off at −1.7° C. or below at the time of initial refrigerating operations, while it is turned off at −1.5° C. both at the time of cyclic operations (no sales) and operations during sales.

At the time of initial refrigeration, a liquid mix is fed into the freezing cylinder from the mix tank 5 via the feed-mix pump 8. The temperature of the liquid mix accommodated in the cylinder is about 4° C. Hence the rear refrigerating unit is immediately turned on to activate the rear compressor 14 and the beater motor 45 when the refrigeration switch 126 on the operating panel 101 is pushed. At this time, however, the front refrigerating unit is not turned on. When the rear refrigerating unit is turned on, the temperature detected by the rear temperature sensor 32 lowers quickly as shown by the solid line of FIG. 19 to form ice crystals of large particles. When the temperature detected by the rear temperature sensor reaches a first preset temperature of −1.7° C. in a short time, the rear refrigerating unit is turned off, and the front refrigerating unit is turned on. As a result, now the temperature detected by the front temperature sensor 30 falls rapidly as shown by the broken line of FIG. 19. When the temperature detected by the front temperature sensor 30 reaches −3.0° C., the front refrigerating unit is turned off.

After this, a cyclic operation, in which no sales are made, begins. The temperature detected by the front temperature sensor 30 repeats a periodical change between −2.9 and −3.0° C. because of the radiation of heat from the freezing cylinder 9 and the on-and-off operations of the front refrigerating unit. At this time, the temperature detected by the rear temperature sensor 32 repeats a gentle change with the maximum of −1.7° C., under the influence of a preset temperature.

The front temperature sensor 30 and the rear temperature sensor 32 have heaters which are incorporated into each of the sensors. The reason for this is that when the sales of ice-cream shakes begin and liquid mixes are dispensed, it becomes necessary to turn the refrigerating unit on a little early so as to compensate for an anticipated rise in temperature accompanied by the additional supplies of the liquid mixes. Thus the temperature detected by the rear temperature sensor 32 may be over a preset temperature of −1.4° C. In this case, the rear refrigerating unit is turned on again. As a result of this, the temperature detected by the rear temperature sensor 32 drops, however, the rear refrigerating unit being operated during sales is turned off when the temperature detected by the rear temperature sensor 32 reaches a second preset temperature of −1.5° C. to prevent liquid mixes from becoming too hard by over refrigeration.

As stated above, it becomes possible to form ice crystals through initial refrigeration and to prepare ice-cream shakes with desired hardness while keeping such a state during the sales of them hereafter. This is achieved in such a way that the temperature detected by the rear temperature sensor 32 is controlled as shown in above-mentioned FIG. 19 by operating the rear refrigerating unit to reach a lower temperature at the time of initial refrigeration, while stopping the operation of the rear refrigerating unit at a little higher temperature than that at the time of sales.

The quantity of flavors to be added to liquid mixes can be adjusted by pushing the calibrating switch 127 after the liquid mixes are refrigerated by pushing the freezer switch 126 on the operating panel 101. That is, pull out one flavor tube 77 for each flavor from the mix path of the freezer door 11 as shown in FIG. 5, and insert the tip of it into the measuring cylinder. Then push the calibrating switch 127 and the cancelling switch 111 on the operating panel 100 to initialize the detection of weight. Upon pushing the automatic switch 112, the flavor pump 10 corresponding to the push operates for a given time to dispense a flavor to the measuring cylinder. It is possible to judge whether the quantity is appropriate by measuring the amount of this flavor. If the amount is not appropriate, it is possible to fix an appropriate flavor amount by adjusting the number of rotations of the flavor pump 10 by means of the volume 135.

All the preparatory operations of the ice-cream-shake-preparing apparatus that are to be executed before opening the shop are thus completed by pushing in order the operating switches 121–127 that are mounted on the operating panel 101 for each cylinder to be operated through the panel.

The operations of the apparatus to sell ice-cream shakes during business hours are then executed by placing a paper cup 81 on the cup table 80, and pushing the automatic switch 112 or manual switch 113 on the operating panel 100. That is, when the automatic switch 112 is pushed, the solenoid 70, spinner motor 74, flavor pump 10, and beater motor 45 are simultaneously activated. A liquid mix is put into the freezer door 11 by opening the valve 64 in it via the lever 66 activated by the solenoid 70, and at the same time the flavor which is supplied through the flavor pump 10 is mixed with the liquid mix there by rotating the spinner motor 74. The mixed liquid mix falls over into the cup 81, the weight of which is detected through the weight detector 83 to send out a signal when a given amount of weight is reached, and the signal stops operating the solenoid 70, spinner motor 74, flavor pump 10, and beater motor 45. In order to discharge the flavor-mixed liquid mix remaining then in the path of the freezer door 11, the operation of the solenoid is stopped a little later after the flavor pump 10 is stopped. The purpose of this is to prevent the previous flavor from being mixed with the next flavor different from the previous one.

In this operation to automatically dispense ice-cream shakes, the weight of the liquid mix in the paper cup 81 will vary when there is a difference in weight among the paper cups 81 or there is something, such as a liquid mix stuck on the cup table 80. In order to avoid this and always dispense a given amount of ice-cream shakes, the control block 140A of this embodiment as shown in FIG. 11 operates such that when a paper cup 81 is placed on the cup table 80 and the automatic switch 112 is pushed, the control block 140A begins controlling dispensing operations by assuming the sum of the weight of both the cup table 80 and the paper cup 81 to be zero.

That is, the control block 140A stores the total weight of ice-cream shakes to be dispensed to the paper cup 81 as $W_2$, and the weight obtained by subtracting the weight of a liquid mix (hereinafter designated as dot adjusting weight), which is to be dispensed to remove the previous flavor remaining in the mix path 62 just after the flavor pump 10 is stopped, from the total weight $W_2$, as the flavor-stop weight $W_1$. Then the control block 140A activates the flavor pump 10, beater 60, solenoid 70, and spinner motor 74 and the like to start control operations to dispense ice-cream shakes. The control block 140A watches the weight of ice-cream shakes to be dispensed on the basis of signals obtained from the operational amplifier 85 of the weight detector 83, and stops supplying flavors to the mix path 62 by stopping the flavor pump 10 when the flavor-stop weight $W_1$ has been reached. Then it stops the solenoid 70 and spinner motor 74 to cease dispensing ice-cream shakes when the total weight $W_2$ has been reached. It is secured to always dispense a prescribed amount of ice-cream shakes to the paper cup 81.

It must be avoided, however, to dispense ice-cream shakes when the automatic switch 112 is pushed, while no paper cup 81 is placed on the cup table 80. Hence it is needed to judge whether there is the paper cup 81 on the cup table 80. In this embodiment, the judgement is formed based upon the signals from the same weight detector 83 as that used for measuring the weight of dispensed ice-cream shakes. Before the automatic switch 112 is pressed, the control block 140A stores the weight of the table 80 as zero when there is no paper cup 81 thereon by pressing the calibrating switch 127 and cancelling switch 111 on the operating panel 100. As the weight of the paper cup is about 10 g, the weight of the cup table 80 with no paper cup 81 thereon is defined as 6 g or less to make dispensing operations impossible when it is 6 g or less. Also it is made impossible to dispense shakes when the weight of the cup is 180 g or more (a state in which the cup is already filled with liquid mixes). The control block 140A stores in advance these values, 6 and 180 g, as the limits of such weight. When the automatic switch 112 is pushed, the block judges whether the weight detected through the weight detector 83 is between 6 and 180 g, and if this is the case it begins controlling the dispensing operations mentioned above after resetting the detected weight as zero by assuming the paper cup 81 has been placed on the cup table 80. If that is not the case, it prevents the dispensing operations from starting b assuming the paper cup 81 has not been set to the table.

In this embodiment, the sole weight detector 83 thus detects both the weight of ice-cream shakes to be dispensed and of the paper cup 81 without the use of separate sensors.

Figure 20:
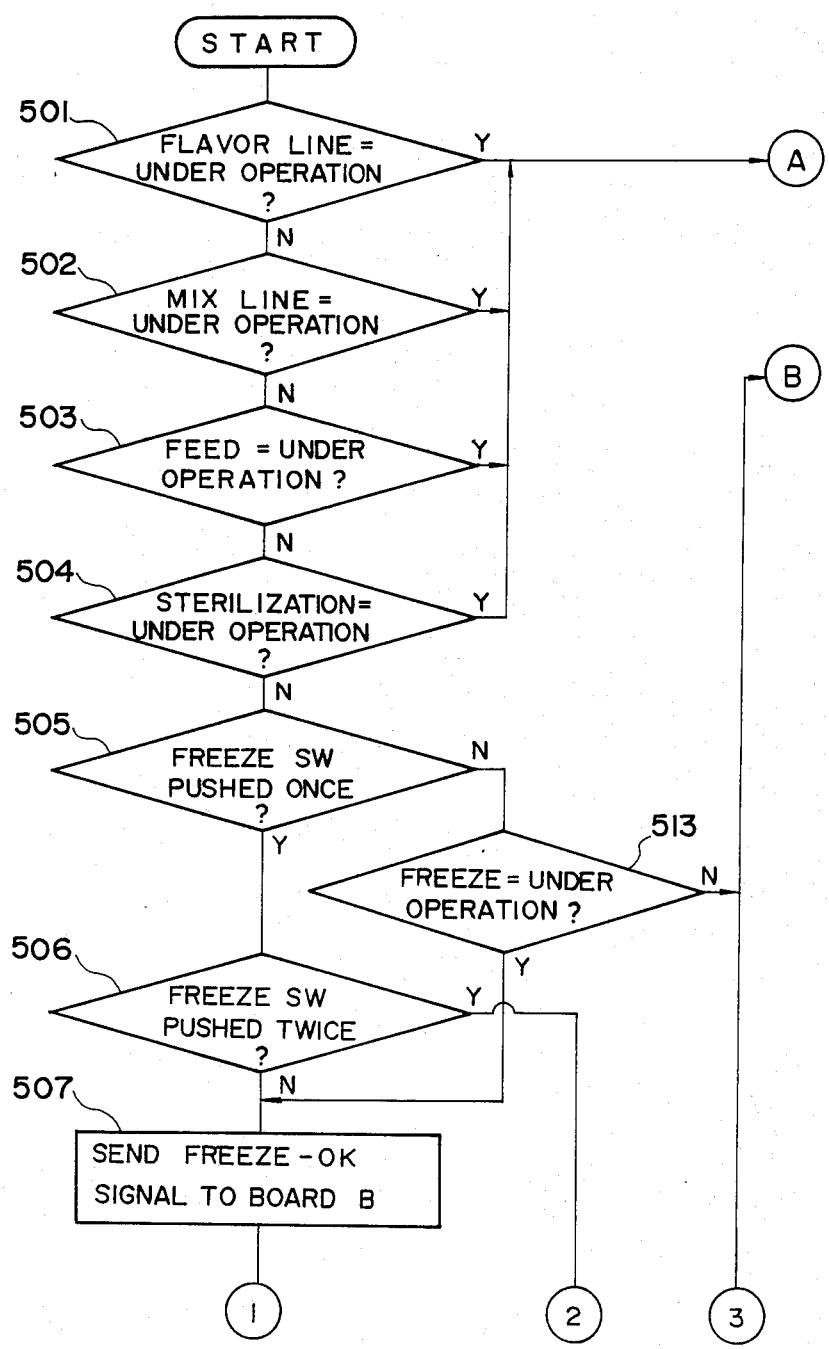
FIGS. 20A(a), 20A(b), 20B(a), 25B(b), 21A(a), 21A(b), 21B(a), 21B(b), 22A(a), 22A(b), 22B(a) are flowcharts showing mix-refrigerating, a flavor-measuring, and an automatic-dispensing operation, respectively.
Figure 20A:
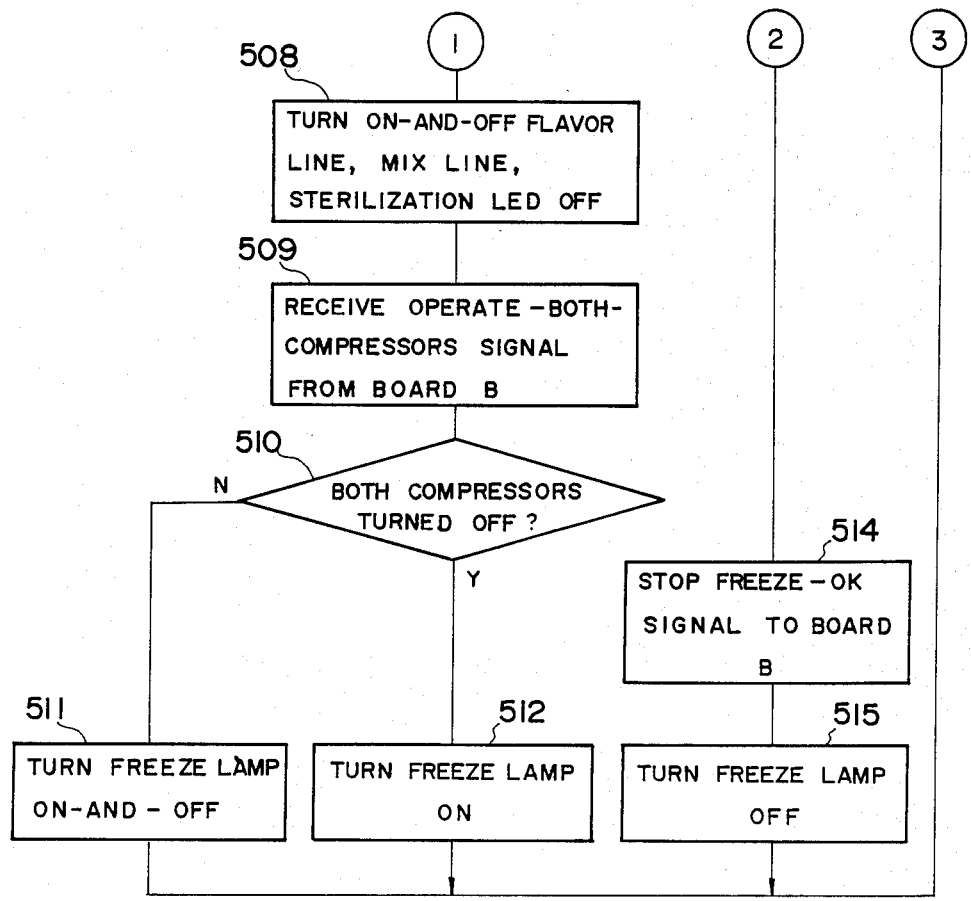
Figure 20B:
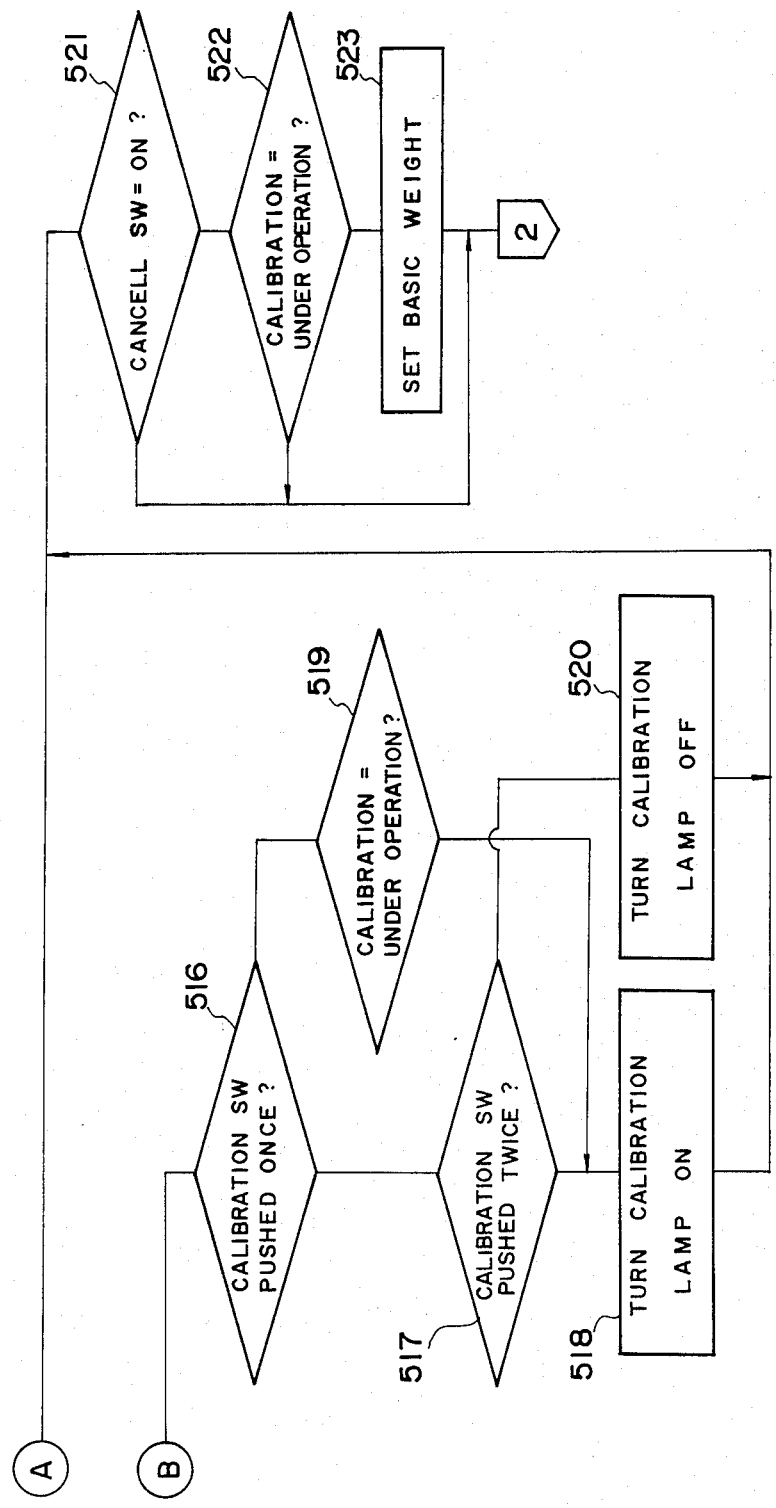
Figure 21A:
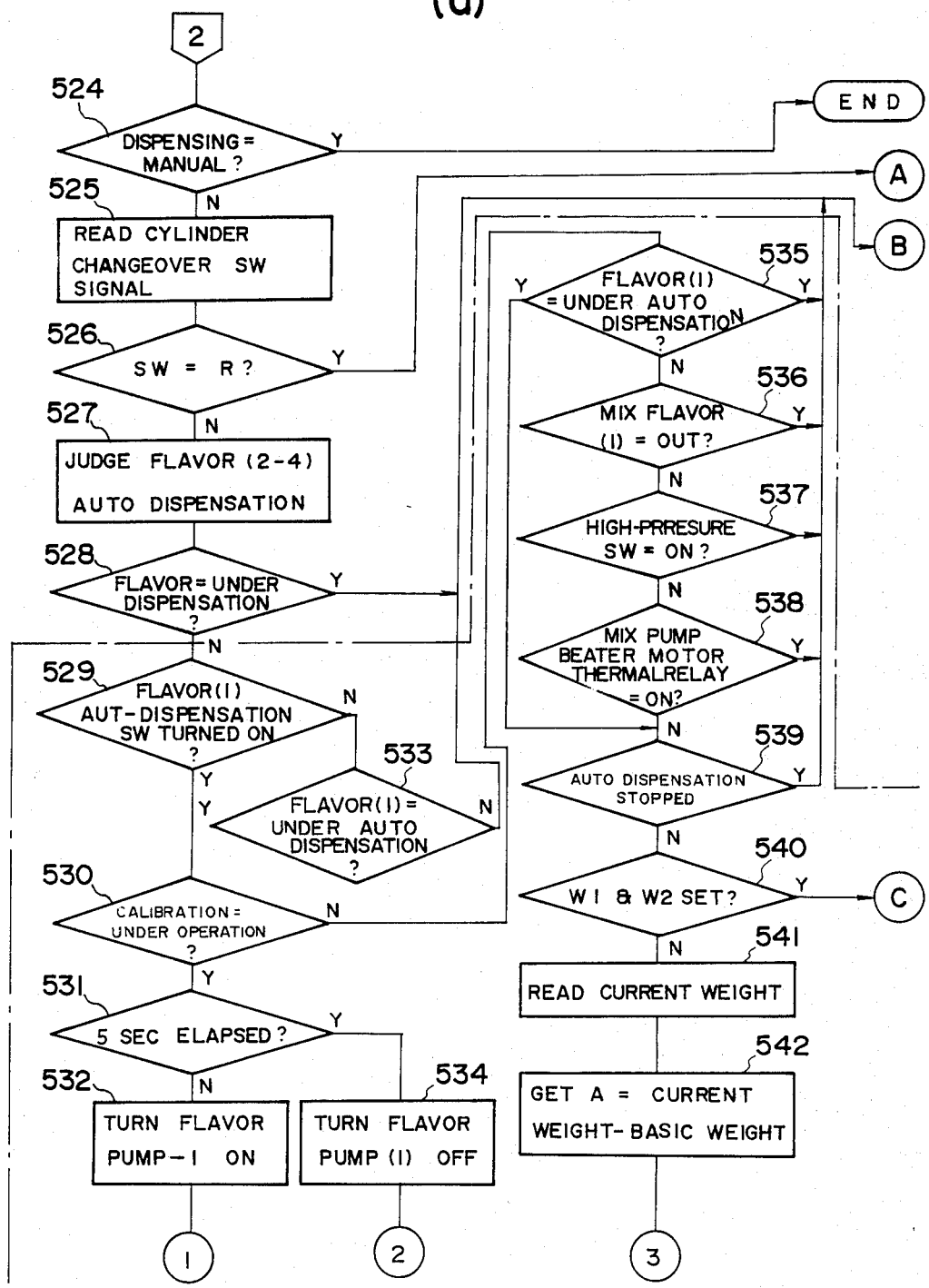
Figure 21:
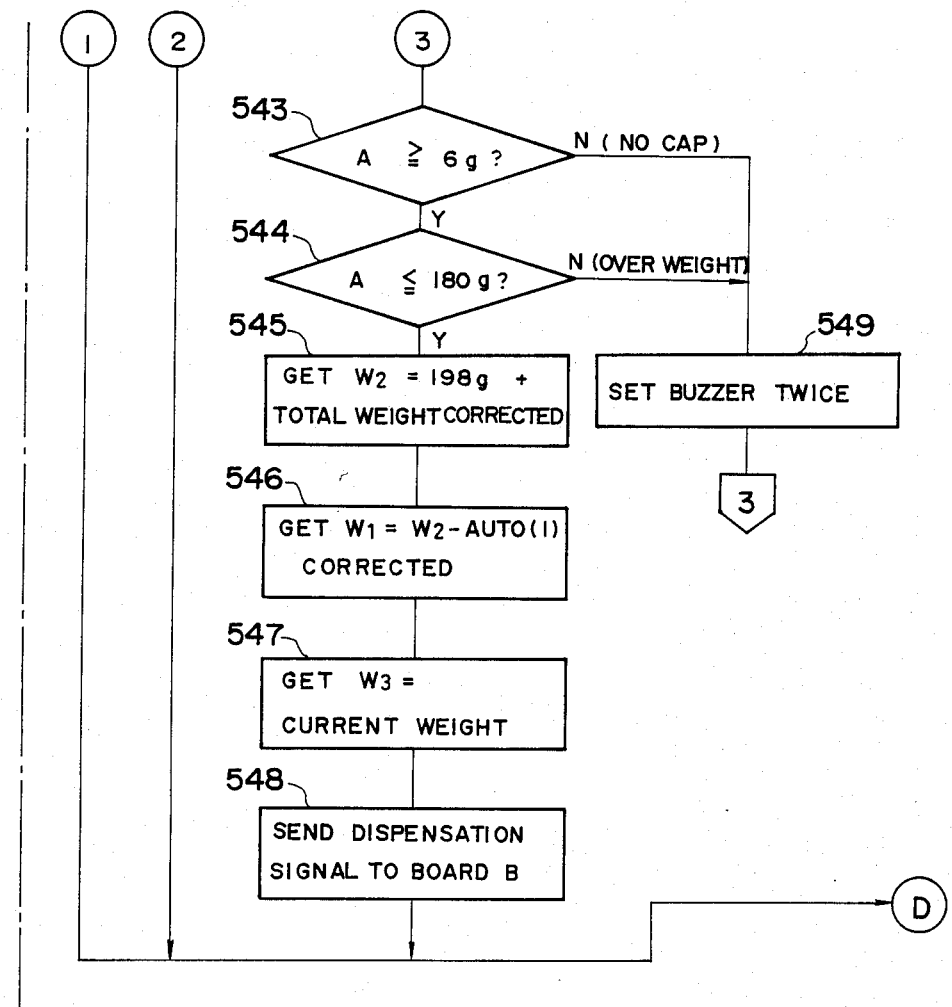
Figure 21B:
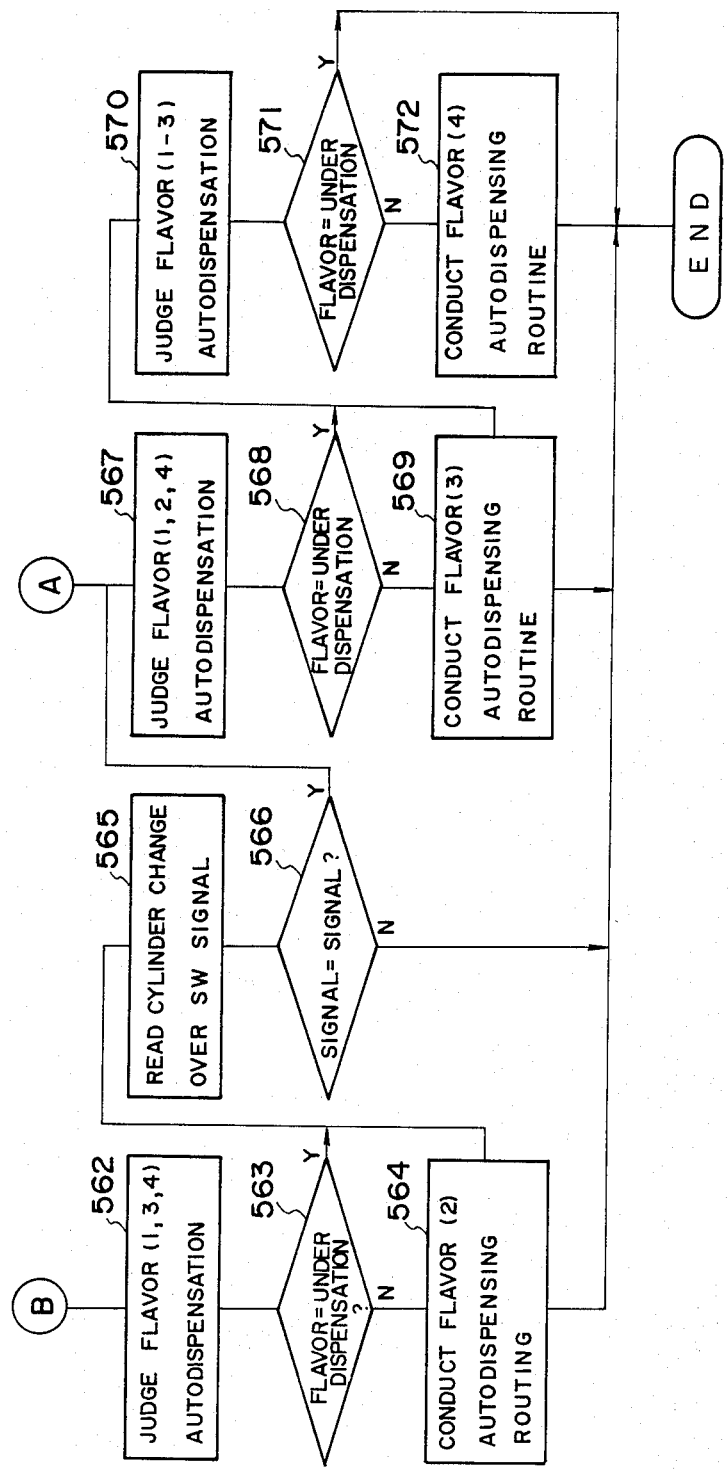
Figure 22:
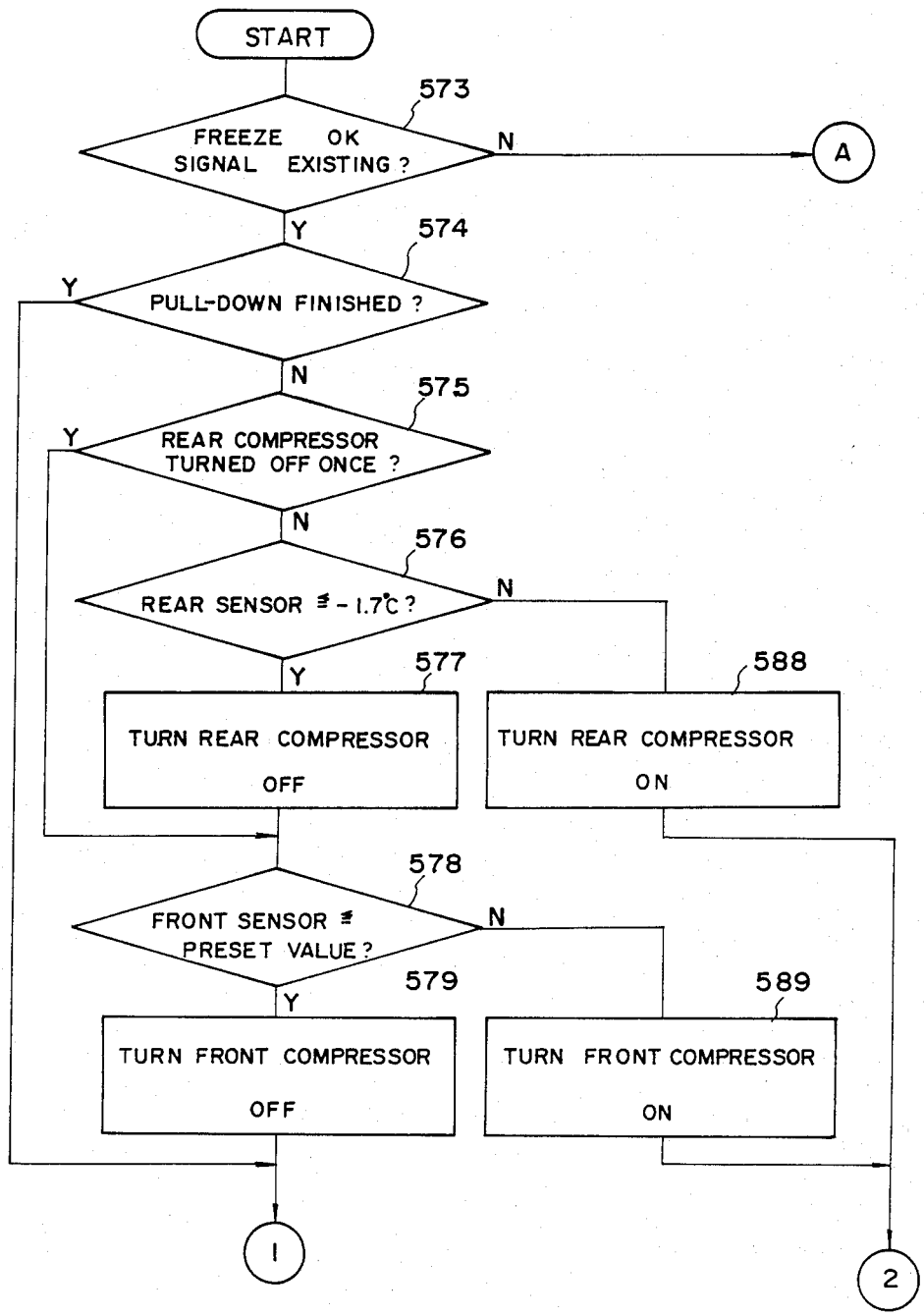
Figure 22A:
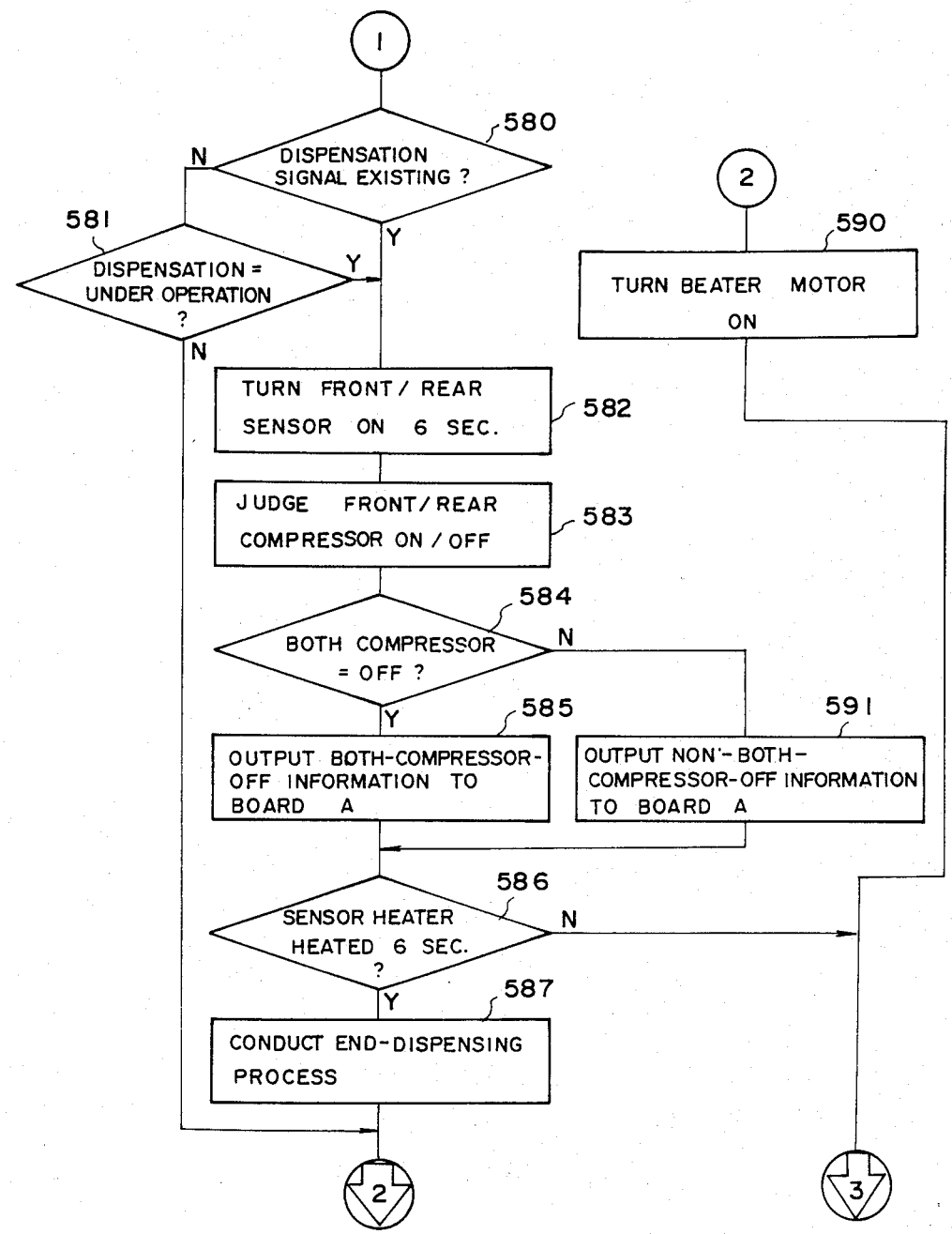

FIGS. 20A(a), 20A(b), 20B(a), 21A(a) 21A(b), 21B(a), 21B(b), 22A(A), 22A(b), 22B(a) and 22B(b) show the flowcharts for mix-refrigerating, flavor-amount-adjusting, and ice-cream-shake-automatic-dispensing operations.

Figure 23:
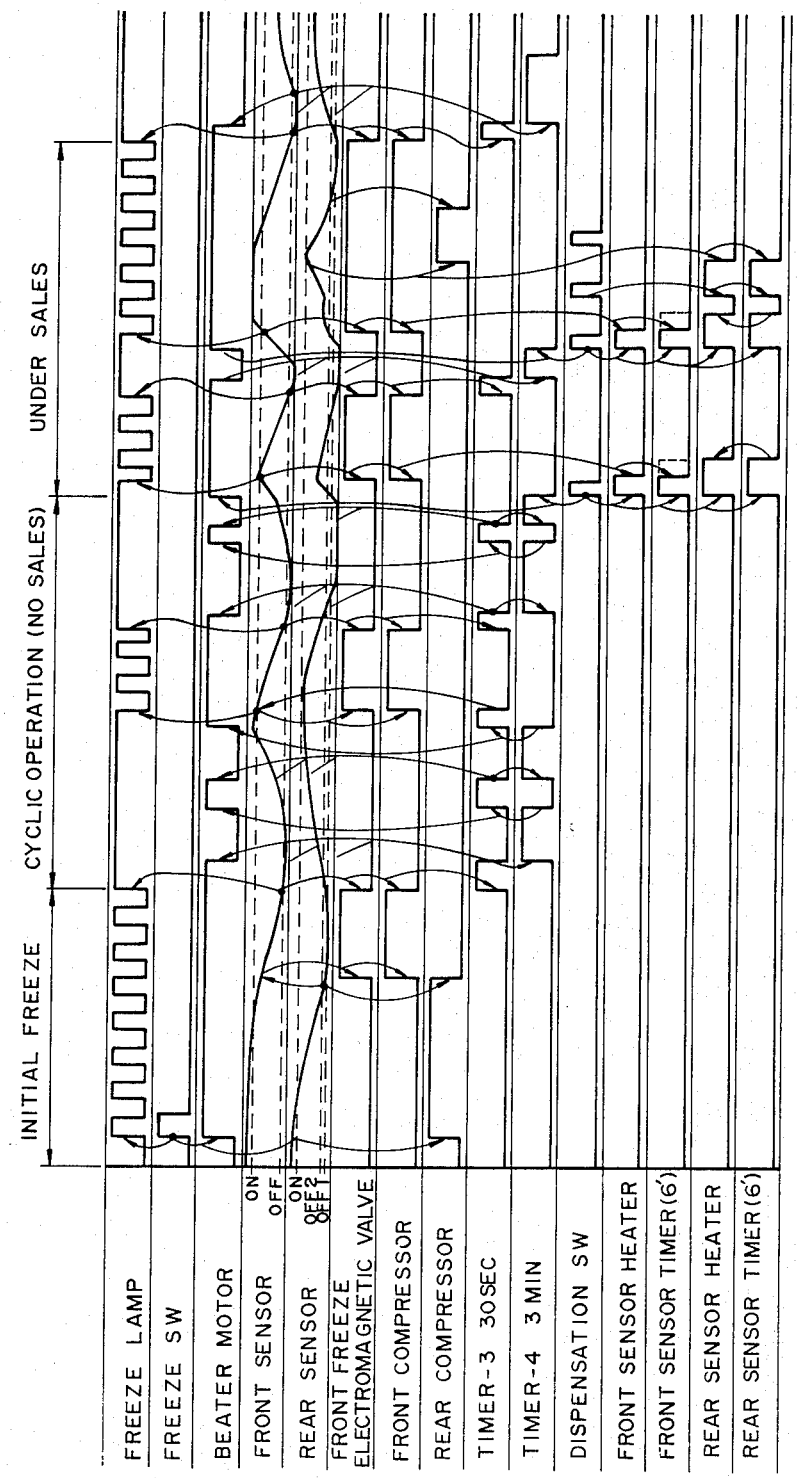
FIG. 23 is a time chart for mix-refrigerating operations.
Figure 24:
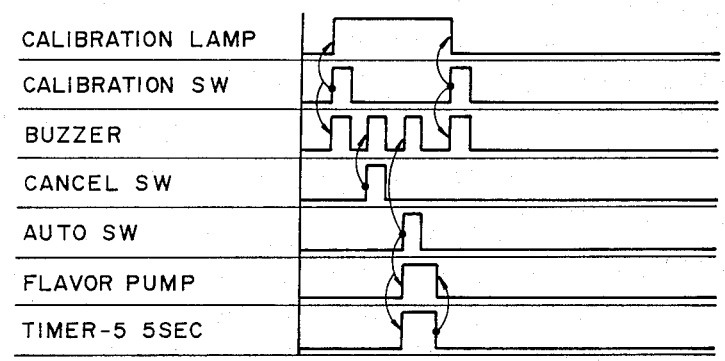
FIG. 24 is a time chart for flavor-measuring operations.

FIGS. 20A(a), 20A(b), and 20B shows a flowchart for refrigerating, flavor-adjusting, and dispensing processes. 21A(a) 21A(b), 21B(a) and 21B(b) a flowchart for an automatic dispensing process. These processes are-executed by the control block 140A shown in FIGS. 11. 22A(A), 22A(b), 22B(a) and 22B(b) shows a routine for refrigerating and dispensing processes, which are executed by the control block 140B of 22A(A), 22A(b), 22B(a) and 22B(b) FIG. 23 shows-the timing in such refrigerating operations, and FIG. 24 shows the timing in such flavor adjusting operations.

The control block 140A determines whether each of operations in steps 501–504 is under execution. When the refrigerating switch 126 has been pushed, steps 505 and 506 are executed, and if step 506 is not the case, the control block proceeds to steps 507–510. When step 507 is completed by the block 140A, the control block 140B proceeds to steps 573 and 574. In step 510, the control block 140A executes either of steps 511 or 512 correspondingly to the judgement formed in steps 589 and 591 or in steps 603 and 609, and proceeds to step 516. If step 513 is not the case, the control block proceeds to step 516. In step 516, if the calibrating switch 127 is turned on, it proceeds to step 517, and if the switch 127 has not been pushed twice, it proceeds to step 518. When step 517 is the case, step 520 is executed, and if step 516 is not the case, step 519 is executed. In step 519, when the calibration lamp is on, it is considered to be under execution. In step 521, if the cancel switch has been pushed, step 522 is executed. In step 522, when the calibration lamp is on, step 523 is executed. In step 523, the basic weight of the weighing machine (the weight in a state in which the cup table 80 is set to the machine) is stored. In steps 525 and 526, it is determined whether the changeover switch (R-Dual-L) is set at Dual and, the right system is under operation by reviewing the switch. If this is not the case, step 527 is executed, and if otherwise step 567 is executed. In steps 527 and 528, it is determined whether other flavor lines 2–4 are under dispensation. If this is the case, step 562 is executed, and if otherwise steps 529–531 are executed. In steps 531 and 532 or steps 531 and 534, flavor-calibrating operations are carried out. If step 530 is not under calibration, steps 535–539 are executed. If these steps are not the case, step 540 is executed, and if they are the case, step 562 is executed. In step 540, when $W_1$ and $W_2$ have not been calculated, steps 541–543 are executed. Step 543 determines whether there is a cup. If there is no cup, step 549 is executed, and the error is informed. If there is a cup, step 544 is executed, and it is judged whether the weight is over. Also step 549 is executed here when the weight is over. If step 544 is the case, steps 545–548 are executed. Steps 550–556 are executed when $W_1$ and $W_2$ have been calculated in step 540. When the cancelling switch 111 is pushed in step 550, steps 560 and 561 are executed, and dispensation is stopped. In step 553, if the cup is removed during dispensation, steps 549, 560, and 561 are executed, and dispensation is stopped. In step 555, when measured weight exceeds $W_1$, steps 557–559 are executed. In step 558, when measured weight overs $W_2$, steps 560 and 561 are executed, and dispensation is stopped. Steps 562 and 563 are similar to steps 527 and 528. Step 564 is similar to steps 529–561, a first-flavor-automatic-dispensing routine. In steps 565 and 566, if the cylinder is single, the control block proceeds to step 567. Steps 567 and 568 are similar to steps 527 and 528.

Steps 569 is similar to above-mentioned steps 529–561, a first-flavor-automatic dispensing routine.

While the control block 140A executes above-mentioned step 527, the control block 140B executes steps 573 and 574. When the refrigerating switch 126 is pushed then, the control block proceeds to steps 574, 575, 576, 588, 590, and 605 since the temperature of liquid mixes is naturally high. When the pressure in the cylinder is "H", steps 610 and 611 are executed, and when it is "L", steps 606 and 607 are executed. The expression "AIR Mg VALVE" means a valve that is opened and closed to appropriately mix air with a liquid mix.

In step 576, when the temperature of the liquid mix goies down to a first preset temperature (−1.7° C.) to form ice crystals, the control block 140B executes steps 577 and 578, and proceed to steps 578–589 then. In step 578, when the temperature of the liquid mix drops to a preset temperature, step 579 is executed to complete a pull-down operation, and step 574 proceeds solely to step 580 thereafter. Upon completion of the pull-down operation steps 599 and 612 are executed since "three-minute WAIT" is not cleared, and steps 599 and 600 are executed after the lapse of three minutes. In step 600, steps 600 and 608 are executed until thirty seconds have elapsed, and steps 600–602 are executed after the lapse of thirty seconds. Step 602 proceeds to steps 603 and 604 or step 609 depending on the result of step 601. In step 580, steps 582–584 are executed when step 548 is executed by the control block 140A. In step 584, step 585 or 591 are executed according to the state of the front and rear compressor. When step 586 is not cleared after steps 580–581 are executed, steps 580 and 581 are executed if step 560 is completed, however, execution of steps 582–586 are guaranteed unless step 587 is executed. Just after step 587, steps 599 and 612 are executed since "three-minute WAIT" is not cleared, and steps 599 and 600 are executed after three minutes. Just after this, steps 600 and 608 are executed since thirty seconds have not elapsed yet, and steps 600–602 are executed after thirty seconds. Step 602 executes steps 603 and 604 or step 609 according to the result of step 601.

The above deals with an ice-cream-shake preparing apparatus operated during business hours, however, it is required to collect a liquid mix in the freezing cylinder 9, and to sterilize and wash the flavor and mix lines after the shop is closed. This automatic washing and sterilizing system using hot water will be described below.

First, push the sterilizing switch on the operating panel 101 to dissolve and discharge the liquid mix in the freezing cylinder 9. Upon pushing this switch, the beater motor 45, four-way valve 21, rear compressor 14 are activated to dissolve the liquid mix in the freezing cylinder 9 by heating it through the heat-pump functions of heating media which are circulated via the refrigerant piping 25 as shown by arrows with broken lines in FIG. 3. When the front sensor 30 judges that the liquid mix has been dissolved at 5° C., the rear compressor 14 and four-way valve 21 are stopped, and at the same time, the timer-2 is set going so that the mix pump 8, air-electromagnetic valve 155, and solenoid 70 are operated for a given time to discharge the dissolved liquid mix in the freezing cylinder 9.

Next, when the second sterilizing switch 129 is pushed, the mix pump 8 and air-electromagnetic valve 155 are activated to feed a rinse which is prepared in the mix tank into the freezing cylinder 9. When the air-electromagnetic valve 155 are stopped, and at the same time, the timer-2 is set going so that the beater motor 45 and solenoid 70 are operated for a given time to discharge the rinse in the freezing cylinder 9. The above-mentioned operations are repeated three times. In the fourth operation, a rinse fed into the freezing cylinder 9 is heated through a heat pump operation by operating the rear compressor 14 and four-way valve 21. The rinse is kept at a prescribed temperature for a given time by means of the sterilization-watching timer thereafter, and then is discharged to complete the operation.

Figure 26C:
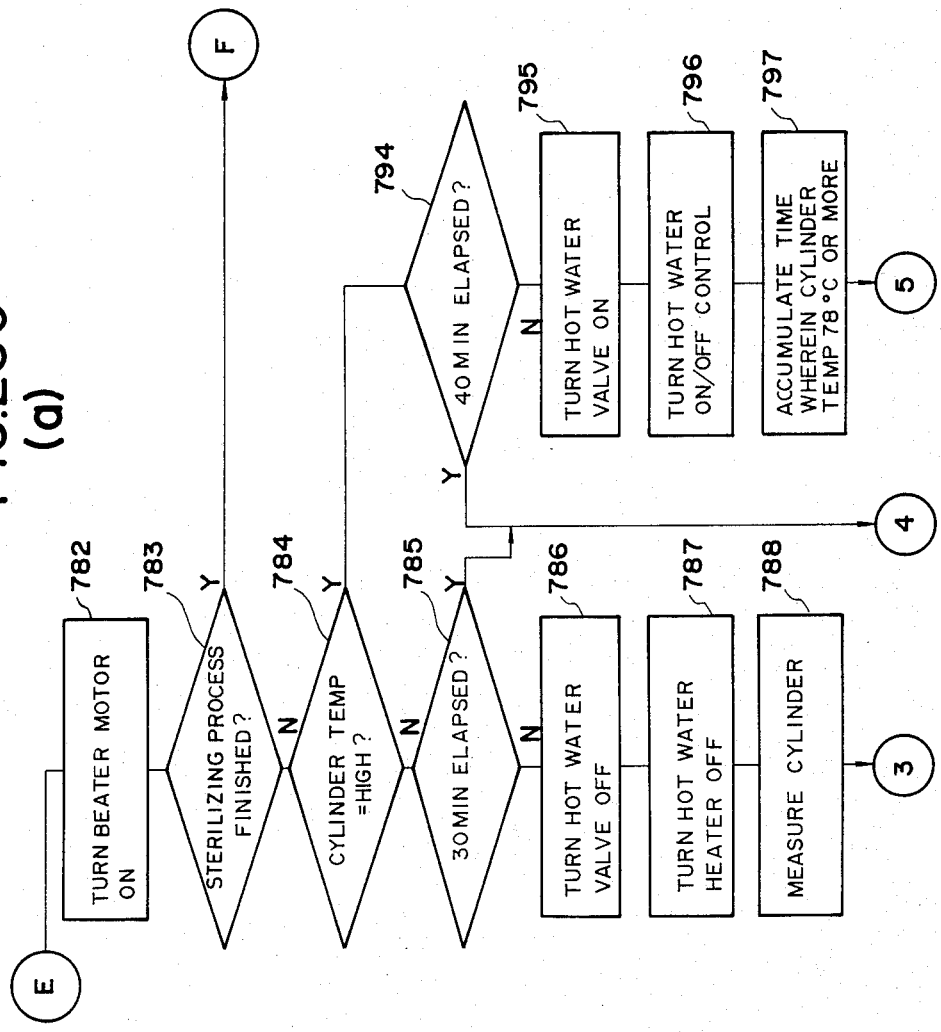
Figure 27:
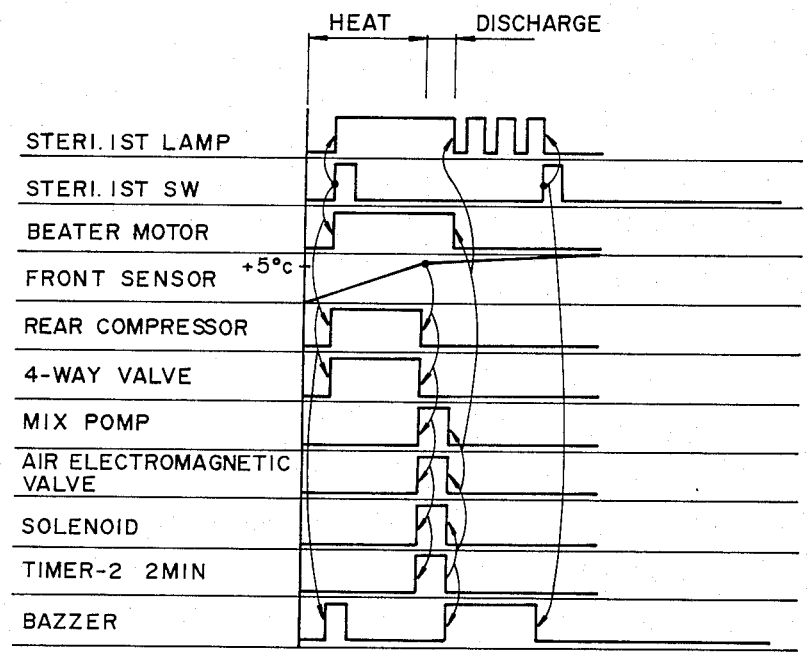
FIGS. 27 and 28 are time charts for the automatic-washing and hot-water-sterilizing operations.
Figure 28:
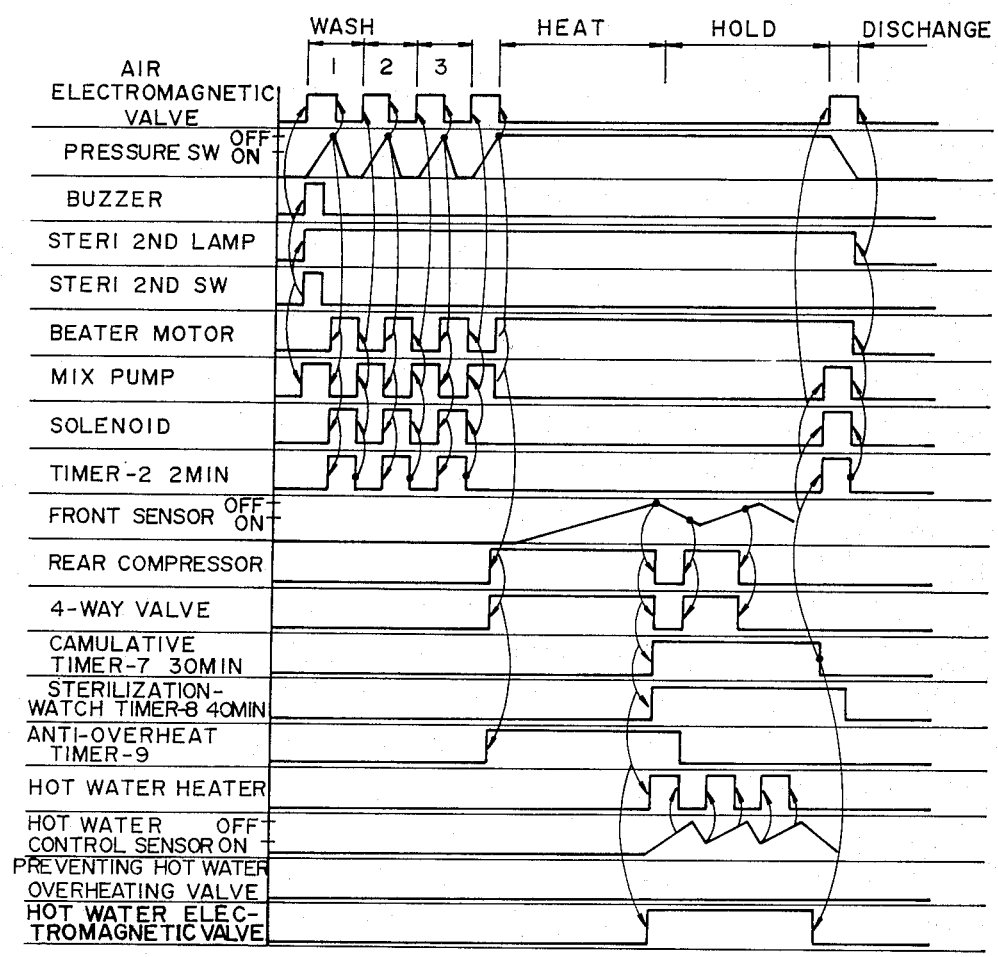

FIGS. 25A(a), 25A(b), 25B(a), 25B(b), 26A(a), 26A(b), 26B(a), 26B(b), 26C(a), 26C(b), 2D(a), 26D(b) show the above-stated processes of automatic washing and hot-water sterilizing operations. Those processes shown in FIGS. 25A(a), 25A(b), 25B(a), 25B(b) are executed by the control block 140A, and those shown in FIGS. 26A(a), 26A(b), 26B(a), 26B(b), 26C(a), 26C(b), 26D(a) are executed by the control block 140B. FIGS. 27 and 28 show the timing of the main machinery in performing those processes shown in FIGS. 25A(a), 25A(b), 25B(a), 25B(b), 26A(a), 26A(b), 26B(a), 26B(b), 26C(a), 26C(b), 2D(a), 26D(b).

Referring to FIGS. 25A(a), 25A(b), 25B(a), 25B(b), the control block 140A executes steps 701–704, and determines whether the first-sterilizing switch is pushed on condition that flavor-line-washing, mix-line-washing, refrigerating or calibrating, and liquid-mix-feeding operations are not under execution, step 705.

Since the first-sterilizing switch is a toggle switch, when it is pushed first, N in step 706, an "OK signal on a first sterilizing operation" is sent to the control block 140B, step 707.

Then, the first-sterilization lamp is lit, and all the LEDs corresponding to second-sterilizing, flavor-washing, mix-line-washing, refrigerating or calibrating, and liquid-mix feeding operations, which are going on-and-off, if any, are turned off, steps 708 and 709. A "wait-for-two-minutes" signal is received, step 710, and it is judged whether there is the signal, step 711.

As the "wait-for-two-minutes" signal has not been sent at this time from the control block 140B, step 712 is executed. Since the dispensing solenoid 70 is also in the off position, N in step 712, and further the second sterilizing switch 2 is also in the off position, N in step 713, the control block proceeds to step 714, and END.

The control block 140B, which receives an "OK signal on first sterilization" from the control block 140A, detects the existence of the "OK signal on first sterilization", Y in step 715, and set a flag to indicate the first sterilization is under process, step 716. When the first sterilization is under process, N in step 717, the beater motor 45 is turned on, step 718. When the inside temperature of the freezing cylinder is low at this time, N in step 719, the rear compressor 14 and four-way valve 21 are turned on, steps 720 and 721, to heat the freezing cylinder 9 through a heat pump operation. The inside temperature of the freeing cylinder 9 is measured, step 722, and it is determined whether the temperature is high, step 723. When the temperature is not high, N in step 723, the control block proceeds to steps 724 and 725, and END.

The control block 140B repeats the above processes, and reenters into this routine from START so that the liquid mix in the freezing cylinder 9 is thawed by executing the heating processes of the freezing cylinder 9. As a result, when the inside temperature rises to about 5° C., Y in step 723, a flag is set to indicate the temperature has risen, step 726, so that the control block proceeds to steps 724 and 725, and END.

When it reenters into this routine from START, Y in step 719, the rear compressor 14 and four-way valve 21 are turned off, steps 727 and 728, to complete the heating of the freezing cylinder 9. Since the time elapsed is under two minutes at this time, N in step 729, "under-two-minute WAIT information" is outputted to the control block 140A, and at the same time, the timer is set going to measure the elapsed time, step 731. When the pressure in the freezing cylinder 9 is "H" at this time, Y in step 732, the control block proceeds to steps 733 and 734, and END, while leaving the mix pump 8 and air electromagnetic valve 155 as they are.

Upon receiving the "two-minute-WAIT information", Y in step 711, the control block 140A keeps this state for fifteen seconds, and after fifteen seconds, Y in step 735, the solenoid 70 is turned on to discharge the liquid mix in the freezing cylinder 9, step 736.

The control block 140B repeats the execution of steps 715–719 and 727–734, and keeps watching the time of two minutes to be elapsed through the timer, while keeping discharging liquid mixes such that when the pressure in the freezing cylinder 9 falls with the discharge of liquid mixes, step 732, the mix pump 8 and air-electromagnetic valve 155 are turned on, steps 737 and 738, to feed air into the freezing cylinder 9 so as to facilitate the discharge of the liquid mixes. After two minutes have elapsed, Y in step 729, such operations as to set a flag for the completion of first sterilization or the like, step 739, are executed, and it is confirmed again that the rear compressor 14 and four-way valve 21 are off, steps 740 and 741, so that "under-two-minute WAIT information" which has been outputted to board A is stopped, step 742.

With the disappearance of this information the control block 140A proceeds to step 743 via steps 711 and 712, there turns the first sterilization lamp on and off to inform the completion of a first sterilizing operation, and stop sending the "OK signal on first sterilization" to the control block 140B, step 744. Also the solenoid 70 is turned off, step 745.

An operator finds the end of the operation through the on-and-off first sterilization lamp, and push the first sterilizing switch 128 to confirm it or the operator may push the switch 128 during the first sterilization so that the control block 140A executes step 706 to turn the first sterilization lamp off, step 746.

After the completion of the first sterilization, in which the liquid mixes in the freezing cylinder 9 have been dissolved and discharged, an operator push the second sterilizing switch 129 to wash the inside of the cylinder 9 after feeding a rinse into the mix tank 5.

The control block 140A proceeds to step 749 via steps 705, 747, 713, and 748 to send an "OK signal on second sterilization" to the control block 140B. Since no "abnormal sterilization information" has been inputted then from the control block 140B, step 750, the control block 140A proceeds to step 753 via step 751 to turn the second sterilization lamp 2 on, informing the start of second sterilization, step 752. Since no "under two-minute WAIT information" has been inputted at this time from the control block 140B, steps 754 and 755, the dispensing solenoid 70 is off, step 756, and the counter which counts the number of on-and-off operations of the solenoid still reads zero, it proceeds to END via step 757.

Upon receiving the "OK signal on second sterilization" from the block 140A, the control block 140B proceeds to step 759 via steps 715, 758-1, and 758-2 to set an under-second-sterilization flag. Since there is nothing in the freezing cylinder 9 and the inside pressure is low, the control block 140B proceeds through steps 760 and 761 to turn the mix pump 8 on, step 762, turn the air-electromagnetic valve 155 off, step 763, and turn the beater motor 45 on, step 764. After this, it turns the hot-water-electromagnetic valve 50 off, step 765, the hot-water heater 48 off, step 766, the rear compressor 14 off, step 767, and the four-way valve 21 off, step 768, and then proceeds to END.

Through these series of processes the rinse is fed into the freezing cylinder 9 from the mix tank 5, and when the inside pressure rises to "H", the control block 140B proceeds through steps 761 and 769 to add one count to the wash counter, step 770. Then, the mix pump 8 and air-electromagnetic valve 155 are turned off, step 711 and 772, and the supply of the rinse to the freezing cylinder 9 is stopped. The control block 140B thus proceeds through step 773 to turn the beater motor 45 on, step 774, so that "under two-minute WAIT information" is outputted to the control block 140A, step 775.

As a result of this, the control block 140A proceeds through step 755, and when fifteen seconds have elapsed, step 776, turns the dispensing solenoid on, step 777.

When two minutes have elapsed after feeding the freezing cylinder 9 with the rinse, the control block 140B proceeds through step 773 to execute preparatory processes needed for the next washing, step 778, and stop outputting the "under two-minute WAIT information" which has been outputted to the control block 140A, step 779.

With the stoppage of this information the control block 140A proceeds through steps 755 and 765, in which the dispensing solenoid 70 has been on, to turn the solenoid 70 off, step 780. There it adds one count to the counter to count the number of rinses, that is, the number to turn on the solenoid 70, step 781, and proceeds to END via step 757. Thus the first mix-line washing operation ends.

The control block 140A waits for the input of the "under two-minute WAIT information" from the control block 140B, while repeatedly executing a loop of steps 701–705, 747, 713, 714, and 749–757.

The control block 140B feeds again a rinse into the freezing cylinder from the mix tank 5 after executing a loop of steps 715, 758-1, 758-2, 759–768, and starts executing a second mix-line washing operation.

After repeating such mix-line washing operations three times and starting forth operations, the control block 140B proceeds through steps 761 and 769, and turns the beater motor 45 on, step 782, when the inside pressure of the freezing cylinder 9 becomes "H" with the supply of the rinse, step 782.

Since the temperature in the cylinder is still low at this early stage of hot sterilizing operation, the control block 140B proceeds through steps 783–785 and 786 and 787, and measures the inside temperature of the cylinder, step 788. Since the temperature is still low, it proceeds to step 790, where the temperature of the inside of the cylinder 9 is raised to 80° C., via step 789, and controls the on-and-off operations of the rear compressor 14 and four-way valve 21 so that they functions as a heat pump. Upon completion of steps 791 and 792 it proceeds to END.

The control block 140B repeatedly executes a routine of steps 715, 758-1, 758-2, 759-761, 769, and 782-792 so as to raise the temperature of the rinse in the freezing cylinder to 80° C.

So far as the apparatus works normally, the heating of the inside of the cylinder is completed, step 89, and the heating flag in the cylinder is set, step 793. Upon completion of such heating in the cylinder, the control block proceeds to step 794 via step 784, and starts counting time. Also it turns the hot-water-electromagnetic valve 50 on, step 795, and controls the on-and-off operations of the electric water heater 48 so as to attain a prescribed temperature of the hot water to be fed to the shaft sealing part 46, step 796.

The control block 140B accumulates the time when the inside temperature of the cylinder is 78° C. or over by controlling the on-and-off operations of the rear compressor 14 and four-way valve 21 so that they operate as a heat pump, step 797.

If the apparatus is normal, the temperature rises to 75° C. or over, step 799, when the cumulative time amounts to 30 minutes, step 798, so that sterilizing processes are completed, step 800.

When the heating is not completed, however, thirty minutes after starting the on-and-off control of the rear compressor 14 and four-way valve 21, the sterilizing operations are stopped as an abnormal sterilizing process, step 801 after prosecuting steps 784N and 784Y, and "abnormal sterilizing process information" is outputted to the control block 140A, step 802. Even if the inside temperature of the freezing cylinder rises to 80° C. through the heat control, when forty minutes have elapsed before the cumulative time of the temperature of 78° C. or over amounts to thirty minutes, step 794, abnormal sterilizing processes, steps 801 and 802 are also executed. Further, even if the inside temperature of the freezing cylinder has risen to 80° C. through the heat control and the cumulative time of the temperature of 78° C. or over has amounted to thirty minutes before forty minutes have elapsed, when the resulted temperature is 75° C. or under, the abnormal processes, steps 801 and 802 are also executed.

When such abnormal sterilizing processes occur, the control block 140A proceeds through step 751, turns the second sterilization lamp off, step 803, and stops sending the OK signal on second sterilization outputted to the control block 140B, step 804.

When sterilizing processes have been completed normally, the control block 140B proceeds through steps 783 and 805, and turns the mix pump and air-electromagnetic valve on, step 806 and 807, to feed air into the freezing cylinder. Also it outputs the "under-two-minutes WAIT information" to the control block 140A, step 808, turns the hot-water-electromagnetic valve 50, electric water heater 48, rear compressor 14, and four-way valve 21 off, steps 809-812, and proceeds to END.

Upon receiving the "under-two-minute-WAIT information", the control block 140A proceeds through step 755, and turns the solenoid 70 on, step 777, after fifteen seconds have elapsed, step 776.

When two minutes have elapsed then, the control block 140B proceeds through step 805, executes second-sterilization-ending processes, step 814, such as to stop sending "two-minute-WAIT information" to the control block 140, step 813, and to set a second-sterilization-ending flag, and turns the beater motor 45, mix pump, and air-electromagnetic valve off, steps 815-817.

With the ending of the "two-minute-WAIT information" the control block 140A proceeds through steps 755 and 756, turns the solenoid 70 off, step 780 and counts the number of the counts amounts to four, it proceeds through step 757, turns the second sterilization lamp off, step 803, and stops sending the "OK signal on second sterilization" to the control block 140B.

As a result of this, the control block 140A circulates thereafter along a routine comprising steps 701-705, 747, 713, and 714, while the control block 140B goes into a standby state after proceeding through a routine consisting of steps 715, 758-1, 758-2, and 818.

We claim:

1. An apparatus for preparing ice creams comprising a freezing cylinder having an inlet port for receiving liquid mix into the inside of the cylinder, agitating means for agitating the liquid mix received into the inside, a dispensing port for dispensing ice creams prepared in the inside, liquid mix supply means for supplying the liquid mix to the inlet of the freezing cylinder, refrigerating means for refrigerating the freezing cylinder, temperature control means for controlling the refrigerating means to keep the temperature of the ice creams in the freezing cylinder within a predetermined temperature range, means for supplying hot water to the inside of the freezing cylinder, means for discharging the hot water supplied to the inside of the freezing cylinder after a predetermined period of time, heating means for heating the inside of the freezing cylinder, temperature detector means for detecting the temperature in the freezing cylinder, and heat control means for keeping the temperature of the hot water supplied to the inside of the freezing cylinder at thermal death points during the predetermined period of time by operating and controlling the heating means on the basis of the temperature detected by the temperature detector means and a preset temperature.

2. An apparatus for preparing ice creams according to claim 1, wherein the heating means comprises a compressor and a condenser that can be also used as means to refrigerating the inside of the freezing cylinder, and a four-way valve that reverses the flow of cooling media by constituting a reverse cycle in the refrigerating means to heat the inside of the freezing cylinder.

3. An apparatus for preparing ice creams according to claim 1, further comprising means for automatically collecting ice creams in the inside by heating and dissolving the ice creams by means of the heating means before hot water is supplied into the freezing cylinder.

4. An apparatus for preparing ice creams according to claim 1, further comprising means for repeatedly supplying the hot water into the freezing cylinder and for discharging the hot water from the freezing cylinder before the hot water supplied into the freezing cylinder is heated.

5. An apparatus for preparing ice creams according to claim I, wherein the apparatus comprises an accumulating timer that accumulates time lying within the range of sterilizing temperature when the hot water in the freezing cylinder is heated.

6. An apparatus for preparing ice creams according to claim 1, wherein the temperature detecting means can also be used as a temperature detector in the temperature control means.

7. An apparatus for preparing ice creams according to claim 1, further comprising a hot water supply means for supplying hot water to the shaft sealing part of the rotating shaft of the agitating means passing through the freezing cylinder to keep the temperature of the hot water supplied into the freezing cylinder at a sterilizing temperature.

8. An apparatus for preparing ice creams comprising a freezing cylinder having an inlet port for receiving liquid mix into the inside of the cylinder, agitating means for agitating the liquid mix received into the inside, a dispensing port for dispensing ice creams prepared in the inside, liquid mix supply means for supplying the liquid mix to the inlet of the freezing cylinder, refrigerating means for refrigerating the freezing cylinder, temperature control means for controlling the refrigerating means to keep the temperature of the ice creams in the freezing cylinder within a predetermined temperature range, and hot water to a shaft sealing part of a rotating shaft of the agitating means passing through the freezing cylinder.

9. An apparatus for preparing ice creams according to claim 8, wherein the shaft sealing part comprises housing means for providing a cavity around the rotating shaft, which housing means comprises an inlet path to guide hot water which is supplied from the hot water supply means to the cavity and an outlet path to discharge the hot water.

* * * * *